United States Patent [19]
Kelley

[11] Patent Number: 5,634,133
[45] Date of Patent: May 27, 1997

[54] CONSTRAINT BASED GRAPHICS SYSTEM

[75] Inventor: Winslow B. Kelley, Natick, Mass.

[73] Assignee: Compaq Computer Corporation, Houston, Tex.

[21] Appl. No.: 272,950

[22] Filed: Jul. 11, 1994

Related U.S. Application Data

[63] Continuation of Ser. No. 823,660, Jan. 17, 1992, abandoned.

[51] Int. Cl.$^6$ ................................................. G06T 11/20
[52] U.S. Cl. ........................ 395/764; 395/615; 395/140; 395/141; 395/60
[58] Field of Search ........................ 395/155, 156, 395/160, 161, 140, 141, 145–149, 133, 600, 54, 60; 364/735, 700, 244.5, 274.7, DIG. 1

[56] References Cited

U.S. PATENT DOCUMENTS

| | | | |
|---|---|---|---|
| 4,800,510 | 1/1989 | Vinberg et al. | 364/521 |
| 4,813,013 | 3/1989 | Dunn | 395/159 |
| 5,041,992 | 8/1991 | Cunningham et al. | 395/135 |
| 5,095,522 | 3/1992 | Fujita et al. | 395/200.01 |
| 5,121,478 | 6/1992 | Rao | 395/157 |
| 5,175,848 | 12/1992 | Dysart et al. | 395/600 |
| 5,214,758 | 5/1993 | Ohsa et al. | 395/141 |
| 5,307,453 | 4/1994 | Takashiro | 395/141 |

OTHER PUBLICATIONS

"Turbo C Addendum Version 1.5 Additions and Enhancements," Borland International (1987), pp. 55–60 and 117.
"Turbo C User's Guide," Borland International (1987), pp. 154–156.
Vadhwana, "Object Oriented Rule–Based Control on a Personal Computer", IEE Colloquium on 'The Use of Personal Computer Systems for Plant Monitoring and Control' (1989), pp. 6/1 to 6/5.
Jensen et al., "Harvard Graphics: The Complete Reference," Osborn McGraw–Hill (1990), pp. 3–14 and 125–212.
Quattro® Pro User's Guide; Borland International, Inc., pp. 315–324. 1989.

*Primary Examiner*—Joseph H. Feild
*Attorney, Agent, or Firm*—Fish & Neave; Jeffrey H. Ingerman

[57] ABSTRACT

A constraint based graphic system and method for creating graphic layouts of constraints-related graphic objects. The graphic objects are defined in a "constraint hierarchy". The constraint hierarchy defines graphic object in terms of predetermined object "primitives" (such as rectangles, circles and lines) whose parameters may be constants, variables, functions, or parameters of other objects. Unique grouping, indexing, listing and logic functions that allow individual objects or groups of objects to be defined or constrained by the defining functions and attributes of other objects or groups of objects or by constants, variables and other functions are facilitated. Arguments of the functions may include single valued and "list valued" variables.

21 Claims, 8 Drawing Sheets

|   | A | B | C | D | E | F | G | H |
|---|---|---|---|---|---|---|---|---|
| 1 | Sales | 1988 | 1989 | 1990 | | | | |
| 2 | North | $19,980 | $26,750 | $34,580 | | | | |
| 3 | South | $11,760 | $13,450 | $13,760 | | | | |
| 4 | East | $28,670 | $30,240 | $29,650 | | | | |
| 5 | West | $25,430 | $29,760 | $36,780 | | | | |
| 6 | TOTAL SALES | $85,840 | $100,200 | $114,770 | | | | |
| 7 | | | | | | | | |
| 8 | | | | | | | | |
| 9 | | | | | | | | |
| 10 | | | | | | | | |
| 11 | | | | | | | | |
| 12 | | | | | | | | |
| 13 | | | | | | | | |
| 14 | | | | | | | | |
| 15 | | | | | | | | |
| 16 | | | | | | | | |
| 17 | | | | | | | | |
| 18 | | | | | | | | |
| 19 | | | | | | | | |
| 20 | | | | | | | | |
| 21 | | | | | | | | |
| 22 | | | | | | | | |

Figure 1

CONSTRAINT BASED GRAPHICS SYSTEM

This is a continuation of application Ser. No. 07/823,660, filed Jan. 17, 1992, entitled CONSTRAINT BASED GRAPHICS SYSTEM, now abandoned.

BACKGROUND OF THE INVENTION

1. Field of the Invention

The present invention relates to the field of graphic layout methods and apparatuses, and more particularly to a constraint based graphics system for creating graphic layouts and for generating charts and graphs from data such as computer spreadsheet data.

2. Background Art

Computers are often used for numerical analysis. For these tasks, a computer program or system known as a "spreadsheet" is often used. In a computer spreadsheet system, data is arranged in a two dimensional grid of "cells" arranged in horizontal rows and vertical columns. The data content of cells may consist of text, numerical values, or arithmetic, statistical, or logical formulas that define the content of a cell in terms of the content of certain specified other cells. Examples of well known prior art spreadsheet programs are VisiCalc® from VisiCorp, Lotus 1-2-3® from Lotus Development Corporation, Excel® from Microsoft Corporation, and Quattro® from Borland International Inc.

FIG. 1 shows an example of a simple spreadsheet containing regional and total sales figures of a hypothetical company for the years 1988, 1989 and 1990. Vertical columns B, C and D contain sales data for each of the years 1988, 1989 and 1990, respectively. Horizontal columns 2–6 contain sales data for each of the North, South, East and West sales regions and for total sales, respectively.

In addition to displaying numerical data in the row and column format shown in FIG. 1, a spreadsheet system will often include subsystems that can display numerical data contained in spreadsheet cells in a graphical form. For example, prior art spreadsheet programs typically are able to generate bar charts, pie charts, and line graphs from data contained in selected spreadsheet cells. FIGS. 2 and 3 show examples of two types of bar charts that may be generated by spreadsheet programs of the prior art using the data of the spreadsheet of FIG. 1.

FIG. 2 shows a bar chart with four groups of vertical bars, one for each of the four sales regions North, South, East and West. Each group of bars contains three vertical bars for each of the sales years 1988, 1989, and 1990. The type of graph shown in FIG. 2 is useful for showing the relative changes in sales for each region over the three year period 1988 to 1990.

FIG. 3 shows a bar chart with a stacked bar for each of the four sales regions. Each stacked bar consists of three bars stacked on top of each other, one for each of the three years of the sales period. The heights of the stacked bars represent the total sales for each of the regions over the three year sales period. The type of graph shown in FIG. 3 is useful for comparing the cumulative sales of each region over the three year sales period.

Generating graphical charts from spreadsheet data involves (1) extracting the relevant numerical and text label data from appropriate spreadsheet cells and (2) transforming the data into a graphic image.

For example, to generate the bar chart of FIG. 2 from the spreadsheet data of FIG. 1, a user first identifies the data that is to be charted, typically by selecting the "range" of cells that contains the data (a "range" is a two dimensional contiguous block of spreadsheet cells). In this example, the appropriate range is is the rectangular group of cells from cell B2 to cell D5.

After the appropriate range of cells is identified, the spreadsheet system extracts the cell data needed to construct the desired graph. Data is typically extracted from the selected range on a row by row basis. For example, for the selected range B2 to D5 in FIG. 1, data may be extracted as four series of data values, one series for each of the four rows 2, 3, 4 and 5. For row 2 the appropriate series would be "19,800", "26,750" and "34,580". For row 3 the appropriate series would be "11,760", "13,450" and "13,760". For row 4 the appropriate series would be "28,670", "30,240" and "29,650". For row 5 the appropriate series would be "25,430", "29,760" and "36,780".

The selected data is transformed into a graphic image of a chart or graph by means of an appropriate "driver". A "driver" is a computer program or system that generates "draw" commands, using the selected data, for the graphic shapes and objects that form the individual components of the graph being created. These draw commands are sent to the computer's drawing subsystem, which, in response, draws geometric objects on the computer's display screen.

For example, the bar chart of FIG. 2 is made up of the following components: (a) rectangles 200a to 200l that represent the twelve vertical bars; (b) vertical line 205 that represents the vertical axis; (c) horizontal line 210 that represents the horizontal axis; (d) short horizontal line segments 215a to 215e that represent the tick marks on the vertical axis; (e) vertical axis labels 220a to 220e; and (f) horizontal axis labels 225a to 225d. The size, position, and type of each of these components must be determined by the driver, and the proper command to draw each of the components at the correct size and position must be sent to the drawing subsystem. To draw rectangles, such as those that represent the vertical bars, the coordinates of the bottom left and top right corners must typically be provided to the drawing subsystem. For line segments, such as those representing the vertical and horizontal axes, the beginning and end point coordinates must be provided. The vertical axis labels must be calculated (typically by determining the maximum height of the bars, rounding off upwards, and dividing into sections in a predefined manner), and the positions of the text characters making up the horizontal and vertical axis labels must be specified. Information about each component is sent by the driver to the drawing subsystem, which draws the components, one by one, on the display screen.

In the prior art, a different "driver" is required for each type of graph or chart. For example, the stacked chart of FIG. 3 requires a different driver than the bar chart of FIG. 2. Accordingly, the types of graphs and charts available to a user are limited to the graphs and charts for which "drivers" are available. The more sophisticated the chart, the more complex (and therefore more costly, in terms of development time, memory usage, and execution time) the driver.

SUMMARY OF THE INVENTION

The present invention consists of a constraint based graphic system for creating graphic layouts of constraint-related graphic objects. The graphic objects are defined in a "constraint hierarchy". The constraint hierarchy defines graphic object in terms of predetermined object "primitives" (such as rectangles, circles and lines) whose parameters may be constants, variables, functions, or parameters of other objects. The invention provides unique grouping, indexing, listing and logic functions that allow individual objects or groups of objects to be defined or constrained by the defining functions of other objects or groups of objects or by constants, variables and other functions. Arguments of the functions provided by the present invention may include single valued and "list valued" variables (a "list valued" variable is a variable that may assume, in a predetermined order, one of a series of values specified in a "list").

One application of the present invention is for creating graphs and charts of spreadsheet data. The invention allows the creation of a large variety of graphs and charts without the need for a special hard coded "driver" for each type of graph. Sophisticated, three dimensional, multi-level charts can be easily created by using the listing, grouping and indexing features of the present invention. Because of the ease of use provided by the present invention, a user is not limited to a fixed number of types of graphs provided by the spreadsheet. Using the system of the present invention, a user can easily create additional chart types or modify existing chart types.

In addition to being useful for generating charts from spreadsheet cell data, the present invention may also be used for other applications that involve the layout of graphic objects. Examples include architectural and engineering design, publishing and page layout, and graphic design.

BRIEF DESCRIPTION OF THE DRAWINGS

FIG. 1 illustrates a typical spreadsheet of the prior art.

DETAILED DESCRIPTION OF THE INVENTION

A constraint based graphic layout system is presented. In the following description, numerous specific details, such as function names, index labels, etc., are set forth in detail in order to provide a thorough description of the present invention. It will be apparent, however, to one skilled in the art, that the present invention may be practiced without these specific details. In other instances, well known features have not been described in detail so as not to obscure the present invention.

A "constraint based graphics system" is a system in which graphic objects are defined in terms of attributes of other graphic objects, and in terms of variables and constants. In conventional graphics systems each graphic object is defined independently.

Figure 2:
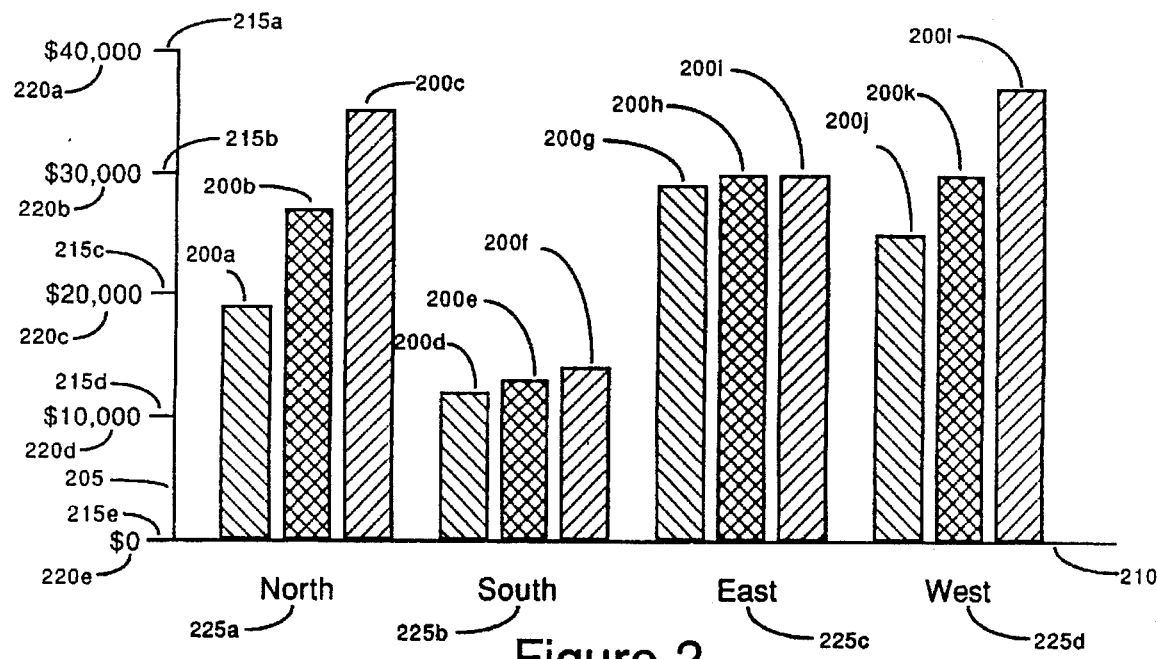
FIG. 2 illustrates a first type of bar chart created using the data entries of the spreadsheet of FIG. 1.
Figure 3:
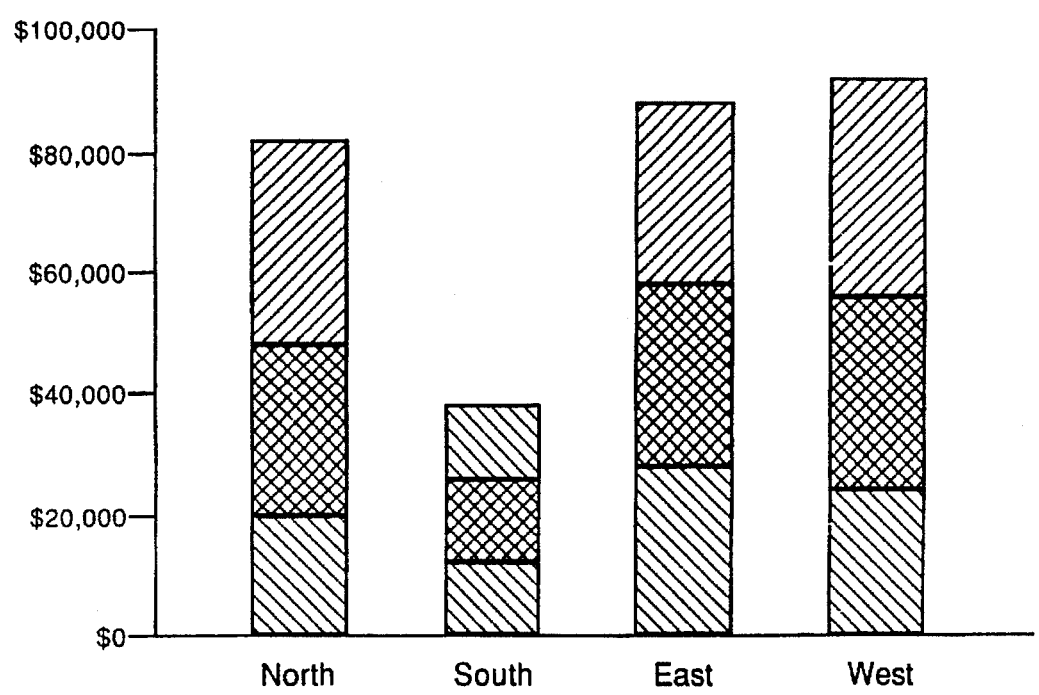
FIG. 3 illustrates a second type of bar chart created using the data entries of the spreadsheet of FIG. 1.

For example, to draw an object such as a rectangle using a conventional computer graphics program, the coordinates of the lower left and upper right hand corners of the rectangle must be specified. These coordinates, along with an identifier identifying the object to be drawn as a rectangle, are sent to a drawing subsystem or "engine". For example, an instruction sent to the drawing engine may be "Draw Rectangle (10, 10; 100, 125)". This instruction tells the drawing engine to draw a rectangle having a lower left hand corner at the coordinates "10, 10" and an upper right hand corner at the coordinates "100, 125". The coordinate values generally have to be specified as constants in order for the rectangle to be drawn. To draw two rectangles side by side (as, for example, the first two vertical bars of the bar chart shown in FIG. 2), the coordinates of the lower left and upper right corners for each rectangle must be defined separately.

In a constraint based system, an object is defined in relation to other objects, functions, variables and attributes (an "object" as that term is used herein may be a graphical object, a variable, a group, a function, or an attribute). For example, a rectangle may be defined by a function "RECT (x1,y1; x2,y2)", with one difference from the conventional graphics system described above being that the x and y coordinates in the argument need not be constants. Instead, they can be specified in terms of other objects, other functions and other variables. For example, to define two equally-sized side by side rectangles (or "bars", as in bars of a bar chart), the following notation, which is in the form of a "constraint hierarchy", can be used:

(1)(a) width=a
(b) height=b
(c) space=c
(d) x1=x0
(e) y1=y0
(f) bar1=RECT(x1,y1; x1+width, y1+height)
(g) bar2=RECT(x1+width+space, y1; x1+2*width+space, y1+height)

Figure 4:
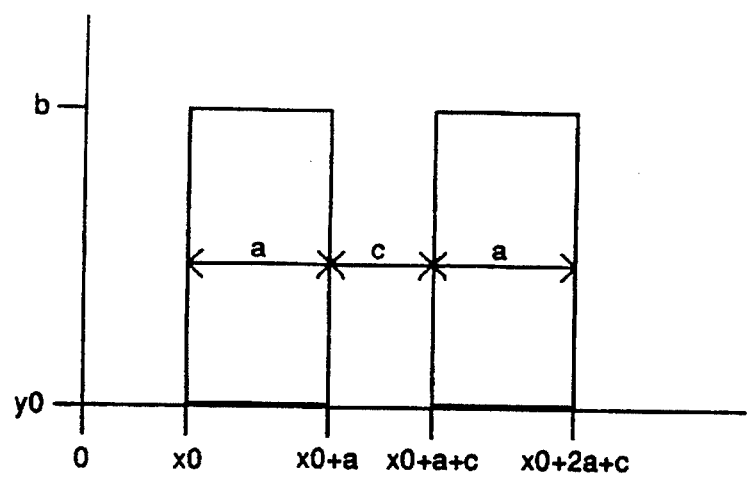
FIG. 4 illustrates a bar chart consisting of two side-by-side rectangular bars.

The two "bars" defined by this hierarchy are shown in FIG. 4.

The advantage of a constraint based system arises when multiple copies of similar objects are drawn. The above notation can be used for rectangles of any size spaced any arbitrary spacing apart simply by specifying different values for x0, y0, a, b and c.

The present invention adds several unique features to the constraint based graphic system described above. These features include (a) listing and series functions that allow variables to be defined in terms of series or lists of other variables or functions; (b) logical and statistical functions that select attributes, functions, constants or variables, according to Boolean criteria, from a list or group of attributes, functions, constants or variables; (c) index variables that relate to particular "instances" of an object, function, variable or attribute that exists in multiple instances, and (d) a hierarchical grouping and indexing notation that allows any object, attribute, function or variable in the hierarchy to be addressed by the defining function of any other object, attribute or variable in the hierarchy. These features are discussed by way of illustrative examples below. However, it will be apparent to those skilled in the art that the invention is not limited to these specific examples.

Series and Listing Functions

The present invention provides series and listing functions that allow (a) variables to be defined in terms of series or lists of other variables or functions, and (b) series or lists to be created from formulas and indexes. Examples of these functions are a "SERIES" function and an "ENUM" function provided by one embodiment of the invention.

The SERIES function is used to define a series of variables from a list of variables, constants or functions. Referring to the spreadsheet example of FIG. 1, the SERIES function can be used to define a variable "sales_n" (representing the sales of the North region) by the expression:

$$\text{sales\_n=SERIES}(19800, 26750, 34580) \quad (2)$$

This expression defines three "instances" of the variable "sales_n" (an "instance" is a particular example of a variable or object that has multiple embodiments, as for example, a list valued variable). One instance is defined to be the number "19,800", and the second and third instances are defined to be the numbers "26,750" and "34,580", respectively. The present invention provides an indexing system that assigns consecutive integer values to consecutive instances of functions, variables and objects that exist in multiple instances. For example, the initial instance of "sales_n" (which is defined by equation (2) as the number "19,800") may be designated the "zeroth" instance of the variable "sales_n", which may be written "sales_n[0]". The next two instances (which are defined in equation (2) as being equal to the numbers 26,750 and 34,580, respectively) are accordingly designated "sales_n[1]" and "sales_n[2]". In other embodiments, a different integer may be used for the initial instance. For example, the integer "1" may be used instead of the integer "0". If this convention is used, the three instances of "sales_n" would be designated "sales_n[1]", "sales_n[2]" and "sales_n[3]".

Variables representing sales in the other regions can be defined in a similar manner. For example, the following expressions may be used:

$$\text{sales\_s=SERIES}(11760, 13450, 13760) \quad (3)$$

$$\text{sales\_e=SERIES}(28670, 30240, 29650) \quad (4)$$

$$\text{sales\_w=SERIES}(25430, 29760, 36780) \quad (5)$$

The argument of the function SERIES may contain variables, functions, objects and attributes of objects in addition to text strings and numerical constants as used in the above examples.

The ENUM function generates a series from an expression. For example, the expression:

$$\text{total}=ENUM(\text{sales\_}n[@]+\text{sales\_}s[@]+\text{sales\_}e[@]+\text{sales\_}w[@]),3 \quad (6)$$

generates a series of three values for (or "instances" of) the variable "total". The ENUM function evaluates the argument (that is the content of the parentheses that immediately follow "ENUM") the number of times specified by the integer that immediately follows the parentheses. The general expression used for ENUM is:

$$\text{variable}=ENUM(\text{argument}), n \quad (7)$$

where "n" specifies the number of instances of the variable that are being defined.

In the example of equation (6), n is "3". The argument is therefore evaluated three times. The argument in equation (6) consists of the expression "sales_n[@]+sales_s[@]+sales_e[@]+sales_w[@]". The "@" character used in this expression is an index acts as a counter for the instance of the function ENUM that is being evaluated. "@" is equal to 0 for the first time the argument of the ENUM function is evaluated. "@" is equal to 1 for the second time the argument of the ENUM function is evaluated. It is incremented by one each time the argument is evaluated.

Equation (6) is evaluated three times. Accordingly, in equation (6), @ takes on the values of 0, 1 and 2. The resulting definitions for the three instances of "total" defined by equation (6) are:

$$\text{total}[0]=\text{sales\_}n[0]+\text{sales\_}s[0]+\text{sales\_}e[0]+\text{sales\_}w[0] \quad (8)$$

$$\text{total}[1]=\text{sales\_}n[1]+\text{sales\_}s[1]+\text{sales\_}e[1]+\text{sales\_}w[1]$$

$$\text{total}[2]=\text{sales\_}n[2]+\text{sales\_}s[2]+\text{sales\_}e[2]+\text{sales\_}w[2]$$

"Total[0]" represents the total sales for 1988, "total[1]" the total sales for 1989, and "total[2]" the total sales for 1990.

Logical and Statistical Functions

The present invention provides logical and statistical functions that select attributes, functions, constants or variables, according to Boolean criteria, from a list or group of attributes, functions, constants or variables. Examples of the logical and statistical functions provided by the present invention include "MAX", "MIN" and "COUNT" functions. The functions provided by the present invention can be used with both single valued and list valued variables.

The "MAX" function of the present invention returns the maximum value of the "MAX" function's argument. For example:

$$y\text{max}=MAX(ENUM(\text{total}[@]), 3) \quad (9)$$

assigns to the variable "ymax" the maximum value of the expression "ENUM(total[@]), 3". As explained above, "ENUM(total[@]), 3" defines the series "total[0]", "total[1]" and "total[2]", which represent the total sales in 1988, 1989 and 1990, respectively. The maximum of these three values will be the maximum yearly sales total over this three year period. This maximum value is defined to be "ymax". Equation (9) may alternatively be written as:

$$y\text{max}=MAX(\text{total}) \quad (9)(a)$$

In this case, "total" is recognized as a list valued variable, and the MAX function returns the maximum of the values in the list.

The MIN function operates like the MAX function, except that it returns the minimum value of the elements in the argument.

The general expressions used for the MAX and MIN function are:

$$\text{variable}=MAX(\text{argument}) \quad (10)(a)$$

$$\text{variable}=MIN(\text{argument}) \quad (10)(b)$$

The argument for both the MAX and MIN functions can contain both single-valued and list-valued elements. For example, the expression:

$$y\text{min}=MIN(\text{total}, 0) \quad (10)(c)$$

returns the value "ymin=0".

The COUNT function returns an integer value equal to the number of individual instances of the list valued variable or series specified in the argument. For example, using the results of equation (6) above, the expression:

$$n=COUNT(\text{total}) \quad (11)$$

assigns a value of "3" to the variable "n". As discussed above, there are three instances of the variable "total", namely "total[0]", "total[1]" and "total[2]". The general expression used for the COUNT function is:

$$\text{variable} = \text{COUNT}(\text{argument}). \tag{12}$$

Object and Variable Groups

The present invention provides a system of interrelated "groups" of variables and/or objects, and a unique method for identifying particular members of groups. The expression defining a group takes the general form:

$$\text{groupname} = \{\text{one or more variable, object and/or group definitions}\} \text{ [N]} \tag{13}$$

where "N" (which may be a constant or an expression) is the number of instances of the group that are being defined, and the variable, object and/or group definitions are arranged in the form of a constraint hierarchy.

In addition to providing a method for defining a group, the present invention provides a method for identifying particular instances of variables, objects, and/or attributes of objects and/or variables and for using these particular instances to define or constrain other variables, objects and/or attributes. The general forms used in one embodiment of the invention for such identifying particular instances of variables, objects, and attributes include the following:

$$\text{groupname [group index]*.object [index]*.attribute [index]*} \tag{14}$$

$$\text{groupname [group index]*.variable [index]*} \tag{15}$$

$$\text{groupname [group index]*.attribute [index]*} \tag{16}$$

* indicates that the index is optional if not applicable

Equation (14) identifies a particular instance of an attribute of an object that is contained in the constraint hierarchy for a particular group. Equation (15) identifies a particular instance of a variable within a constraint hierarchy for a particular group, and equation (16) identifies a particular instance of an attribute in a constraint hierarchy for a particular group. The operation of the constraint hierarchy of the present invention is explained in greater detail in the examples below.

Index Variables

The present invention provides index variables that relate to a particular object or group or ENUM function (which may be referred to as the "source" for the index variable). An index variable takes on consecutive integer values corresponding to particular instances of the source.

In one embodiment of the present invention, an index variable is identified by the character "@". The source for the "@" index variable can be an ENUM function, object, or group.

An example of the use of an index variable of the present invention with an ENUM function is illustrated in equation (6) above. Equation (6) is as follows:

$$\text{total} = ENUM(\text{sales}\_n[@] + \text{sales}\_s[@] + \text{sales}\_e[@] + \text{sales}\_w[@]), 3 \tag{6}$$

The numeral "3" at the end of equation (6) indicates that the argument of the ENUM function is to be evaluated three times, thereby defining three instances of the variable "total". The "@" index variable indicates which instance of the variables "sales_n", "sales_s", "sales_e" and "sales_w" are to be used each time the argument of the ENUM function is evaluated. As explained above, the first time the argument of the ENUM function is evaluated (which defines the first instance of the variable "total"), "@" is equal to zero. Accordingly, the result for the first evaluation of equation (6) is:

$$\text{total}[0] = \text{sales}\_n[0] + \text{sales}\_s[0] + \text{sales}\_e[0] + \text{sales}\_w[0]. \tag{17}$$

The second time the ENUM function is evaluated, "@" is equal to 1, and the third time, "@" is equal to 2.

In equation (6) it is implicit that the source for index variable "@" is the ENUM function. In more complex expressions, it may be unclear to which source an index variable relates, or index variables relating to different sources may be used. In that case, it is necessary to specify the source for each index variable used. The convention used in one embodiment of the present invention to designate the source of an index variable is to write the name of the source directly after the index variable.

An index variable having a group or object as a source operates in a similar manner to an index variable that has an ENUM function as its source. For example, an index variable of the present invention may be used to simplify and generalize the notation for specifying the two side by side rectangles of constraint hierarchy (1) above. Instead of using separate expressions for the objects "bar1" and "bar2", the following single expression can be used:

(18)     bars = {RECT (x1 = (x0 + (width + space)*@bars),
                             x2 = x1 + width,
                             y1 = y0,
                             y2 = y1 + height)} [2]

Equation (18) is an example of the group definition method of equation (13) above. It has the general form:

$$(\text{group}) = \{\text{Function}(@\text{group})\} \text{ [N]} \tag{19}$$

"[N]" specifies the number of instances of the group (group here means one or more than one object) that are being defined by the equation or equations contained in the brackets. "@group" is an index variable that is related to the source "group". In this example, the convention that is followed is that the value of the index variable is initially zero. In equation (18), N=2, indicating that 2 instances of the object "bars" are being defined. For the first instance, the index variable "@bars" is equal to zero, and for the second, "@bars" is equal to "1". Accordingly, the expression for the first instance of "bars" that results from equation (18) is:

(20)     bars[0] = RECT (x1 = (x0 + (width + space)*(0)) = x0,
                             x2 = x1 + width = x0 + width,
                             y1 = y0,
                             y2 = y1 + height = y0 + height)

This expression, except for the notational format used, is equivalent to equation (1)(f).

For the second instance of the variable "bars" the index variable "@bars" is incremented by 1, and is therefore equal to 1. The expression for the second instance of the variable "bars" becomes:

(20)     bars[1] = RECT (x1 = (x0 + (width + space)*(1)) = x0 + width + space,
                             x2 = x1 + width = x0 + width + space + width,
                             y1 = y0,
                             y2 = y1 + height = y0 + height)

Except for the specific notation used, this expression is equivalent to equation (1)(g).

ILLUSTRATIVE EXAMPLE

The following examples illustrate uses of the method of the present invention in creating various constraint hierarchies that may be used for creating graphic layouts.

Example A

Figure 5:
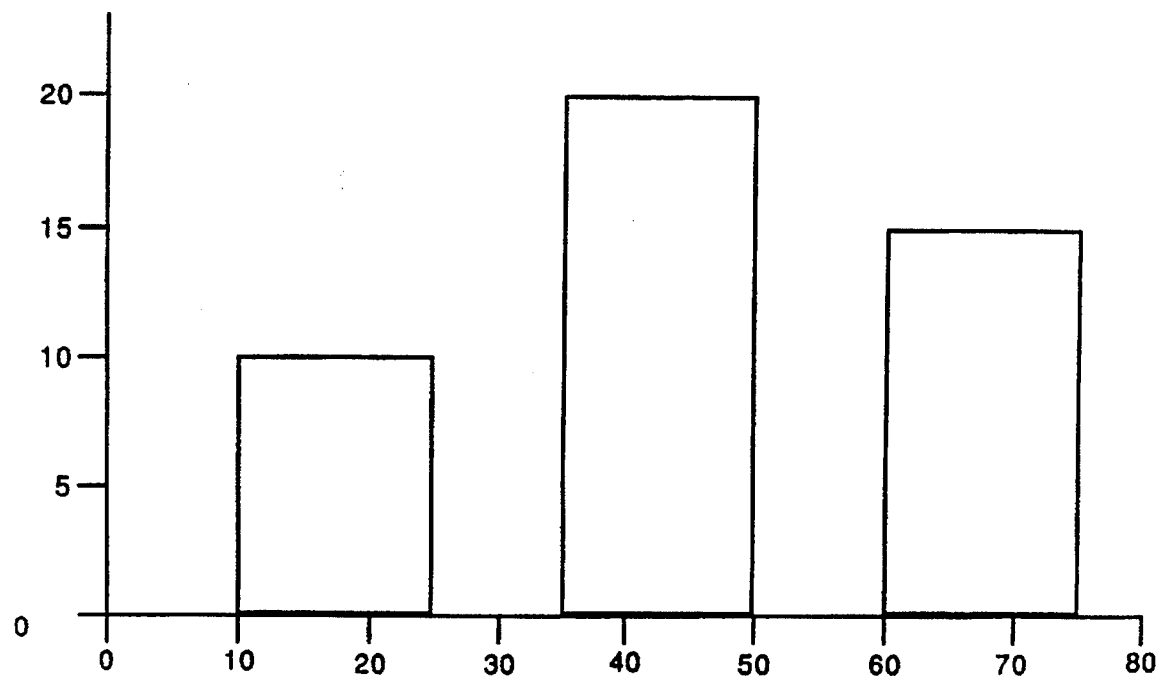
FIG. 5 illustrates a first bar chart created using the method of the present invention.

The following constraint hierarchy uses the methods provided by the present invention to define a simple bar chart for a variable that has data values of 10, 20, and 15, respectively (that is, a chart having three bars whose heights are 10, 20 and 15, respectively). This bar chart is shown in FIG. 5.

```
(22)(a)   space = 10
   (b)    width = 15
   (c)    ystart = 0
   (d)    height = SERIES (10, 20, 15)
   (e)    bars = {RECT    ( x1 = space + (space +
                               width)*@bars,
                           x2 = x1 + width,
                           y1 = ystart,
                           y2 = y1 + height [@bars] ) }
                  [COUNT (height)]
```

Equations (22)(a), (22)(b) and (22)(c) set the values of the variables "space", "width" and "ystart". "Space", which represents the measurement of the space between each bar and the space between the left edge of the chart and the first bar, is set equal to 10 units. "Width", which represents the width of each bar, is set equal to 15 units. "Ystart", which represents the vertical height of the base of each bar, is set equal to 0 units.

Equation (22)(d) defines the list valued variable "height" which represents the heights of the bars. Equation (22)(d) defines three instances of the variable "height". These three instances, which may be written as "height[0]", "height[1]" and "height[2]", are set equal to 10, 20 and 15, respectively.

Equation (22)(e) uses the group definition method of the present invention to define the bars for the bar chart. The general form of equation (22)(e) is:

```
(23)          bars = {RECT (x1 = f1,
                            x2 = f2,
                            y1 = f3,
                            y2 = f4)} [N]
``` where N=the number of "bars"; x1, x2, y1, and y2 are the horizontal and vertical bounds, respectively of the rectangles representing each of the bars; and f1, f2, f3 and f4 are expressions or functions that specify those bounds.

For the above example, N is defined to be equal to "COUNT (height)", which is equal to the number instances that exist of the list-valued variable "height". Equation (22)(d) specifies three instances of the variable "height", equal to the three values 10, 20 and 15, respectively. N therefore is equal to "3".

In equation (22)(e), x1 is defined as being equal to "space+(space+width)*@(bars)". As described above, "@bars" is an index variable whose value is dependent on the specific instance of the expression for "bar" that is being evaluated. As described above, this index variable starts at "0", and is incremented by 1 each time the expression for "bars" is evaluated. Its maximum value is "N−1". In this example, "N"=3. Accordingly, "@bar" will have the values 0, 1, and 2

The following values for x1, y1, x2 and y2 result from the above expression for bars:
First bar "bars[0]" (@bars=0)

$x1=10+(10+15)*(0)=10$ $x2=10+15=25$ $y1=0$ $y2=0+10=10$

Second bar "bars[1]" (@bars=1)

$x1=10+(10+15)*(1)=35$ $x2=35+15=50$ $y1=0$ $y2=0+20=20$

Third bar "bars[2]" (@bars=2)

$x1=10+(10+15)*(2)=60$ $x2=60+15=75$ $y1=0$ $y2=0+15=15$

The resulting bar chart is shown in FIG. 5.

The same expression for "bars" used in equation (22)(e) can generally be used for any list of values. By replacing equation (22)(d) with a different list, a bar chart having different numbers and heights of bars will result. For example, replacing equation (22)(d) with the expression:

height=SERIES(5, 12, 10, 16, 23, 13, 26, 32)          (24)

results in a bar chart having 8 bars whose relative heights are 5, 12, 10, 16, 23, 13, 26 and 32, respectively.

In a more general application of equation (22), the width and space values can be made to depend on the number of bars and the width of the paper, or display screen.

Example B

Figure 6:
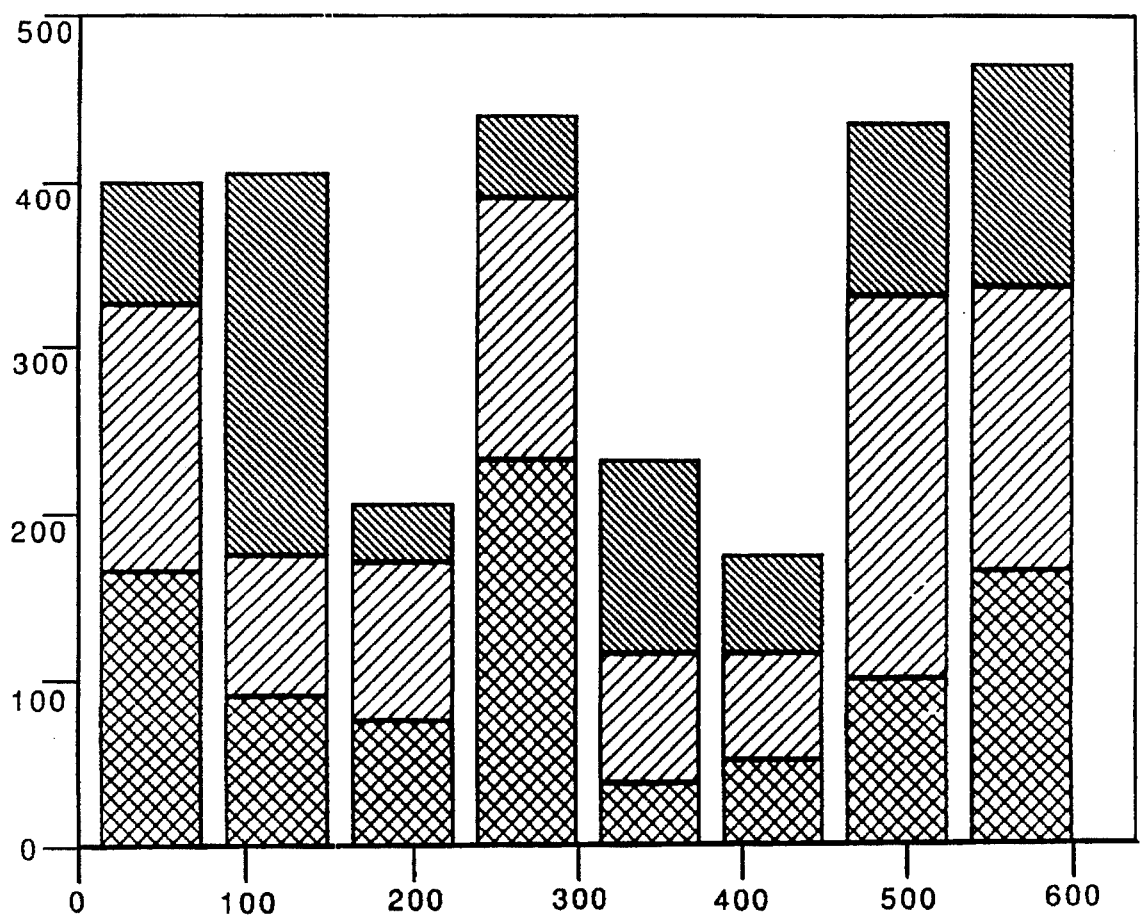
FIG. 6 illustrates a second bar chart created using the method of the present invention.

The following constraint hierarchy, constructed using the methods of the present invention, creates the stacked bar chart shown in FIG. 6. The chart is intended to be displayed on a VGA computer monitor having a resolution of 640 by 480 pixels. The unit of measure used is numbers of pixels.

```
(25)     maxwidth = 640
(26)     maxheight = 480
(27)     space2bar = 0.25
```

-continued

```
(28)    yvalues1 = SERIES(142, 80, 65, 199, 32, 45, 90, 142)
(29)    yvalues2 = SERIES(142, 75, 85, 142, 80, 65, 199, 150)
(30)    yvalues3 = SERIES(65, 199, 32, 45, 90, 45, 90, 120)
(31)    n = MAX(COUNT(yvalues1), COUNT(yvalues2), COUNT(yvalues3))
(32)    ymax = MAX(ENUM(yvalues1[@] + yvalues2[@] + yvalues3[@]), n)
(33)    barwidth = maxwidth / (n + ((n + 1) * space2bar))
(34)    spacewidth = barwidth*space2bar
(35)    bars= {
(a)            x1 = ((spacewidth + barwidth)*@bars) + spacewidth
(b)            x2 = x1 + barwidth
(c)            bars3 = RECT (x1 = bars[@bars] .x1
(d)                          x2 = bars[@bars] .x2
(e)                          y1 = bars2[@bars] .y2
(f)                          y2 = ((yvalues3[@bars]*(maxheight − 10))/ymax)
                                  +y1
(g)                          edgePattern = 15, fillColor = RGB(0, 0, 255));
(h)            bars2 = RECT (x1 = bars[@bars] .x1
(i)                          x2 = bars[@bars] .x2
(j)                          y1 = bars1[@bars] .y2
(k)                          y2 = ((yvalues2[@bars]*(maxheight − 10))/ymax)
                                  +y1
(l)                          edgePattern = 15,fillColor = RGB(255, 255, 0));
(m)            bars1 = RECT (x1 = bars[@bars] .x1
(n)                          x2 = bars[@bars] .x2
(o)                          y1 = 0
(p)                          y2 = (yvalues1[@bars]*(maxheight − 10))/ymax
(q)                          edgePattern = 15, fillColor = RGB(255, 0, 0));
(r)            }[n];
(s)     bakgr = RECT(x1 = 0, y1 = 0, x2 = maxWidth, y2 = maxHeight,
                     edgePattern = 15, fillColor = RGB(192, 192, 192))
```

Equation (35) is the constraint hierarchy that defines the layout of the graphic elements that make up the chart. Equations (25) to (34) assign values to the variables used in equation (35).

Equation (25) sets the variable "maxwidth" to be equal to 640. "Maxwidth" represents the maximum available display width, and therefore the maximum allowable width of the graph.

Equation (26) sets the variable "maxheight" to be equal to 480. "Maxheight" represents the maximum available display height, and therefore the maximum allowable height of the graph.

Equation (27) sets the variable "space2bar" to be equal to 0.25. "Space2bar" represents the ratio of the width of the space between adjacent bars on the bar chart to the width a bar.

Equations (28) to (30) set the values of list valued variables "yvalues1", "yvalues2" and "yvalues3", respectively, to the series of values specified. "Yvalues1" represents the height of the bottom tier of the stacked bars, "yvalues2" the middle tier, and "yvalues3" the top tier. Each series of values may be obtained, for example, from a row of cells in a selected range of cells of a spreadsheet.

Equation (31) determines the maximum number of instances of any of the list valued variables "yvalues1", "yvalues2" and "yvalues3", and sets a variable "n" equal to such maximum number. "n" represents the number of stacked bars that will be displayed. Since each of the "yvalues" variables have eight instances in the present example, "n"=8.

Equation (32) determines the maximum height of the stacked bars that will be displayed by comparing the sum of "yvalues1" plus "yvalues2" plus "yvalues3" for each instance of these variables. Because there are eight instances of each of these values, there are eight sums. Using the data in equations (28) to (30), these sums are equal to 349, 354, 202, 386, 202, 155, 379 and 412, respectively. The maximum value is 412. Accordingly, equation (32) sets the variable "ymax" equal to 412.

Equation (33) sets the value of "barwidth" (the width of each bar) to be equal to "maxwidth/(n+((n+1) * space2bar))". Using the values specified above, "barwidth" is set equal to 640/(8+(9 * 0.25) or 62.43. For the purposes of this example, this number will be rounded off to the number "60", which represents the width of each bar.

Equation (34) sets the value of "spacewidth", the size of the space between each bar, to be equal to "barwidth * space2bar". Using the values of this example, "spacewidth" is equal to 60 * 0.25, or 15.

Equation (35) is a constraint hierarchy that uses the group definition method of the present invention to create the graphic layout that comprises the graph shown in FIG. 6.

Equation (35) is in the general form of equation (13), namely: "groupname={one or more variable, object or group definitions}[N ]". Here, the "groupname" is "bars", "N" is "n" or eight, and the "variable, object and group definitions" are represented by equations (35)(a) to (35)(q). Equations (35)(a) to (35)(q) define three rectangles called "bars1", "bars2" and "bars3", which represent the bottom, middle, and top tier of each stacked bar, respectively. Equations (35)(a) to (35)(q) are evaluated "n" times. Since "n" was calculated to be equal to 8, equations (35)(a) to (35)(q) are evaluated eight times, thus defining the eight stacked bars of the graph. Equation (35) thus provides a concise means of defining the eight groups of stacked rectangles that comprise the bar chart of FIG. 6.

The index variable "@bars" is used to track the instance of group "bars" that is being evaluated. In this example, the convention used is that the index variable "@bars" starts at zero and is incremented by 1 up to and including n−1. Each value of "@bars" will result in a different stacked bar. The first time equations (35)(a) to (35)(q) are evaluated, the index variable "@bars" is equal to zero. This instance of the group "bars" results in the first stacked bar defined by the constraint hierarchy of equation (35). The second time equations (35)(a) to (35)(q) are evaluated, the index variable "@bars" is equal to one, and the second stacked bar is defined. Equations (35)(a) to (35)(q) are evaluated a total of eight times, defining eight stacked bars. The eighth and last time equations (35)(a) to (35)(q) are evaluated, "@bars" is equal to seven.

Either a "top down" or "bottom up" order may be used to evaluate the constraint hierarchy of equation (35). If a "top down" order is used, equation (35)(a) is evaluated first, then (35)(b), (35)(c), and so on. If an equation cannot be evaluated in this sequential order because one of its parameters or variables has not yet been determined, that equation is skipped for the time being and re-evaluated once the missing quantity has been determined. If a "bottom up" order is used, the same general procedure is followed, but the constraint hierarchy is evaluated beginning with equation (35)(q). The evaluation of equation (35) is described below using a "top down" order, but the same general methods are used with a "bottom up" evaluation order.

As described above, for the first instance of the group "bars" (i.e. for the first stacked bar), the index variable "@bars" is equal to zero. Evaluating equation (35)(a) with "@bars" equal to zero, and substituting the values calculated for the relevant variables in equations (25) to (34) yields the following value for x1:

$$x1=((spacewidth+barwidth) * @bars)+spacewidth \quad (35)(a)(0)$$

$$x1=((15+60)*0)+15$$

$$x1=15$$

Evaluating equation (35)(b) in a similar fashion yields the following value for x2:

$$x2=x1+barwidth \quad (35)(b)(0)$$

$$x2=15+60$$

$$x2=75$$

The values for x1 and x2 calculated in equations (35)(a)(0) and (35)(b)(0), respectively, are the values of x1 and x2 for the "zeroth" instance of the group "bars". Using the notation of equation (15) above, these values of x1 and x2 may be written as follows:

$$bars[0].x1 \quad (36)$$

$$bars[0].x2 \quad (37)$$

Expression (36) means "the value of the variable x1 in the zeroth instance of the group 'bars'". Similarly, expression (37) means "the value of the variable x2 in the zeroth instance of the group 'bars'".

The next equations in the hierarchy, equations (35)(c) to (35)(s), define the zeroth instance of the object "bars3". "Bars3" is defined as a rectangle ("RECT") having horizontal and vertical bounds x1, x2, y1 and y2 as defined by the expressions contained in the equations. x1 is defined in equation (35)(c) to be equal to "bars[@bars].x1". For this initial instance of "bars", "@bars" is equal to zero. Accordingly, "bars[@bars].x1"becomes "bars[0].x1", or "the value of x1 in the zeroth instance of the group 'bars'". This is the value for x1 that was calculated in equation (35)(a)(0) above. Accordingly, x1 in equation (35)(c) is in this instance equal to 15. Similarly, equation (35)(d) defines x2 to be equal to "bars[@bars].x2", or, since "@bars" in this instance is equal to zero, "bars[0].x2". This value for "the value of x2 in the zeroth instance of the group 'bars'" was calculated in equation (35)(b)(0) to be equal to 75.

Equation (35)(e) defines the value of y1 for bars3 to be equal to "bars2[@bars].y2". In other words the value of y1 for bars3 (the bottom of the third stacked bar) is equal to y2 for bars2 (the top of the second bar). The value for y2 for bars2 is not defined until equation (35)(k). Equation (35)(e) cannot yet be evaluated. Accordingly, evaluation of equation (35)(e) must be deferred until equation (35)(k) has been evaluated.

The value of y1 defined by equation (35)(e) is needed to calculate the value of y2 defined by equation (35)(f). Since evaluation of equation (35)(e) is deferred, evaluation of equation (35)(f) must also be deferred.

Equation (35)(g) sets the edge pattern and the fill color for the rectangles "bars3". In this example, there are a predetermined number of predefined edge patterns, each of which is designated by a different integer. These edge patterns include solid lines of various thicknesses and colors, dotted lines, shaded lines, etc. The edge pattern specified in equation (35)(g) is edge pattern number "15", which in this example represent a solid black line two pixels in width.

The fill color for "bars3" is set in equation (35)(g) by specifying the amount of red, green and blue shading using the expression "RGB(p,q,r)" where "p", "q", and "r" are the amounts of red, green and blue, respectively. In the current example, p, q, and r can have values between 0 and 255, with 255 the maximum level of color. Equation (35)(g) specified values of 0, 0, and 255 for each of the colors red, green and blue, respectively. The fill color is therefore blue.

The next equations in the hierarchy, equations (35)(h) to (35)(l), define the zeroth instance of the object "bars2" in the same manner that equations (35)(c) to (35)(g) defined the zeroth instance of the object "bars3". "Bars2" is defined as a rectangle ("RECT") having the diagonal corner coordinates x1, y1 and x2, y2 as defined by the expressions contained in the equations. x1 is defined in equation (35)(g) to be equal to "bars[@bars].x1". As shown with respect to equation (35)(c), above, this value is equal to 15. Similarly, equation (35)(h) defines x2 to be equal to "bars[@bars].x2". As shown above, this value is equal to 75.

Equation (35)(j) defines the value of y1 for bar2 to be equal to "bars1[@bars].y2". In other words the value of y1 for bars2 (the bottom of the second stacked bar) is equal to y2 for bars1 (the top of the first bar). The value for y2 for bars1, however, is not defined until equation (35)(p). Equation (35)(j) cannot yet be evaluated. Accordingly, evaluation of equation (35)(j) must be deferred until equation (35)(p) has been evaluated.

The value of y1 defined by equation (35)(j) is needed to calculate the value of y2 defined by equation (35)(k). Since evaluation of equation (35)(j) is deferred, evaluation of equation (35)(k) is also deferred.

Equation (35)(l) sets the edge pattern and fill color of bars2 in the same manner that equation (35)(g) sets the edge pattern and fill color of bars3. The edge pattern specified is the same as that specified in equation (35)(g). The fill color specified is "RGB(255, 255, 0)", which represents the color yellow.

Finally, equations (35)(m) to (35)(q) define the bottom tier of bars for the three-tiered stacked bars of FIG. 6. Like equations (35)(c) and (35)(d), and equations (35)(h) and (35)(i), equations (35)(m) and (35)(n) define x1 and x2 to be equal to "bars[@bars].x1" and "bars[@bars].x2", respectively. Since the bars are stacked directly on top of one another, the horizontal limits are the same for each bar. Equation (35)(o) sets y1 for bars1 (the bottom of the three-tiered stack) to be equal to zero.

Equation (35)(p) defines the top limit of the bottom tier. The equation defines y2 to be equal to "yvalues1[@bars]* (maxheight−10)/ymax". "yvalues1[@bars]" is the instance of the series "yvalues1" (defined in equation (28)) that corresponds to the current value of the index variable "@bars". "(maxheight−10)/ymax" is a scale factor that is a constant for a particular graph. For this example, this scale factor is equal to (480−10)/412 or approximately 1.14. For the first bar, where "@bars" is equal to zero, "yvalues1[0]" equals 142. Accordingly, y2 equals 142*1.14 or approximately 162.

Equation (35)(q) sets the edge pattern and fill color of bars2 in the same manner that equation (35)(g) and (35)(l) set the edge pattern and fill color of bars3 and bars2, respectively. The edge pattern specified is the same as that specified in equations (35)(g) and (35)(l). The fill color specified is "RGB(255, 0, 0)", which represents the color red.

Once the value of "bars1[@bars].y2" has been determined according to equation (35)(p), equations (35)(j), (35)(k), (35)(e) and (35)(f), evaluation of which was deferred, can be evaluated. Equation (35)(j) defines y1 for bars2 to be equal to y2 for bars1. For "@bars" equal to zero, y2 for bars1 has been shown to be equal to 162. Equation (35)(k) defines y2 for bars2 to be equal to ((yvalues2[@bars]*maxheight−10)/ymax)+y1. For "@bars" equal to zero, "yvalues2[@bars]" is the first value in the series "yvalues2" of equation (29), namely 142. As shown in the preceding paragraph, "(maxheight−10)/ymax)" equals approximately 1.14, and y1, according to equation (35)(j) is 162. Accordingly, y2 is equal to 142*1.14+162 or approximately 324. Thus, y1 and y2 for the first instance of bars2 are equal to 162 and 324, respectively.

In a similar manner, equation (35)(e) defines y1 for bars1 to be equal to y2 for bars2. For "@bars" equal to zero, y1 for bars1 equals 324. Equation (35)(f) defines y2 for bars3 to be equal to ((yvalues3[@bars]*maxheight−10))/ymax)+ y1. For "@bars" equal to zero, "yvalues3[@bars]" is the first value in the series "yvalues3" of equation (30), namely 65. As shown above, "(maxheight−10)/ymax)" equals approximately 1.14, and y1, according to equation (35)(e) is 324. Accordingly, y2 is equal to 65*1.14+324 or approximately 398. Thus, y1 and y2 for the first instance of bars3 are equal to 324 and 398, respectively.

In summary, equations (35)(a) to (35)(q) define the 3 bars making up the first stacked bar of the bar chart of FIG. 6 as follows:

bars1=RECT(x1=15, x2=75; y1=0, y2=162)  (38)

bars2=RECT(x1=15, x2=75; y1=162, y2=324)  (39)

bars3=RECT(x1=15, x2=75; y1=324, y2=398)  (40)

Figure 7:
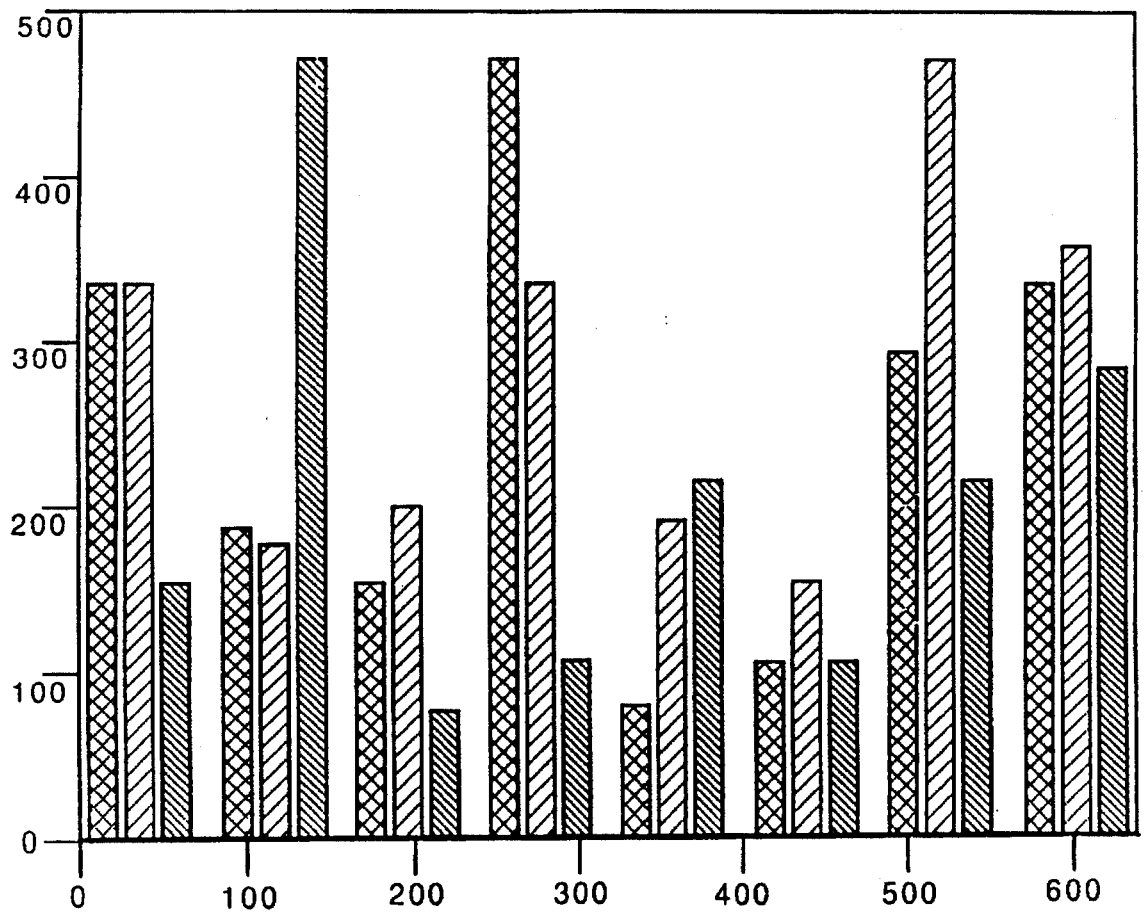
FIG. 7 illustrates a third bar chart created using the method of the present invention.

This first stacked bar is shown in FIG. 7.

According to the method of the present invention, after equations (35)(a) to (35)(q) have been evaluated for "@bars" equal to zero, "@bars" is incremented by 1, and equations (35)(a) to (35)(q) are evaluated again with "@bars" being equal to one. The second stacked bar of FIG. 6 is thereby created. "@bars" is incremented again, and the process continues until equations (35)(a) to (35)(q) have been evaluated for values of "@bars" from 0 to N−1, or in this example, from 0 to 7. The resulting values for x1, x2, y1 and y2 for bars1, bars2 and bars3 are listed on Table 1.

TABLE 1

| | @bars | | | | | | | |
|---|---|---|---|---|---|---|---|---|
| | 0 | 1 | 2 | 3 | 4 | 5 | 6 | 7 |
| x1 | 15 | 90 | 165 | 240 | 315 | 390 | 465 | 540 |
| x2 | 75 | 150 | 225 | 300 | 375 | 450 | 525 | 600 | "Bars3"
| y1 | 324 | 177 | 171 | 389 | 127 | 125 | 330 | 333 |
| y2 | 398 | 404 | 207 | 440 | 230 | 176 | 433 | 470 |
| x1 | 15 | 90 | 165 | 240 | 315 | 390 | 465 | 540 |
| x2 | 75 | 150 | 225 | 300 | 375 | 450 | 525 | 600 | "Bars2"
| y1 | 162 | 91 | 74 | 227 | 36 | 51 | 103 | 162 |
| y2 | 324 | 177 | 171 | 389 | 127 | 125 | 330 | 333 |
| x1 | 15 | 90 | 165 | 240 | 315 | 390 | 465 | 540 |
| x2 | 75 | 150 | 225 | 300 | 375 | 450 | 525 | 600 | "Bars1"
| y1 | 0 | 0 | 0 | 0 | 0 | 0 | 0 | 0 |
| y2 | 162 | 91 | 74 | 227 | 36 | 51 | 103 | 162 |

Finally, equation (35)(s) creates a rectangle for the background of the bar chart. The edge pattern is again specified to be type "15". The fill color is "RGB(192, 192, 192)", which represents the color grey.

As this example shows, the present invention allows a sophisticated stacked bar chart to be created using a very concise set of commands. The constraint hierarchy of equations (25) to (35) creates a three tiered bar chart for any three series of values supplied in equations (28) to (30). The height, width and spacing of the bars is automatically adjusted to fit within the designated display area. Furthermore, by making relatively minor changes to equations (25) to (35), the same constraint hierarchy structure can be used to create a variety of other types of charts. For example, additional tiers may be added by defining additional "yvalues" series such as equations (28) to (30) and additional "barsn" objects as in equations (35)(c) to (35)(g). The arrangement of the three tiers of bars can also be easily changed. For example, a grouped side-by-side bar chart of the type shown in FIG. 2, instead of the stacked-bar chart of FIG. 6, can be created by making the following changes to equations (32), (33) and (35) (with all equations not listed below remaining the same):

| | |
|---|---|
| (32)* | ymax = MAX((ENUM(yvalues1[@]),n),(ENUM(yvalues2[@]),n), (ENUM(yvalues3[@]),n)) |
| (33)* | barwidth = maxwidth / (3*n + (n − 1) + ((2*n + 1) * space2bar)) |
| (35)* | bars= { |
| (a)* | x1 = ((4*barwidth + 2*spacewidth) * @bars) + spacewidth |
| (c)* | bars3 = RECT (x1 = bars2[@bars] .x2 + spacewidth |
| (d)* | x2 = x1 + barwidth |
| (e)* | y1 = 0 |
| (f)* | y2 = ((yvalues3[@bars] * (maxheight − 10))/ymax) |
| (h)* | bars2 = RECT (x1 = bars1[@bars] .x2 + spacewidth |
| (i)* | x2 = x1 + barwidth |
| (j)* | y1 = 0 |

-continued

| (k)* | y2 = ((yvalues2[@bars] * (maxheight − 10))/ymax) |
| (n)* | x2 = x1 + barwidth |
| (p) | y2 = (yvalues1[@bars] * (maxheight − 10))/ymax |

Evaluating these modified equations in the same manner as described for the original equations results in the bar chart shown in FIG. 7.

Comparing the bar chart of FIG. 7 to the bar chart of FIG. 6 shows that the modifications indicated in equations (32)* to (35)* above have changed the size and shape of the individual rectangles or bars representing the individual data points, and rearranged them into new positions. The method of the present invention thus allows the position, size and shape of the objects being displayed to be easily reshaped and rearranged, while maintaining interrelations between the size, shape, and position of each. The present invention allows the size, shape and location of a displayed object to be so constrained by the size shape and location of other objects through the use of its novel functions, index variables and group definition system.

Example C

The constraint hierarchies illustrated in examples A and B, that is the hierarchies represented by equations (22)(e) and (35), respectively, each contain only one index variable, namely "@bars", that is associated with the group "bars". More complex constraint hierarchies may use multiple tiers of groups, each having an associated index variable, with lower tiers embedded in the higher tiers. Equations (41) to (44) below create a simple constraint hierarchy that consists of three tiers of groups. These groups are designated groups "a", "b" and "c". The associated index variables are "@a", "@b" and "@c", respectively.

```
(41)    N1 = 2
(42)    N2 = 2
(43)    N3 = INT((N1 + N2)/N1)
(44)(a)     a= {
(44)(b)        b= {
(44)(c)           bx1 = @a
(44)(d)           bx2 = @b
(44)(e)           c= {
(44)(f)              Box=RECT(    x1 = b[@b].bx1
(44)(g)                           x2 = b[@b].bx2
(44)(h)                           y1 = @c
(44)(i)                           y2 = @a)
(44)(j)           }[N3]
(44)(k)        }[N2]
(44)(l)     }[N1]
```

Equations (41), (42) and (43), respectively, define the values of N1, N2 and N3. Equations (44)(j), (44)(k), and (44)(l) assign N1, N2 and N3 to be the "numerators" for groups a, b and c, respectively. The term "numerator" as used here indicates the number of instances the corresponding group will have, and, accordingly, the number of values that the index variable will take. For example, Equation (41) sets the value of N1 at 2, and equation (44)(l) designates N1 as the numerator for group "a" (group "a" consists of equations (44)(a) to (44)(l)). Since N1 equals 2, index variable @a will have two possible values: 0 and 1. In a similar fashion, the numerator for group b is set equal to 2 by equations (42) and (44)(k), and the numerator for group c is set equal to INT((2+2)/2) or 2 by equations (43) and (44)(j). (Although the numerator may be a variable or expression, as shown by equation (43), its value must always be an integer. Hence the "INT" function is used, which rounds off the value in the argument to the next lowest integer value.)

Since the numerator for group b is two, and since group b, represented by equations (44)(b) to (44)(k), is imbedded in group a, there will be two instances of group b for each instance of group a. Since there are two instances of group a, there will be total of four instances of group b (two for each instance of group a). Accordingly, there will also be four instances of each of attributes "bx1" and "bx2" of group b, which are defined by equations (44)(c) and (44)(d).

In a similar manner, there are two instances of the group c for every instance of group b, or a total of eight instances of group c. Accordingly, there are also eight instances of the attributes x1, x2, y1, and y2 defined by equations (44)(f) to (44)(g), respectively. Using the notation of the present invention described in equations (14) to (16) above, the eight instances of the attribute x1, for example, may be referred to as:

| | |
|---|---|
| a[0].b[0].c[0].x1 | (45)(a) |
| a[0].b[0].c[1].x1 | (45)(b) |
| a[0].b[1].c[0].x1 | (45)(c) |
| a[0].b[1].c[1].x1 | (45)(d) |
| a[1].b[0].c[0].x1 | (45)(e) |
| a[1].b[0].c[1].x1 | (45)(f) |
| a[1].b[1].c[0].x1 | (45)(g) |
| a[1].b[1].c[1].x1 | (45)(h) |

One way to evaluate the constraint hierarchy of equations (44)(a) to (44)(l) is to evaluate equations (44)(c), (44)(d), (44)(f), (44)(g), (44)(h) and (44)(i) for each of the eight instances of group c. The resulting values for the variables bx1, bx2, x1, x2, y1 and y2 are listed on Table 2 below.

TABLE 2

| Instance of | Indexes | | | Variables | | | | | |
|---|---|---|---|---|---|---|---|---|---|
| Group C | @a | @b | @c | bx1 | bx2 | x1 | x2 | y1 | y2 |
| 1 | 0 | 0 | 0 | 0 | 0 | 0 | 0 | 0 | 0 |
| 2 | 0 | 0 | 1 | 0 | 0 | 0 | 0 | 1 | 0 |
| 3 | 0 | 1 | 0 | 0 | 1 | 0 | 1 | 0 | 0 |
| 4 | 0 | 1 | 1 | 0 | 1 | 0 | 1 | 1 | 0 |
| 5 | 1 | 0 | 0 | 1 | 0 | 1 | 0 | 0 | 1 |
| 6 | 1 | 0 | 1 | 1 | 0 | 1 | 0 | 1 | 1 |
| 7 | 1 | 1 | 0 | 1 | 1 | 1 | 1 | 0 | 1 |
| 8 | 1 | 1 | 1 | 1 | 1 | 1 | 1 | 1 | 1 |

Looking at Table 2, it can be seen that not all the variables change for each instance of group c. For example, bx1, x1 and y2 stay the same for instances 1 to 4 (indicated by the first column of Table 2), and variables bx2 and x2 only change when index variable @b changes. Although the hierarchy of equations (44)(a) to (44)(i) is only one example, in many constraint hierarchies used in practice a similar sort of redundancy will occur.

The present invention includes a method for eliminating redundancies like the ones shown in Table 2, thereby improving the speed at which the method of the present invention can be applied. The present invention does so by starting with the lower most tier of the hierarchy, determining which variables are actually desired, determining how the variables in the lower most tier depend on index variables higher in the constraint hierarchy, constructing a relationship "tree" between the indexes in the constraint hierarchy and the variable being determined, and calculating the value of the desired variable according to the relationship described in the tree. If the required relationship tree or a required variable value has already been determined, it need not be recalculated, but may be retrieved from a table of already calculated values.

For example, the first variable that needs to be calculated in the hierarchy of equations (44)(a) to (44)(l) is a[0].b[0].c[0].x1. X1 is defined by equation (44)(f) to be equal to b[@b].bx1, which, in this instance is equal to b[0].bx1. Therefore, the value of bx1 for the zeroth instance of the variable bx1 is required to determine the value of a[0].b[0].c[0].x1. The first step followed by the present invention is to determine whether the relationship tree for this variable already has been determined. If the relationship tree has already been determined and stored in a data table, then the relationship tree is inspected to see whether the value of the variable itself has also been determined and stored in the data table. If the relationship tree is in the table but the desired value of the variable has not yet been calculated, then the variable is calculated according to the relationship tree. If the relationship tree also has not yet been determined, it must be created.

Since in the current example no relationship tree between the variable bx1 and the indexes in the hierarchy has yet been determined, there is no such tree in the data table. This relationship tree is therefore determined. To construct this relationship, the first (that is, the highest level) index variable is inspected to determine whether value of the desired variable, in this case the variable bx1, depends on that index. The highest tiered index in the present example is "@a". Equation (44)(c) sets bx1 equal to "@a". Bx1 therefore is dependent on @a. This relationship is noted in the data table. Since there are two possible values of @a, in addition, two data slots are created for the variable bx1 at the "a" tier level. Next, the next tier in the hierarchy, in this case the "b" tier, is inspected to determine whether the value of bx1 is dependant on "b" tier index variable @b. No relationship is specified in equations (44)(a) to (44)(l) between @b and bx1. Accordingly, no slots in the relationship tree are specified at the b level. Finally, the last tier, the "c" tier is inspected for any relationship between bx1 and @c. No such dependency is specified. Accordingly, the relationship tree specifies that bx1 is dependant on only ga. Since there are only two possible values of @a, there are also only two possible values of bx1: one value for @a=0, and one for @a=1. The two slots established for bx1 in the data table at the a tier level are for these two values of bx1.

Once the relationship tree between bx1 and @a, @b and @c is established, it can be used to calculate the currently desired value of bx1. Bx1 is only dependent on @a, and in the present instance @a is equal to zero. The value of "0" is therefore stored in the data table as the value of bx1 for @a equal to 0.

Continuing with the evaluation of the first instance of group c (i.e. a[0].b[0].c[0]), equation (44)(g) is evaluated to determine the value of x2. Equation (44)(g) defines x2 to be equal to b[@b].bx2. Accordingly, the data table is checked to see whether there is a relationship tree between bx2 and the indexes @a, @b and @c. Since none has yet been specified, it must be determined. Following the procedure described above, the hierarchy is checked for any relationship between @a and bx2. There is none, so the next index, @b is inspected. Equation (44)(d) establishes such a relationship. It specifies that bx2=@b. That relationship is noted in the relationship tree, and since @b has two possible values, two slots are established for the resulting two possible values of bx2.

Equations (44)(h) and (44)(i) set the variables y1 and y2 to be equal to the current values of index variables @c and @a. Since no other variable values are needed to determine the values of y1 and y2, no relationship tree is needed.

After the values of x1, x2, y1 and y2 have been determined for the first instance of group c, they are determined for the next instance of group c, namely a[0].b[0].c[1]. To determine the value of a[0].b[0].c[1].x1, the value of b[@b].bx1 must be retrieved or calculated. The data table is inspected to see whether there is a relationship tree for bx1. Such a relationship tree now exists, and it specifies that bx1 depends only on @a. @a is currently equal to 0. The data table is inspected to see whether the value of bx1 for @a equals 0 has already been calculated. Since it has been calculated, it is simply retrieved. The steps of establishing the relationship tree and calculating the value of bx1 needed to determine the current value of x1 therefore need not be repeated. In a similar manner, the current value of bx2, needed to calculate the current value of x2, can also simply be retrieved from the data table, since bx2 is dependent only on @b, and @b is still equal to 0.

For the next instance of group c, a[0].b[1].c[0], the value of @b has changed to 1. Again, the value of bx1 needed to calculate x1 can simply be retrieved from the table. To calculate the value of x2 for this instance of group c, however, the current value of the variable bx2 is needed, as specified in equation (44)(f). The data table already contains the relationship tree for bx2, but the slot for bx2 for @b=1 is not yet filled. This value of bx2 is therefore calculated, and stored in that empty slot.

For the next instance of group c, the required values of bx1 and bx2 needed to calculate x1 and x2 already are in the data table and can be simply retrieved. But for the fifth instance, a[1].b[0].c[1], the value of bx1 for @a needs to be calculated. The relationship tree already stored for bx1 is used to calculate the value of bx1 for @a=1, and that value is stored in the table.

For the remaining three instances of c, the required values of bx1 and bx2 are already in the table, and they can simply be retrieved from the table.

Accordingly, the value of bx1 and bx2 are each calculated only two times using the compression scheme of the present invention described above. That compares very favorably to the eight times each that these variables were evaluated using the "brute force" method described above with respect to Table 2.

The same general procedure described above can be used for any constraint hierarchy of any complexity, with resulting processing efficiencies.

Figure 8:
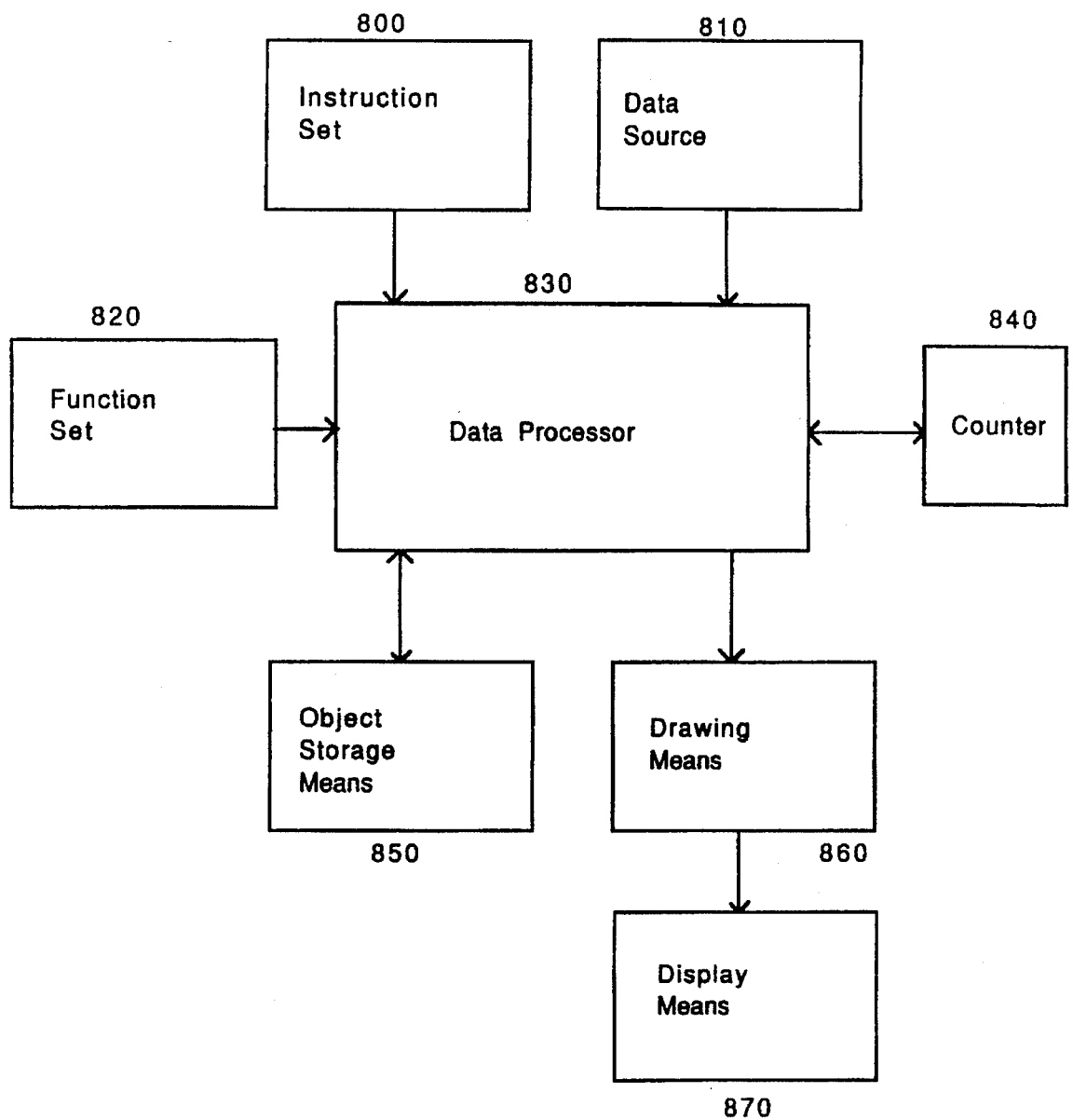
FIG. 8 is a block diagram of one embodiment of the apparatus used to implement the present invention.

FIG. 8 shows one embodiment apparatus that may be used to implement the methods of the present invention. This apparatus may comprise discrete hardware components or may be implemented in a general purpose computer by appropriate software commands. In one embodiment of the invention, the apparatus used is implemented by a software program compiled in an object oriented programming language such as "C++". This software program is preferably run on a pen-based computer using a pen-based operation system such as PenPoint from GO Corporation or Windows for Pen from Microsoft Corporation. The computer preferably uses an Intel 80386 CPU and features a VGA mono LCD display.

The central element of the apparatus shown in FIG. 8 is a data processor 830. Data processor 830 reads and carries out instructions obtained from instruction set 800. The instructions contained in instruction set 800 may be provided by a user, may be supplied by an application program, or may be a combination of both. The instructions may include instructions to create source objects from data source 810. For example, the data source may be a spreadsheet and an instruction may direct data processor 830 to create multiple instances of a source object from data contained in the spreadsheet. The resulting source objects may be stored in object storage means 850, which may be a portion of random access memory of a computer. The instructions contained in instruction set 800 may also direct data processor 830 to create a target object (for example a graphical object) by applying functions contained in function set 820 (which may include functions such as the MAX, ENUM, SERIES, and COUNT functions described above) to data from the data source or objects in object storage means 850. Object storage means 850 may also be used to store relationship trees and corresponding variable slots and values, as described with respect to Example C above. The attributes of the target objects may also be stored in object storage means 850, or may be directly sent to drawing means 860 which displays corresponding images on display means 870. Display means 870 may for example be a display monitor of a computer. The instructions contained in instruction set 800 may define multiple instances of source and target objects. Counter 840 keeps track of the current particular instance of each object existing in multiple instances.

Figure 9:
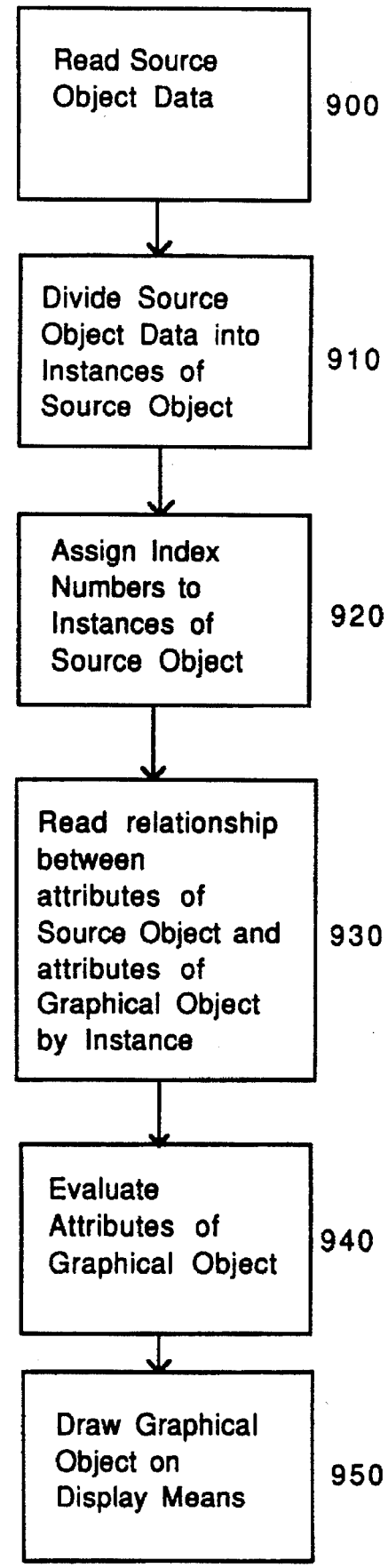
FIG. 9 is a flow chart illustrating the operation of one embodiment of the present invention.

FIG. 9 is a flow chart for one embodiment of the method of the present invention. Source object data, such as spreadsheet cell data, is read at block 900. This raw source object data is divided into separate instances of one or more source objects at block 910. The resulting source objects may for example be the list valued objects such as "yvalues1", "yvalues2", and "yvalues3" defined in equations 28, 29 and 30, above. At block 920, index numbers are assigned to each instance of each source object resulting from the division of data at block 910. At block 930, the expressions are read that define the attributes of each instance of the desired target object, such as a graphical object, in terms of attributes of specific instances of the source objects, and/or in terms of other elements including variables or attributes of other instances of the same or other target objects. These expressions may be in the form of the constraint hierarchy described above. The attributes of the target object are evaluated at block 940, and the resulting graphical object is drawn on a display means at block 950.

Figure 10:
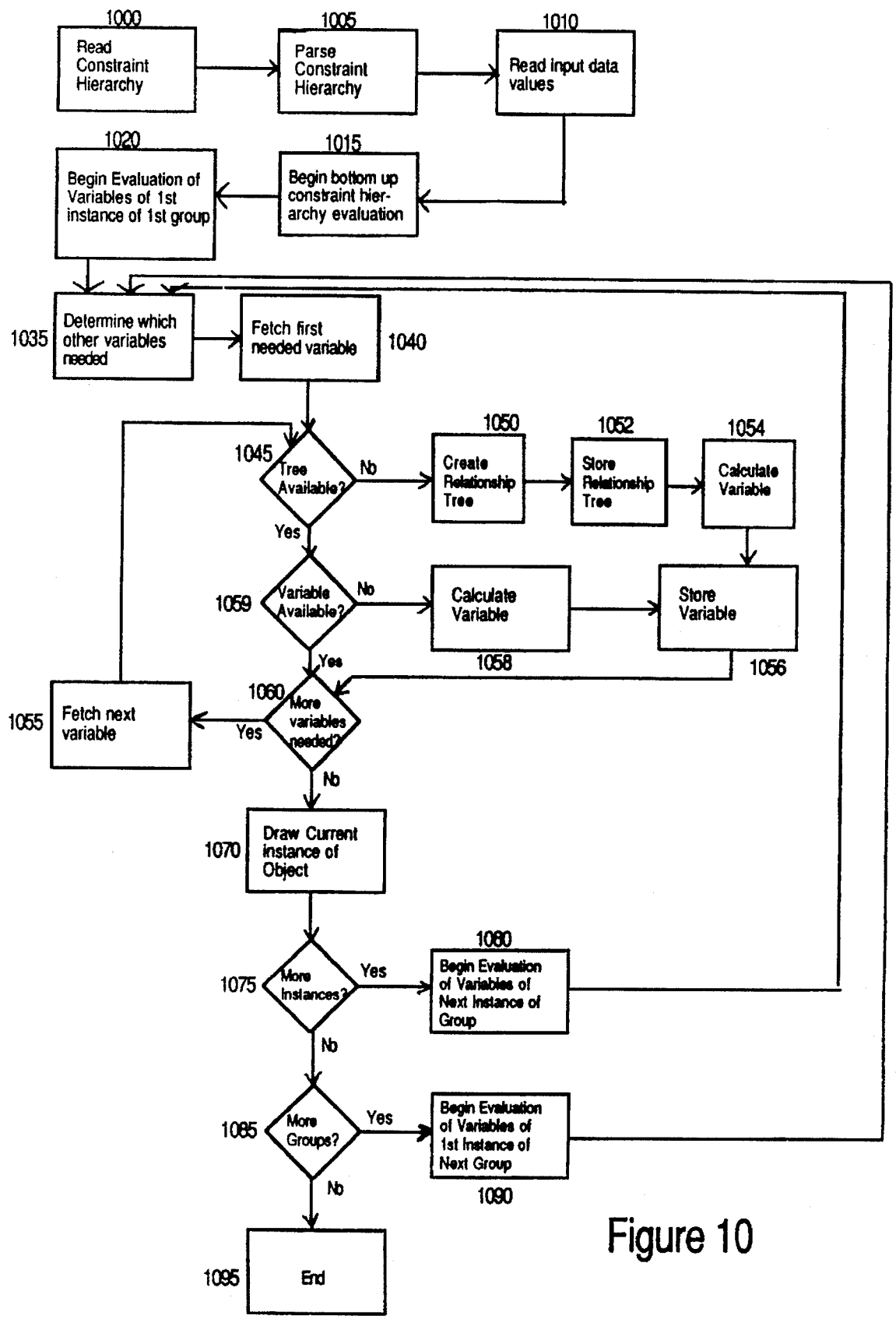
FIG. 10 is a flow chart illustrating the operation of a further embodiment of the present invention.

FIG. 10 is a flow chart for an embodiment of the present invention incorporating the compression feature described with respect to Example C above. In this embodiment, the constraint hierarchy defining the objects that are to be displayed is read at block 1000. This constraint hierarchy is analyzed at block 1005 and parsed into binary files. The constraint hierarchy will generally contain multi-tiered groups. After the constraint hierarchy has been read and analyzed, external input data is read at block 1010 and evaluation of the constraint hierarchy is begun at block 1015. The convention used in this example is that the lowermost objects in the constraint hierarchy form the bottom layer of the display and are therefore evaluated first. Higher tiered objects are layered on top of already displayed lower tiered layers. In other embodiments of the invention, different conventions may be used.

The first step in evaluating the constraint hierarchy is to determine the variables of the lower most group in the constraint hierarchy that are needed to display any objects specified in that group. The evaluation of these needed variables for the first instance of the first group is begun at block 1020. The variables of other objects that are needed to evaluate the currently needed variables in the current instance of the current group are identified at block 1035. The first required variable is fetched at 1040. To fetch the variable, a data table is first inspected at block 1045 to determine whether a relationship tree for the desired variable has already been created. If the relationship tree is not available, it is created at block 1050 and stored in the data table at block 1052. After the relationship tree has been created, the value of the desired variable is calculated at block 1054, and stored in the data table at block 1056.

If it is determined at block 1045 that the data tree is already available, the data table is inspected at block 1059 to determine whether the desired value of the variable has already been calculated and stored in the data table. If it has not been calculated, it is calculated at block 1058 and stored in the data table at block 1056. If the variable is available at block 1059, or after the variable has been calculated and stored at block 1056, the constraint hierarchy is inspected at block 1060 to determine if any other variables are needed for the current instance of the object to be displayed.

If an additional variable is needed, it is fetched at block 1055, and the analysis of blocks 1045 through 1060 is repeated. If it is determined at block 1060 that no more variables are needed to display the current instance of the current object, the current object is drawn on the display at block 1070.

Next, at block 1075, it is determined whether any further instances of the current group need to be evaluated. If additional instances must be evaluated, the evaluation of the next instance of the current group is initiated at block 1080. The process returns to block 1035 and the steps described above with respect to the first instance of the first group are repeated for the next instance. If there are no more instances of the current group, the hierarchy is checked to see whether there are any other, higher tiered, groups whose variables must be determined. This checking is done at block 1085. If there are such additional groups, the evaluation of the variables of the first instance of such group is begun at block 1090 by once again returning to block 1035. The process described above with respect to the first group is repeated for the next group.

Finally, if it is determined at block 1085 that no other groups need to be evaluated, the process is completed and ends at block 1095.

The method of the present invention can be used to easily and quickly create more sophisticated graphs. Examples include 3-D charts and "icon" charts where the height of an arbitrary icon, rather than a bar, can be used to show the magnitudes of the data values. The present invention can also be used for other layout functions, such as page layout applications, where the size and location of one object is preferably constrained by another. Other uses of the present invention will be apparent to those skilled in the art.

Computer source code for one embodiment of the constraint-based graphics system of the present invention is attached as Appendix A.

Appendix A
Graphics System Source Code (C++)

```
//
//                              Copyright 1991 - Slate Corporation
//
// Name:            atom.cxx
//
// Abstract: methods for chart engine class ATOM
//
// Audit:
// 05aug91 buzz    Original.
// 29aug91 buzz Converted to use platform classes in preparation for Penpoint.
// include "platform.hxx"
include "atom.hxx"

// Load the atomTable from the rulebase file.
// Atoms are stored in the file as 'atomCount' NULL terminated strings.
// The total string store requirement is 'storeSize'.
// Allocate store for the strings themselves and the pointers to them and
// scan the stringStore to set the pointers to the  beginning of each string.

ATOMTAB::ATOMTAB(U32 atomCount, U32 storeSize, RBASE* pRb)
{
        P_STRING* ppAtom = pAtoms = new P_STRING[atomCount];

if (storeSize) {
                *ppAtom = pAtomStore = new STRING[storeSize];
                pRb->read(pAtomStore, storeSize, 1);

while (--atomCount) {
                        P_STRING pAtom = *(ppAtom++);
                        while (*(pAtom++))
                                continue;
                        *ppAtom = pAtom;
                }
        }
        else pAtomStore = NULL;
}

// Delete the stringStore and the table of pointers to the strings.

ATOMTAB::~ATOMTAB()
{
        if (pAtoms)
                delete pAtoms;
        if (pAtomStore)
                delete pAtomStore;
}

// Initialize the ATOM class by allocating its static atomTable.

VOID
ATOM::initTable(U32 atomCount, U32 storeSize, RBASE* pRb)
{
        if (atomCount)
                pTable = new ATOMTAB(atomCount, storeSize, pRb);
        else pTable = NULL;
}
```

```
// De-allocate ATOM class's static atomTable.

VOID
ATOM::clearTable()
{
        delete pTable;
}

//
//                              Copyright 1991 - Slate Corporation
//
// Name:         atom.cxx
//
// Abstract: include file for chart engine class ATOM
//
// Audit:
// 05aug91 buzz    Original.
// 29aug91 buzz Converted to use platform classes in preparation for Penpoint.
// ifndef atom_INCLUDED
define atom_INCLUDED class ATOMTAB
{
public:
                                ATOMTAB(U32, U32, RBASE*);
                                ~ATOMTAB();
        P_STRING        id2str(U16 id)          { return *(pAtoms+(id-1)); } private:
        P_STRING*       pAtoms;
        P_STRING        pAtomStore;
};

class ATOM
{
public:
                                ATOM(U16 i=0)                   { pStr = i?
pTable->id2str(i): 0;}
        P_STRING        operator*()             { return pStr; }
        static VOID     initTable(U32, U32, RBASE*);
        static VOID     clearTable();

private:
        P_STRING        pStr;

static ATOMTAB* pTable;
};

#endif //  atom_INCLUDED
//
//                              Copyright 1991 - Slate Corporation
//
// Name:         chart.cxx
//
// Abstract: Chart object implementation.
//
// Audit:
// 05aug91 buzz Original.
// 30aug91 buzz Converted to use platform classes in preparation for Penpoint.
//
```

```
#include "platform.hxx"
#include "chart.hxx"

#ifndef records_INCLUDED
#include "records.hxx"
endif ifndef variable_INCLUDED
include "variable.hxx"
endif ifndef formula_INCLUDED
include "formula.hxx"
endif

CHART::CHART(RBASE* pRb)
{
        FILEHEADER fh;
        OBJRECT or;

pRb->read(&fh, sizeof(fh), 1);

FORMULA::initStore(fh, pRb);

VARIABLE::initStore(fh.variableCount, pRb);

readAttrs(pRb);

if (pRb->read(&or, sizeof(or), 1))
                insFirst(&or, pRb);
}

CHART::~CHART()
{
        FORMULA::clearStore();

VARIABLE::clearStore();
}

VOID
CHART::show(CANVAS* pCanvas)
{
        TRACE(CHARTshow);

OBJECT* pObj = pFirst;
        INDEX i;
        S32 val;

pCanvas->beginPaint();

i.pushLevel();
        while (pObj) {
                pObj->show(&i, pCanvas);
                pObj = pObj->qNext();
                i.setVal(0);
        }
        val = attrs[ATTR_delay]? S32(attrs[ATTR_delay]->getValue(&i)): 0L;
        pCanvas->delay(val);
        i.popLevel();

pCanvas->endPaint();
}
```

```
        VOID
        CHART::dump()
        {
                TRACE(CHARTdump);
                OBJECT* pObj = pFirst;
                INDEX i;
                S32 val;

                i.pushLevel();
                while (pObj) {
                        pObj->dump(&i);
                        pObj = pObj->qNext();
                        i.setVal(0);
                }
                val = attrs[ATTR_delay]? S32(attrs[ATTR_delay]->getValue(&i)): 0L;

i.popLevel();
                endDump(0, val, NULL);
        }
        //
        //                              Copyright 1991 - Slate Corporation
        //
        // Name:        chart.hxx
        //
        // Abstract: Include file for chart class.
        //
        // Audit:
        // 30aug91 buzz    Original.
        // ifndef chart_INCLUDED
        #define chart_INCLUDED
   ifndef group_INCLUDED
        #include "group.hxx"
        #endif
   class CHART : public GROUP
        {
        public:
                                        CHART(RBASE*);
                                        ~CHART();
                VOID            show(CANVAS*);
                VOID            dump();
        };
        #endif // chart_INCLUDED //
        //
        //                              Copyright 1991 - Slate Corporation
        // Name:        datanode.cxx
        //
        // Abstract: Methods for class DATANODE and supporting classes
        //
        // Audit:
        // 08aug91 buzz Created from old variable.cxx
        // 29aug91 buzz Converted to use platform classes in preparation for Penpoint.
        //
        #include "platform.hxx"
```

```
#include "datanode.hxx"

#ifndef atom_INCLUDED
include "atom.hxx"
endif ifndef series_INCLUDED
include "series.hxx"
endif ifndef __MATH_H
include <math.h>
#endif

// Generate the Operation Jump table, used to dispatch operations.
#define OPS_OPTABLE
#include "opdict.hxx"

// only turn this on if it is really necessary, it's a performance hog.
#define OPTRACE(_n_)       //TRACE(_n_)

// DATANODES take advantage of the IEEE 64-bit encoding scheme to represent
// real numbers. This scheme repersents numbers as follows:
//      bit 63              1 bit        Sign            0=positive 1=negative
//      bits 62-52         11 bits Exponent    actual power of 2 + 0x3FF(1023)
//      bits 51-0          52 bits Fraction    if E!=0 actual fraction - 1
//                                                              if E==0 actual
fraction
//
// This format also provides for an escape for special values that are not
// considered numbers. These values, signalled by an exponent of 0x7FF(2047),
// are used to represent infinity and other special conditions.  DATANODES
// use special values as follows:
//      S==0 && F==0                     +infinity: used to signal a computation
error
//      S==1 && F==0                     -infinity: used to indicate an unset
variable
//      S==0 && F==0xF????pppppppp       pointer to string at pppppppp
//      S==1 && F==0x0????iiiiiiii       32bit signed integer iiiiiiii
//      S==1 && F==0x2????pppppppp       pointer to DATALIST at pppppppp
//      S==1 && F==0x3????pppppppp       pointer to SERIESLIST at pppppppp
//      S==1 && F==0x4????pppppppp       pointer to DATALINK at pppppppp
//

VOID
DATANODE::clear()
{
        switch (qType()) {
        case LIST:
        case SERIESLIST:
                val.pList->deRef();
                return;
        case LINK:
                val.pLink->deRef();
                return;
        default:
                return;
        }
}

U16
DATANODE::set(P_U16 pCode)
{
        clear();
```

```
        switch (*pCode) {
        case STRINGPTR:
                val.type = STRING;
                val.pString = *ATOM(*(pCode+1));
                return 2;
        case REAL64:
                real = *((P_IEEEREAL)(pCode+1));
                return 5;
        case INTEGER32:
                val.type = WHOLE;
                val.whole = *(P_S32)(pCode+1);
                return 3;
        default: // small integer
                val.type = WHOLE;
                val.whole = S32(((*pCode&(SMALLINT>>1))? *pCode:SMALLINT: *pCode);
                return 1;
        }
}

VOID
DATANODE::copy(DATANODE& that)
{
        if (that.isReal()) {
                real = that.real;
                return;
        }
        val = that.val;
        switch (val.type) {
                case SERIESLIST:
                case LIST:
                        val.pList->ref();
                        break;
                case LINK:
                        val.pLink->ref();
                        break;
                default:
                        break;
        }
}

DATANODE&
DATANODE::operator=(P_STRING pStr)
{
        clear();
        val.type = STRING;
        val.pString = pStr;
        return *this;
}

DATANODE&
DATANODE::operator=(IEEEREAL r)
{
        clear();
        real = r;
        return *this;
}

DATANODE&
DATANODE::operator=(P_IEEEREAL pr)
{
        clear();
        real = *pr;
        return *this;
}
```

```
DATANODE&
DATANODE::operator=(S32 w)
{
        clear();
        val.type = WHOLE;
        val.whole = w;
        return *this;
}

VOID
DATANODE::makeSeries(U16 seriesId)
{
        TRACE(DATANODEmakeSeries);

SERIES s(seriesId);
        U16 count = s.qCount();
        U16 i = 0;
        clear();
        makeList(count);
        val.type = SERIESLIST;
        while (i < count)
                s.getElement(val.pList->index(i), i++);
}

P_STRING
DATANODE::getString(P_STRING pStr)
{
        switch (qType()) {
        case REAL:
                IEEEREALtoP_STRING(pStr, real);
                return pStr;
        case WHOLE:
                S32toP_STRING(pStr, val.whole);
                return pStr;
        case STRING:
                return val.pString;
        case NOTSET:
                return "NOTSET";
        default:
                return "ERR";
        }
}

IEEEREAL
DATANODE::qIEEEREAL()
{
        if (isReal())
                return real;

if (val.type == WHOLE)
                return val.whole;

return IEEEREAL(0L);
}

DATANODE::operator S32()
{
        if (isReal())
                return real;

if (val.type == WHOLE)
                return val.whole;

return 0;
}
```

```
DATANODE::operator U16()
{
        if (isReal())
                return S32(real);

if (val.type == WHOLE)
                return val.whole;

return 0;
}

VOID
DATANODE::makeList(U16 n)
{
        TRACE(DATANODEmakeList);

clear();
        val.type = LIST;
        val.pList = DATALIST::newList(n);
        val.pList->ref();
}

VOID
DATANODE::makeLink(U16 varId, U16 level, U16 iCount, P_U16 indices)
{
        TRACE(DATANODEmakeLink);

clear();
        val.type = LINK;
        val.pLink = DATALINK::newLink(varId, level, iCount, indices);
        val.pLink->ref();
}

VOID
DATANODE::compress(U16 op)
{
        TRACE(DATANODEcompress);

DATANODE* pOp = this++;

switch (OPNAME(op)) {
        case ::OPMAX:
                if (val.type == pOp->val.type && val.type == WHOLE) {
                        if (val.whole < pOp->val.whole)
                                val.whole = pOp->val.whole;
                }
                else if (this->qIEEEREAL() < pOp->qIEEEREAL())
                        *this = *pOp;
                break;
        case ::OPMIN:
                if (val.type == pOp->val.type && val.type == WHOLE) {
                        if (val.whole > pOp->val.whole)
                                val.whole = pOp->val.whole;
                }
                else if (this->qIEEEREAL() > pOp->qIEEEREAL())
                        *this = *pOp;
                break;
        case ::OPSUM:
                if (val.type == pOp->val.type && val.type == WHOLE)
                        val.whole += pOp->val.whole;
                else
                        *this = this->qIEEEREAL() + pOp->qIEEEREAL();
                break;
        default:
```

```
                break;
        }
        pOp->unSet();
}

// Unary Operation Handlers

VOID
DATANODE::OPNEG(DATANODE* pOp)
{
        OPTRACE(DATANODE_OPNEG);

if (pOp->val.type == WHOLE)
                *this = -pOp->val.whole;
        else
                *this = -pOp->qIEEEREAL();
}

VOID
DATANODE::OPABS(DATANODE* pOp)
{
        OPTRACE(DATANODE_OPABS);

if (pOp->val.type == WHOLE) {
                if (pOp->val.whole < 0)
                        *this = -pOp->val.whole;
                else
                        *this = pOp->val.whole;
        }
        else
                *this = fabs(IEEEREAL(*pOp));
}

VOID
DATANODE::OPFLOOR(DATANODE* pOp)
{
        OPTRACE(DATANODE_OPFLOOR);

*this = floor(IEEEREAL(*pOp));
}

VOID
DATANODE::OPCEIL(DATANODE* pOp)
{
        OPTRACE(DATANODE_OPCEIL);

*this = ceil(IEEEREAL(*pOp));
}

VOID
DATANODE::OPSIN(DATANODE* pOp)
{
        OPTRACE(DATANODE_OPSIN);

*this = sin(IEEEREAL(*pOp));
}

VOID
DATANODE::OPCOS(DATANODE* pOp)
{
        OPTRACE(DATANODE_OPCOS);

*this = cos(IEEEREAL(*pOp));
}
```

```
        VOID
        DATANODE::OPTAN(DATANODE* pOp)
        {
                OPTRACE(DATANODE_OPTAN);

*this = tan(IEEEREAL(*pOp));
        }

        VOID
        DATANODE::OPASIN(DATANODE* pOp)
        {
                OPTRACE(DATANODE_OPASIN);

                *this = asin(IEEEREAL(*pOp));
        }

VOID
        DATANODE::OPACOS(DATANODE* pOp)
        {
                OPTRACE(DATANODE_OPACOS);

*this = acos(IEEEREAL(*pOp));
        }
        VOID
        DATANODE::OPATAN(DATANODE* pOp)
        {
                OPTRACE(DATANODE_OPATAN);
                *this = atan(IEEEREAL(*pOp));
        }

VOID
        DATANODE::OPLN(DATANODE* pOp)
        {
                OPTRACE(DATANODE_OPLN);

*this = log(IEEEREAL(*pOp));
        }

VOID
        DATANODE::OPLOG(DATANODE* pOp)
        {
                OPTRACE(DATANODE_OPLOG);

*this = log10(IEEEREAL(*pOp));
        }

        VOID
        DATANODE::OPSQRT(DATANODE* pOp)
        {
                OPTRACE(DATANODE_OPSQRT);

                *this = sqrt(IEEEREAL(*pOp));
        }

VOID
        DATANODE::OPEXP(DATANODE* pOp)
        {
                OPTRACE(DATANODE_OPEXP);

*this = exp(IEEEREAL(*pOp));
        }
```

```
VOID
DATANODE::OPFRAC(DATANODE* pOp)
{
        OPTRACE(DATANODE_OPFRAC);

IEEEREAL whole;

*this = modf(IEEEREAL(*pOp), &whole);
}

VOID
DATANODE::OPINT(DATANODE* pOp)
{
        OPTRACE(DATANODE_OPINT);

*this = S32(*pOp);
}

VOID
DATANODE::OPNOT(DATANODE* pOp)
{
        OPTRACE(DATANODE_OPNOT);

*this = S32(S32(pOp) == 0);
}

// Binary Operation Handlers

VOID
DATANODE::OPADD(DATANODE* pOp)
{
        OPTRACE(DATANODE_OPADD);

if (pOp[1].val.type == pOp[0].val.type && pOp[0].val.type == WHOLE) {
                *this = pOp[1].val.whole + pOp[0].val.whole;
        }
        else
                *this = IEEEREAL(pOp[1]) + IEEEREAL(pOp[0]);
}

VOID
DATANODE::OPSUB(DATANODE* pOp)
{
        OPTRACE(DATANODE_OPSUB);

if (pOp[1].val.type == pOp[0].val.type && pOp[1].val.type == WHOLE)
                *this = pOp[1].val.whole - pOp[0].val.whole;
        else
                *this = IEEEREAL(pOp[1]) - IEEEREAL(pOp[0]);
}

VOID
DATANODE::OPMULT(DATANODE* pOp)
{
        OPTRACE(DATANODE_OPMULT);

if (pOp[1].val.type == pOp[0].val.type && pOp[1].val.type == WHOLE)
                *this = pOp[1].val.whole * pOp[0].val.whole;
        else
                *this = IEEEREAL(pOp[1]) * IEEEREAL(pOp[0]);
}

VOID
DATANODE::OPDIV(DATANODE* pOp)
{
```

```
        OPTRACE(DATANODE_OPDIV);

if (pOp[1].val.type == pOp[0].val.type && pOp[1].val.type == WHOLE)
                *this = pOp[1].val.whole / pOp[0].val.whole;
        else
                *this = IEEEREAL(pOp[1]) / IEEEREAL(pOp[0]);
}

VOID
DATANODE::OPMOD(DATANODE* pOp)
{
        OPTRACE(DATANODE_OPMOD);

if (pOp[1].val.type == pOp[0].val.type && pOp[1].val.type == WHOLE)
                *this = pOp[1].val.whole % pOp[0].val.whole;
        else
                *this = S32(pOp[1]) % S32(pOp[0]);
}

VOID
DATANODE::OPPOW(DATANODE* pOp)
{
        OPTRACE(DATANODE_OPPOW);

*this = pow(IEEEREAL(pOp[1]), IEEEREAL(pOp[0]));
}

VOID
DATANODE::OPROUND(DATANODE* pOp)
{
        OPTRACE(DATANODE_OPROUND);

IEEEREAL num = IEEEREAL(pOp[1]);
        IEEEREAL ord = pow(10,IEEEREAL(pOp[0]));
        IEEEREAL whole = (num/ord)+((num<0)? -.5: .5);
        num = modf(whole,&whole);

*this = whole*ord;
}

VOID
DATANODE::OPEQ(DATANODE* pOp)
{
        OPTRACE(DATANODE_OPEQ);

if (pOp[1].val.type == pOp[0].val.type && pOp[1].val.type == WHOLE)
                *this = S32(pOp[1].val.whole == pOp[0].val.whole);
        else
                *this = S32(IEEEREAL(pOp[1]) == IEEEREAL(pOp[0]));
}

VOID
DATANODE::OPNE(DATANODE* pOp)
{
        OPTRACE(DATANODE_OPNE);

if (pOp[1].val.type == pOp[0].val.type && pOp[1].val.type == WHOLE)
                *this = S32(pOp[1].val.whole != pOp[0].val.whole);
        else
                *this = S32(IEEEREAL(pOp[1]) != IEEEREAL(pOp[0]));
}

VOID
DATANODE::OPGT(DATANODE* pOp)
{
```

```
        OPTRACE(DATANODE_OPGT);

if (pOp[1].val.type == pOp[0].val.type && pOp[1].val.type == WHOLE)
                *this = S32(pOp[1].val.whole > pOp[0].val.whole);
        else
                *this = S32(IEEEREAL(pOp[1]) > IEEEREAL(pOp[0]));
}

VOID
DATANODE::OPGE(DATANODE* pOp)
{
        OPTRACE(DATANODE_OPGE);

if (pOp[1].val.type == pOp[0].val.type && pOp[1].val.type == WHOLE)
                *this = S32(pOp[1].val.whole >= pOp[0].val.whole);
        else
                *this = S32(IEEEREAL(pOp[1]) >= IEEEREAL(pOp[0]));
}

VOID
DATANODE::OPLT(DATANODE* pOp)
{
        OPTRACE(DATANODE_OPLT);

if (pOp[1].val.type == pOp[0].val.type && pOp[1].val.type == WHOLE)
                *this = S32(pOp[1].val.whole < pOp[0].val.whole);
        else
                *this = S32(IEEEREAL(pOp[1]) < IEEEREAL(pOp[0]));
}

VOID
DATANODE::OPLE(DATANODE* pOp)
{
        OPTRACE(DATANODE_OPLE);

if (pOp[1].val.type == pOp[0].val.type && pOp[1].val.type == WHOLE)
                *this = S32(pOp[1].val.whole <= pOp[0].val.whole);
        else
                *this = S32(IEEEREAL(pOp[1]) <= IEEEREAL(pOp[0]));
}

VOID
DATANODE::OPAND(DATANODE* pOp)
{
        OPTRACE(DATANODE_OPAND);

*this = S32(S32(pOp[1]) != 0 && S32(pOp[0]) != 0);
}

VOID
DATANODE::OPOR(DATANODE* pOp)
{
        OPTRACE(DATANODE_OPOR);

*this = S32(S32(pOp[1]) != 0 || S32(pOp[0]) != 0);
}

// List Operation Handlers

VOID
DATANODE::OPMAX(DATANODE* pOp)
{
        *this = *pOp;
}
```

```
VOID
DATANODE::OPMIN(DATANODE* pOp)
{
        *this = *pOp;
}

VOID
DATANODE::OPSUM(DATANODE* pOp)
{
        *this = *pOp;
}

VOID
DATANODE::OPAVG(DATANODE* pOp)
{
        setErr();
}

// Miscellaneous Operation Handlers

VOID
DATANODE::OPFONT(DATANODE* pOp)
{
        OPTRACE(DATANODE_OPFONT);

*this = S32(FONT(P_STRING(*pOp)));
}

VOID
DATANODE::OPTEXTWIDTH(DATANODE* pOp)
{
        OPTRACE(DATANODE_OPTEXTWIDTH);

*this = CANVAS::textWidth(S32(pOp[2]), U16(pOp[1]), P_STRING(pOp[0]));
}

VOID
DATANODE::OPTEXTHEIGHT(DATANODE* pOp)
{
        OPTRACE(DATANODE_OPTEXTHEIGHT);

*this = CANVAS::textHeight(S32(pOp[1]), U16(pOp[0]));
}

VOID
DATANODE::OPRGB(DATANODE* pOp)
{
        OPTRACE(DATANODE_OPRGB);

*this = S32(RGB(U16(pOp[2]), U16(pOp[1]), U16(pOp[0])));
}

VOID
DATANODE::OPGREY(DATANODE* pOp)
{
        OPTRACE(DATANODE_OPGREY);

*this = S32(RGB(U16(*pOp), U16(*pOp), U16(*pOp)));
}

VOID
DATANODE::OPPI(DATANODE* pOp)
{
        OPTRACE(DATANODE_OPPI);
```

```
                *this = PI;
        }

DATANODE&
        DATANODE::nullNode()
        {
                OPTRACE(DATANODEnullNode);

emptyNode = 0;
                return *((DATANODE*)(&emptyNode));
        }

DATALIST*
        DATALIST::newList(U16 n)
        {
                DATALIST* pNew =
                                (DATALIST*)new
        U8[sizeof(DATALIST)+(sizeof(DATANODE)*(n-1))];
                DATANODE* pItem = pNew->items;
                pNew->count = n;
                pNew->refCount = 0;
                while(n--)
                        (pItem++)->init();
                return pNew;
        }

DATALIST::~DATALIST()
        {
                DATANODE* pItem = items;

// the first element of the list is cleared automatically by the
                // destructor but the others need to be cleared manually.
                while (--count)
                        (++pItem)->clear();
        }

DATANODE*
        DATALIST::index(U16 i)
        {
                return (i >= count)? NULL: &items[i];
        }

U16
        DATALIST::qCount()
        {
                return count;
        }

       VOID
        DATALIST::ref()
        {
                refCount++;
        }
        VOID
        DATALIST::deRef()
        {
                if (!--refCount)
                        delete this;
        }

DATALINK*
        DATALINK::newLink(U16 v, U16 l, U16 i, P_U16 pI)
        {
```

```
        DATALINK* pNew = (DATALINK*)new U8(sizeof(DATALINK)+(sizeof(U16)*(i-
1)));
        P_U16 pIndex = pNew->indices;

pNew->refCount = 0;
        pNew->varId = v;
        pNew->linkLevel = 1;
        pNew->indexCount = i;
        copyMem(pNew->indices, pI, i*sizeof(*pI));
        return pNew;
}

DATALINK::~DATALINK()
{
}

VOID
DATALINK::ref()
{
        refCount++;
}

VOID
DATALINK::deRef()
{
        if (!--refCount)
                delete this;
}

//
//
//                              Copyright 1991 - Slate Corporation
//
// Name:         datanode.hxx
//
// Abstract: include file for class DATANODE and supporting classes
//
// Audit:
// 08aug91 buzz Created from old variable.hxx
// 29aug91 buzz Converted to use platform classes in preparation for Penpoint.
// ifndef datanode_INCLUDED
define datanode_INCLUDED ifndef formcode_INCLUDED
include "formcode.hxx"
endif define NANMASK      0x7F30                    // exponent mask for IEEE real
exponent
define NUMBERBUFFERSIZE 32 class DATALIST;           // forward refs for DATALIST
class DATALINK;
class SERIES;
class DATANODE;

// Generate the Operation Enumeration, names for all of the operations.
#define OPS_OPTAGS
#include "opdict.hxx"

typedef VOID (DATANODE::*OPFUNCT)(DATANODE*);
extern OPFUNCT     opTable[OPMAXOPS+1];
```

```
class DATANODE
{
public:
                            DATANODE();
                            DATANODE(DATANODE& that);
        DATANODE&   operator=(DATANODE& that);
                            ~DATANODE();
        VOID        init();
        VOID        unSet();
        VOID        setErr();

VOID        clear();

U16         set(P_U16);
        VOID        copy(DATANODE&);
        BOOL        hasValue();

VOID        compress(U16);
        VOID        execute(DATANODE* pOps, U16 op);

P_STRING    getString(P_STRING);
                    operator P_STRING();
        IEEEREAL    qIEEEREAL();
                    operator IEEEREAL();
                    operator S32();
                    operator U16();

VOID        makeList(U16);
        DATANODE*   index(U16 i);

VOID        makeLink(U16, U16, U16, P_U16);
        BOOL        isLink();
        DATALINK*   qLink();

VOID        makeSeries(U16);
        BOOL        isSeries();
        U16         qCount();

DATANODE*   getElement(U16 i);

// Generate the Operation Handler definitions.
        #define OPS_OPFUNCTS
        #include "opdict.hxx"
        // Note: these should be private but ztc won't allow the opTable to be
        //       initialized if they are even though it's a member of the
    class.

static DATANODE& nullNode();

enum NODETYPE {
                            REAL        = 0x0000,
                            NOTSET      = 0x7FF0,
                            ERROR       = 0xFFF0,
                            STRING      = 0x7FFF,
                            WHOLE       = 0xFFF0,
                            LIST        = 0xFFF2,
                            SERIESLIST  = 0xFFF3,
                            LINK        = 0xFFF4
        };

private:
        DATANODE&   operator=(P_STRING);
```

```
        DATANODE&      operator=(IEEEREAL);
        DATANODE&      operator=(P_IEEEREAL);
        DATANODE&      operator=(S32);
        DATANODE&      operator=(SERIES*);

BOOL           isReal();
        NODETYPE       qType();

struct TYPEDVAL {                      // 80x86 family dependent!!!!!
                union {
                        P_STRING       pString;
                        S32                    whole;
                        DATALIST*      pList;
                        DATALINK*      pLink;
                };
                U16                    fill;
                U16                    type;
        };

union {
                IEEEREAL       real;
                TYPEDVAL       val;
        };

static STRING          numBuf[NUMBERBUFFERSIZE];
        static U16             emptyNode;
};

class DATALIST
{
public:
                       ~DATALIST();
        DATANODE*      index(U16);
        U16            qCount();
        VOID           ref();
        VOID           deRef();

static DATALIST* newList(U16);

private:
        U16            refCount;
        U16            count;
        DATANODE       items[1];
};

class DATALINK
{
public:
                       ~DATALINK();
        U16            qVarId()        { return varId; }
        U16            qLevel()        { return linkLevel; }
        U16            qCount()        { return indexCount; }
        P_U16          qIndices()      { return indices; }
        VOID           ref();
        VOID           deRef();

static DATALINK* newLink(U16, U16, U16, P_U16);

private:
        U16            refCount;
        U16            varId;
        U16            linkLevel;
        U16            indexCount;
        U16            indices[1];
};
```

```
inline
DATANODE::DATANODE()
{ init(); } inline
DATANODE::DATANODE(DATANODE& that)
{ copy(that); } inline DATANODE&
DATANODE::operator=(DATANODE& that)
{ clear(); copy(that); return *this; } inline
DATANODE::~DATANODE()
{ clear(); } inline VOID
DATANODE::init()
{ val.type = NOTSET; val.whole = 0; } inline VOID
DATANODE::unSet()
{ clear(); init(); } inline VOID
DATANODE::setErr()
{ clear(); val.type = ERROR; val.whole = 0; } inline BOOL
DATANODE::hasValue()
{ return val.type != NOTSET; } inline VOID
DATANODE::execute(DATANODE* pOps, U16 op)
{ (this->*opTable[op])(pOps);} inline
DATANODE::operator P_STRING()
{ return getString(numBuf); } inline
DATANODE::operator IEEEREAL()
{ return qIEEEREAL(); } inline DATANODE*
DATANODE::index(U16 i)
{return val.type==LIST? val.pList->index(i): NULL;} inline BOOL
DATANODE::isLink()
{ return val.type==LINK; } inline DATALINK*
DATANODE::qLink()
{ return val.type==LINK? val.pLink: NULL; } inline BOOL
DATANODE::isSeries()
{ return val.type==SERIESLIST; } inline U16
DATANODE::qCount()
{ return val.type==SERIESLIST? val.pList->qCount(): 0; }
```

```
inline DATANODE*
DATANODE::getElement(U16 i)
{ return val.type==SERIESLIST? val.pList->index(i): NULL;} inline BOOL
DATANODE::isReal()
{ return (val.type&NANMASK) != NANMASK; } inline NODETYPE
DATANODE::qType()
{ return isReal()? REAL: NODETYPE(val.type); } endif // datanode_INCLUDED

//
//
//                                          Copyright 1991 - Slate Corporation
// Name:           formcode.hxx
//
// Abstract: include file defining the chart engine formula tokens
//
// Audit:
// 13aug91 buzz Created from old formula.cxx
// ifndef formcode_INCLUDED
define formcode_INCLUDED

//
//      FORMULA CODE LAYOUT
//
//       small integer                      0iii iiii iiii iiii i's = number
(2's comp.)
//
//       variable reference                 10vv vvvv vvvv vvvv v's = id of
variable
//       relative formula jump              110j jjjj jjjj jjjj j's = amount to
jump
//       series reference                   1110 ssss ssss ssss s's = id of series
//       operation                               1111 0ooo oooo oooo o's = id of
operation
//
//       data item:                              1111 1nww xxxx xxxx n = 1 if
non-numeric
//
//             ww = # of words of data-1
//       numeric data items:
//             long integer                 1111 1001 0000 0000 + 32 bits i =
number
//             single precision real        1111 1001 0000 0001 + 32 bits r =
number
//             double precision real        1111 1011 0000 0001 + 64 bits r =
number
//
//       non-numeric data items:
//             formula position             1111 1100 ffff ffff + 16 bits f =
formula pos
//             string pointer                    1111 1101 1000 0000 + 32 bits p
= string ptr
//
// define SMALLINT          U16(0x8000)
```

```
        #define  VARIDREF        U16(0x4000)
        #define  JUMP            U16(0x2000)
        #define  SERIESREF       U16(0x1000)
        #define  EXECUTE                  U16(0x0800)
        #define  INTEGER32       U16(0xF900)
        #define  REAL32                   U16(0xF901)
        #define     REAL64                U16(0xFB01)
        #define  FORMPOS                  U16(0xFC00)
        #define  STRINGPTR       U16(0xFD80)

#define  CONSTANT        U16(0xF800)
        #define  NUMERIC                  U16(0x0400)
        #define  REALFLAG        U16(0x0001)
   define  DATASIZE(_d_)            (((_d_ >> 8) & 3)+1)
        #define  MAKECODE(_a_, _c_)       U16(((_a_-1)&_c_)|(~(_a_|(_a_-1))))
        #define  TESTCODE(_t_, _c_)       (U16(_c_&~(_t_-1)) == U16(~(_t_|(_t_-1))))
        #define  EXTRACT(_a_, _c_) U16(_c_&(_a_-1))
        #define  OPERATION(_o_)           MAKECODE(EXECUTE, _o_)

typedef enum tagFORMTYPE
        {
                UNKNOWN  = 0X00,

NUMFORM  = 0X08,
                STRFORM  = 0X04,
                ANYEXPR  = 0X02,
                ANYLIST  = 0X01,

NUMEXPR  = NUMFORM|ANYEXPR,
                NUMLIST  = NUMFORM|ANYLIST,
                STREXPR  = STRFORM|ANYEXPR,
                STRLIST  = STRFORM|ANYLIST,

XXXFORM      = NUMFORM|STRFORM,
                ANYXXXX  = ANYEXPR|ANYLIST,
                ERRTYPE  = XXXFORM|ANYXXXX,
        } FORMTYPE;

#endif // formcode_INCLUDED

        //
        //                              Copyright 1991 - Slate Corporation
        //
        // Name:         formula.cxx
        //
        // Abstract: methods for chart engine class FORMULA
        //
        // Audit:
        // 05aug91 buzz Created from old verison and notes.
        // 29aug91 buzz Converted to use platform classes in preparation for Penpoint.
        // include "platform.hxx"
        #include "formula.hxx"

        #ifndef atom_INCLUDED
        #include "atom.hxx"
        #endif ifndef variable_INCLUDED
        #include "variable.hxx"
```

```
        #endif ifndef series_INCLUDED
        #include "series.hxx"
        #endif define DATASTACKSIZE 128 inline BOOL
        FORMULA::isVarId()
        {
                return TESTCODE(VARIDREF, code);
        }

        inline BOOL
        FORMULA::isSeriesId()
        {
                return TESTCODE(SERIESREF, code);
        }
        inline BOOL
        FORMULA::isConstant()
        {
                return (!(SMALLINT&code) || (code&CONSTANT)==CONSTANT);
        } inline BOOL
        FORMULA::isEndFrame()
        {
                return EXTRACT(EXECUTE, code) == OPENDFRAME;
        } inline U16
        FORMULA::getOp()
        {
                return EXTRACT(EXECUTE, code);
        } inline U16
        FORMULA::getJump()
        {
                return EXTRACT(JUMP, code) + 1;
        }

        inline U16
        FORMULA::getVarId()
        {
                return EXTRACT(VARIDREF, code);
        }
        inline U16
        FORMULA::getSeriesId()
        {
                return EXTRACT(SERIESREF, code);
        } inline FORMULA*
        FORMULA::pushValue(DATANODE* pNode)
        {
                TRACE(FORMULApushValue);

this = pushLeaf(pNode);
                if (pNode->isLink())
                        *pNode = *VARIABLE::getLinkValue(pNode, pIndex);
                return this;
```

```
        } inline FORMULA*
        FORMULA::pushLink(DATANODE* pNode)
        {
                TRACE(FORMULApushLink);

U16 varId = (this++)->getVarId();
                U16 linkLevel = (this-+)->code;
                U16 indexCount = (this++)->code;
                U16 count = 0;
                U16 indices[MAXNAMESCOPE];

while (count < indexCount) {
                        this++;                 // skip over the JUMP
                        this = pushValue(--pDataStack);
                        indices[count++] = *pDataStack;
                        (pDataStack+-)->unSet();
                } pNode->makeLink(varId, linkLevel, indexCount, indices);
                return this+1;          // skip over the ENDFRAME
        } inline FORMULA*
        FORMULA::pushSwitch(DATANODE* pNode)
        {
                TRACE(FORMULApushSwitch);

FORMULA* switchCode;
                U16 switchCase;

this = (++this)->pushValue(--pDataStack);
                switchCode = this+1;
                switchCase = *pDataStack;
                (pDataStack++)->unSet();
                this += getJump();
                while (!isEndFrame()) {
                        if (!switchCase--)
                                switchCode = this+1;
                        this += getJump();
                }
                switchCode->pushValue(pNode);
                return this+1;
        } inline FORMULA*
        FORMULA::pushCount(DATANODE* pNode)
        {
                TRACE(FORMULApushCount);

U16 count;
                INDEX index = *pIndex;
                this = (++this)->pushLink(--pDataStack);

DATALINK* pLink = pDataStack->qLink();
                index.setLink(pLink->qLevel(), pLink->qCount(), pLink->qIndices());

VARID pVar(pLink->qVarId());
                count = pVar->qCount(&index);
                pNode->set(&count);

(pDataStack++)->unSet();
                return this;
        }
```

```
    // Generate the operation argument specification array.
    #define OPS_ARGSPECS
    #include "opdict.hxx"

inline FORMULA*
    FORMULA::pushOp(DATANODE* pNode)
    {
            TRACE(FORMULApushOp);

DATANODE* pDataStackSave = pDataStack;
            U16 op = (this++)->getOp();
            U16 argc = opArgSpec[op];
            if (argc) {
                    do this = pushValue(--pDataStack);
                    while (--argc);
            }
            else {
                    if (!isEndFrame()) {
                            this = pushList(op);
                            while (!isEndFrame()) {
                                    this = pushList(op);
                                    (pDataStack-+)->compress(op);
                            }
                    }
                    this++;
            }
            pNode->execute(pDataStack, op);
            while (pDataStack < pDataStackSave)
                    (pDataStack-+)->unSet();
            pDataStack = pDataStackSave;

            return this;
    }

VOID
    FORMULA::evaluate(DATANODE* pNode, const INDEX* pNewIndex)
    {
            TRACE(FORMULAevaluate);

const INDEX* pOldIndex = pIndex;
            pIndex = pNewIndex;
            pushLeaf(pNode);

pIndex = pOldIndex;
    }
    VOID
    FORMULA::initStore(const FILEHEADER& fh, RBASE* pRb)
    {
            ATOM::initTable(fh.atomCount, fh.atomStoreSize, pRb);
            SERIES::initDefaults(fh.seriesStoreSize, pRb);

if (fh.formulaStoreSize) {
                    pStore = new U16[fh.formulaStoreSize];
                    pRb->read(pStore, sizeof(U16), fh.formulaStoreSize);
            } pDataStack = new DATANODE[DATASTACKSIZE];
            pDataStack += DATASTACKSIZE;
    }
```

```
        VOID
        FORMULA::clearStore()
        {
            if (pStore)
                delete pStore;

SERIES::clearDefaults();

            ATOM::clearTable();

delete (pDataStack-DATASTACKSIZE);
        }

        FORMULA*
        FORMULA::pushLeaf(DATANODE* pNode)
        {
            TRACE(FORMULApushLeaf);

            U16 i;

if (isVarId())
                return pushLink(pNode);

            if (isSeriesId()) {
                pNode->makeSeries(getSeriesId());
                return this+1;
            }

            if (isConstant())
                return this + pNode->set(P_U16(this));

switch (getOp()) {

            case OPSWITCH:
                return pushSwitch(pNode);

case OPPUSHINDEX:
                i = pIndex->qValAtLevel((++this)->code);
                pNode->set(&i);
                return this+1;

case OPPUSHPREVX:
                i = pIndex->qValAtLevel((++this)->code) - 1;
                pNode->set(&i);
                return this+1;

case OPPUSHNEXTX:
                i = pIndex->qValAtLevel((++this)->code) + 1;
                pNode->set(&i);
                return this+1;

case OPCOUNT:
                return pushCount(pNode);
            default:
                return pushOp(pNode);
            }
        }
        FORMULA*
        FORMULA::pushList(U16 op)
        {
            TRACE(FORMULApushList);
```

```
              DATANODE*   pList;
              DATANODE*   pNode;
              U16 i = 0;

             this = pushLeaf(--pDataStack);
              if (pDataStack->isSeries()) {
                      pList = pDataStack;
                      pNode = pList->getElement(i++);
                      *(--pDataStack) = pNode? *pNode: DATANODE::nullNode();
                      while ((pNode=pList->getElement(i++)) != NULL) {
                              *(--pDataStack) = *pNode;
                              (pDataStack++)->compress(op);
                      }
                      *pList = *pDataStack;
                      (pDataStack++)->unSet();
              }
              else if (pDataStack->isLink()) {
                      pList = pDataStack;
                      pNode = VARIABLE::getLinkElement(pList, pIndex, i++);
                      *(--pDataStack) = pNode? *pNode: DATANODE::nullNode();
                      while ((pNode=VARIABLE::getLinkElement(pList, pIndex, i++)) !=
      NULL) {
                              *(--pDataStack) = *pNode;
                              (pDataStack++)->compress(op);
                      }
                      *pList = *pDataStack;
                      (pDataStack++)->unSet();
              }
              return this;
30    }

//
      //                              Copyright 1991 - Slate Corporation
      //
      // Name:         formula.hxx
      //
      // Abstract: include file for chart engine class FORMULA
      //
      // Audit:
      // 05aug91 buzz     Original.
      // 29aug91 buzz Converted to use platform classes in preparation for Penpoint.
      // ifndef formula_INCLUDED
      #define formula_INCLUDED ifndef records_INCLUDED
      #include "records.hxx"
      #endif
      #ifndef index_INCLUDED
      #include "index.hxx"
      #endif
      #ifndef datanode_INCLUDED
      #include "datanode.hxx"
      #endif
      class FORMULA
      {
      public:
              VOID                    evaluate(DATANODE*, const INDEX*);
```

```
                static FORMULA*     New(U32 pos)      { return
        (FORMULA*)(pStore+pos); }
                static VOID         initStore(const FILEHEADER&, RBASE*);
                static VOID         clearStore();
        private:
                BOOL                isVarId();
                BOOL                isSeriesId();
                BOOL                isConstant();
                BOOL                isEndFrame();
                U16                     getOp();
                U16                     getJump();
                U16                     getVarId();
                U16                     getSeriesId();

FORMULA*            pushLeaf(DATANODE*);
                FORMULA*            pushValue(DATANODE*);
                FORMULA*            pushLink(DATANODE*);
                FORMULA*            pushSwitch(DATANODE*);
                FORMULA*            pushCount(DATANODE*);
                FORMULA*            pushOp(DATANODE*);
                FORMULA*            pushList(U16);

U16                     code;

static DATANODE*    pDataStack;
                static const INDEX* pIndex;
                static P_U16        pStore;
        };

#endif // formula_INCLUDED

//
        //                                  Copyright 1991 - Slate Corporation
        //
        //
        // Name:        group.cxx
        //
        // Abstract: Methods for chart engine class GROUP.
        //
        // Audit:
        // 06aug91 buzz    Created from original version and notes.
        // include "platform.hxx"
        #include "group.hxx"

GROUP*
        GROUP::New(const OBJRECT& or, OBJECT* pParGrp)
        {
                return new GROUP(or, pParGrp);
        }

GROUP::GROUP(const OBJRECT& or, OBJECT* pParGrp)
        : OBJECT(or, pParGrp)
        {
                pFirst = NULL;
        }

GROUP::~GROUP()
        {
                OBJECT* pObj;

while ((pObj = pFirst) != NULL) {
                        pFirst = pObj->qNext();
```

```
                    delete pObj;
            }
    }

    BOOL
    GROUP::insFirst(OBJRECT* pOr, RBASE* pRb)
    {
            OBJECT* pObj;

            pObj = pFirst = (objDict[pOr->type])(*pOr, this);
            pObj->readAttrs(pRb);

while (pRb->read(pOr, sizeof(*pOr), 1)) {
                    if (pOr->level>pObj->qLevel() && !((GROUP*)pObj)->insFirst(pOr,
    pRb))
                            return FALSE;
                    if (pOr->level < pObj->qLevel())
                            return TRUE;
                    pObj = pObj->insNext(pOr, pRb);
            }
            return FALSE;
    }

U16
    GROUP::qType()
    {
            return OBJ_GROUP;
    }

    OBJECT*
    GROUP::qFirst()
    {
            return pFirst;
    }
    VARIABLE**
    GROUP::qAttrs()
    {
            return attrs;
    }

U16
    GROUP::qAttrCount()
    {
            return MAXATTR;
    }

VOID
    GROUP::show(INDEX* pIndex, CANVAS* pCanvas)
    {
            TRACE(GROUPshow);

U16 enumerator = pEnumerator->getEnumValue(pIndex);
            OBJECT* pObj;
55          S32 val;

if (enumerator) {
                    do {
                            pIndex->pushLevel();
                            for (pObj = pFirst; pObj; pObj = pObj->qNext()) {
                                    pObj->show(pIndex, pCanvas);
                                    pIndex->setVal(0);
                            }
                            val = attrs[ATTR_delay]?
                                    S32(attrs[ATTR_delay]->getValue(pIndex)): 0;
```

```
                        pCanvas->delay(val);
                        pIndex->popLevel();
                } while (pIndex->incr() < enumerator);
            ;
    }

VOID
    GROUP::dump(INDEX* pIndex)
    {
        TRACE(GROUPdump);

U16 enumerator = pEnumerator->getEnumValue(pIndex);
        OBJECT* pObj;
        S32 val;

if (enumerator) {
            do {
                pIndex->pushLevel();
                beginDump(pIndex, pName, "{\n");
                for (pObj = pFirst; pObj; pObj = pObj->qNext()) {
                    pObj->dump(pIndex);
                    pIndex->setVal(0);
                }
                val = attrs[ATTR_delay]?
                            S32(attrs[ATTR_delay]->getValue(pIndex)): 0;
                endDump(pIndex->qLevel(), val, "}");
                pIndex->popLevel();
            } while (pIndex->incr() < enumerator);
        }
    }

//
    //                              Copyright 1991 - Slate Corporation
    //
    // Name:        group.hxx
    //
    // Abstract: Include file for chart engine class GROUP
    //
    // Audit:
    // 06aug91 buzz     Created from old version and notes.
    // 29aug91 buzz Converted to use platform classes in preparation for Penpoint.
    // ifndef group_INCLUDED
    #define group_INCLUDED ifndef object_INCLUDED
    #include "object.hxx"
    #endif class GROUP : public OBJECT
    {
    public:
            static GROUP*           New(const OBJRECT&, OBJECT*);
            enum                    { ATTR_x, ATTR_y, ATTR_delay, MAXATTR };

protected:
                                    GROUP() {}
                                    GROUP(const OBJRECT&, OBJECT*);
                                    ~GROUP();
            BOOL                    insFirst(OBJRECT*, RBASE*);
            U16                     qType();
            OBJECT*                 qFirst();
            VARIABLE**              qAttrs();
            U16                     qAttrCount();
```

```
        VOID                    show(INDEX*, CANVAS*);
        VOID                    dump(INDEX*);

OBJECT*                 pFirst;
        VARIABLE*               attrs[MAXATTR];
    };

#endif // group_INCLUDED

    //
    //                          Copyright 1991 - Slate Corporation
    //
    //
    // Name:       index.hxx
    //
    // Abstract: Include file for chart engine class INDEX
    //
    // Audit:
    // 09aug91 buzz Original.
    // 29aug91 buzz Converted to use platform classes in preparation for Penpoint.
    // ifndef index_INCLUDED
    #define index_INCLUDED

    #define MAXNAMESCOPE        16 const U16 UNSET = -1;

class INDEX
    {
    public:
                                INDEX();

VOID                reset();
            VOID                pushLevel();
            U16                 popLevel();
            VOID                setLevel(U16);
            VOID                setLink(U16, U16, P_U16);
            VOID                setRootLevel();
            VOID                setToRoot();
            U16                 qLevel() const;
            U16                 qRootLevel() const;
            BOOL                isAtRoot() const;

            U16                 incrAtLevel(U16);
            U16                 decrAtLevel(U16);
            U16                 setValAtLevel(U16, U16);
            U16                 qValAtLevel(U16) const;

            U16                 incr();
            U16                 decr();
            U16                 setVal(U16);
            U16                 qVal() const;

    private:
            U16                 level;
            U16                 rootLevel;
            U16                 indices[MAXNAMESCOPE+1];
    };
    inline
    INDEX::INDEX()
    {
65      reset();
```

79200.915 -71-

```
                } inline VOID
        INDEX::reset()
        {
                level = rootLevel = UNSET;
                clearMem(indices, sizeof(indices));
        } inline VOID
        INDEX::pushLevel()
        {
                ++level;
        } inline U16
        INDEX::popLevel()
        {
                indices[level--] = 0;
                return qVal();
        } inline VOID
        INDEX::setLevel(U16 i)
        {
                if (level != UNSET && (i < level || i == UNSET))
                        clearMem(&indices[i+1], ((level+1)-(i+1))*sizeof(indices[0]));
                level = i;
        } inline VOID
        INDEX::setLink(U16 linkLevel, U16 indexCount, P_U16 pIndices)
        {
                setLevel(linkLevel);
                indices[level] = 0;
                while (indexCount--)
                        indices[level++] = *pIndices++;
                rootLevel = level;
        } inline VOID
        INDEX::setRootLevel()
        {
                rootLevel = level;
        } inline VOID
        INDEX::setToRoot()
        {
                level = rootLevel;
        } inline U16
        INDEX::qLevel() const
        {
                return level;
        } inline U16
        INDEX::qRootLevel() const
        {
                return rootLevel;
        } inline BOOL
```

```
INDEX::isAtRoot() const
{
        return level == rootLevel;
} inline U16
INDEX::incrAtLevel(U16 i)
{
        return (level != UNSET)? ++indices[i]: UNSET;
} inline U16
INDEX::decrAtLevel(U16 i)
{
        return (level != UNSET)? --indices[i]: UNSET;
} inline U16
INDEX::setValAtLevel(U16 val, U16 i)
{
        return (level != UNSET)? indices[i] = val: UNSET;
} inline U16
INDEX::qValAtLevel(U16 i) const
{
        return (level != UNSET && i <= level)? indices[i] : UNSET;
} inline U16
INDEX::incr()
{
        return (level != UNSET)? ++indices[level]: UNSET;
} inline U16
INDEX::decr()
{
        return (level != UNSET)? --indices[level]: UNSET;
} inline U16
INDEX::setVal(U16 val)
{
        return (level != UNSET)? indices[level] = val: UNSET;
} inline U16
INDEX::qVal() const
{
        return (level != UNSET)? indices[level]: UNSET;
} endif // index_INCLUDED

//
//                              Copyright 1991 - Slate Corporation
//
// Name:        objdefs.cxx
//
// Abstract: Autogenerated code and methods for derived objects
//
// Audit:
// 01aug91 buzz Created for chart engine.
// 29aug91 buzz Converted to use platform classes in preparation for Penpoint.
```

```
// include "platform.hxx"

ifndef group_INCLUDED
#include "group.hxx"
endif define OBJ_CLASSMETHODS
include "objdict.hxx"

#define OBJ_OBJDICT
#include "objdict.hxx"

#define GETVALUE(_t,_a)                 \
                        (attrs[_a]?     \
                                (_t)attrs[_a]->getValue(pIndex):\
                                (_t)0)

#define DUMPVALUE(_a,_i) \
                        (attrs[ATTR_##_a]? \
                                dumpValue(_i? pIndex->qLevel(): 0, \
                                        #_a, (P_STRING)attrs[ATTR_##_a]-
>getValue(pIndex)):\
                                _i)

// code for individualized class members here
U16
polyTrim(P_S16 pPoly, U16 n)
{
        P_S16 p1 = pPoly;
        P_S16 p2 = pPoly+2;
        U16 count = n;

while (count--) {
                if (*p1 == *p2 && *(p1+1) == *(p2+1))
                        n--;
                else {
                        p1 += 2;
                        *p1 = *p2;
                        *(p1+1) = *(p2+1);
                }
                p2 += 2;
        }
        p1 += 2;
        *p1 = *p2;
        *(p1+1) = *(p2+1);
        return n;
}

VOID
POLY::show(INDEX* pIndex, CANVAS* pCanvas)
{
        TRACE(POLYshow);

P_S16           pPoly;
        P_S16           pPt;
        RGB             color;
        RGB             color3;
        P_STRING        pat;
        U16             weight;
        U16             count;
        U16             index;
```

```
        S32             interval;
        U16             enumerator = pEnumerator->getEnumValue(pIndex);

if (!enumerator)
            return;

do {
            pIndex->pushLevel();

pIndex->setRootLevel();
            count = attrs[ATTR_x]? attrs[ATTR_x]->qCount(pIndex): 0;
            index = attrs[ATTR_y]? attrs[ATTR_y]->qCount(pIndex): 0;
            if (count < index)
                count = index;
            pPt = pPoly = pCanvas->getPointArray(count);
            *pPt = *(pPt+1) = 0;
            for (index = 0; index < count; index++) {
                *pPt++ = (S32)attrs[ATTR_x]->getElement(pIndex, index);
                *pPt++ = (S32)attrs[ATTR_y]->getElement(pIndex, index);
            }
            *pPt++ = *pPoly;
            *pPt = *(pPoly+1);
            count = polyTrim(pPoly, count);

pat = GETVALUE(P_STRING, ATTR_fillPattern);
            if (!pat)
                pat = "SOLID";
            if (pCanvas->setPattern(pat)) {
                color = GETVALUE(RGB, ATTR_fillColor);
                color2 = GETVALUE(RGB, ATTR_fillColor2);
                if (!color && !color2)
                    color = RGB(0,0,0);
                pCanvas->setColor(color);
                pCanvas->setColor2(color2);
                weight = GETVALUE(U16, ATTR_lineWeight);
                pCanvas->setLineWeight(weight);

pCanvas->polyFill(pPoly, count);
            } weight = GETVALUE(U16, ATTR_lineWeight);
            if (weight) {
                pat = GETVALUE(P_STRING, ATTR_linePattern);
                if (!pat)
                    pat = "SOLID";
                if (pCanvas->setPattern(pat)) {
                    pCanvas->setLineWeight(weight);
                    color = GETVALUE(RGB, ATTR_lineColor);
                    color2 = GETVALUE(RGB, ATTR_lineColor2);
                    if (!color && !color2)
                        color = RGB(0,0,0);
                    pCanvas->setColor(color);
                    pCanvas->setColor2(color2);

pCanvas->polyDraw(pPoly, count);
                }
            } interval = GETVALUE(S32, ATTR_delay);
            pCanvas->delay(interval);

pIndex->popLevel();
        } while (pIndex->incr() < enumerator);

pCanvas->reset();
```

```
        }
   VOID
   POLY::dump(INDEX* pIndex)
   {
        TRACE(POLYdump);

U16             count;
        U16             index;
        S32             interval;
        U16             enumerator = pEnumerator->getEnumValue(pIndex);
        BOOL            indent;

if (!enumerator)
                return;

do {
                pIndex->pushLevel();
                beginDump(pIndex, pName, "POLY(");
                pIndex->setRootLevel();
                count = attrs[ATTR_x]? attrs[ATTR_x]->qCount(pIndex): 0;
                index = attrs[ATTR_y]? attrs[ATTR_y]->qCount(pIndex): 0;
                if (count < index)
                        count = index;
                for (index = 0; index < count; index++) {
                        dumpCoord((S32)attrs[ATTR_x]->getElement(pIndex, index),
                                  (S32)attrs[ATTR_y]->getElement(pIndex,
   index));
                } indent = DUMPVALUE(fillColor, TRUE);
                indent = DUMPVALUE(fillPattern, indent);
                indent = DUMPVALUE(fillColor2, indent);
35              indent = DUMPVALUE(lineColor, TRUE);
                indent = DUMPVALUE(linePattern, indent);
                indent = DUMPVALUE(lineColor2, indent);
                indent = DUMPVALUE(lineWeight, indent);

40              interval = GETVALUE(S32, ATTR_delay);
                endDump(0, interval, ")");
                pIndex->popLevel();
        } while (pIndex->incr() < enumerator);
   }
   VOID
   LINE::show(INDEX* pIndex, CANVAS* pCanvas)
   {
        TRACE(LINEshow);
        P_S16           pts = pCanvas->getPointArray(2);
        RGB             color;
        RGB             color2;
        P_STRING        pat;
55      U16             weight;
        S32             interval;
        U16             enumerator = pEnumerator->getEnumValue(pIndex);

if (!enumerator)
60              return;

do {
                pIndex->pushLevel();

65              pts[0] = GETVALUE(S32, ATTR_x1);
```

```
                    pts[1] = GETVALUE(S32, ATTR_y1);
                    pts[2] = GETVALUE(S32, ATTR_x2);
                    pts[3] = GETVALUE(S32, ATTR_y2);

weight = GETVALUE(U16, ATTR_lineWeight);
                    if (weight) {
                            pat = GETVALUE(P_STRING, ATTR_linePattern);
                            if (!pat)
                                    pat = "SOLID";
                            if (pCanvas->setPattern(pat)) {
                                    pCanvas->setLineWeight(weight);
                                    color = GETVALUE(RGB, ATTR_lineColor);
                                    color2 = GETVALUE(RGB, ATTR_lineColor2);
                                    if (!color && !color2)
                                            color = RGB(0,0,0);
                                    pCanvas->setColor(color);
                                    pCanvas->setColor2(color2);

pCanvas->lineDraw(pts);
                            }
                    } interval = GETVALUE(S32, ATTR_delay);
                    pCanvas->delay(interval);

pIndex->popLevel();
            } while (pIndex->incr() < enumerator);

pCanvas->reset();
    }

VOID
    LINE::dump(INDEX* pIndex)
    {
            TRACE(LINEdump);

S32             interval;
            BOOL            indent;
            U16             enumerator = pEnumerator->getEnumValue(pIndex);

if (!enumerator)
                    return;

do {
                    pIndex->pushLevel();
                    beginDump(pIndex, pName, "LINE{");

dumpCoord(GETVALUE(S32, ATTR_x1), GETVALUE(S32, ATTR_y1));
                    dumpCoord(GETVALUE(S32, ATTR_x2), GETVALUE(S32, ATTR_y2));

indent = DUMPVALUE(lineColor, TRUE);
                    indent = DUMPVALUE(linePattern, indent);
                    indent = DUMPVALUE(lineColor2, indent);
                    indent = DUMPVALUE(lineWeight, indent);

interval = GETVALUE(S32, ATTR_delay);
                    endDump(0, interval, "}");
                    pIndex->popLevel();
            } while (pIndex->incr() < enumerator);
    }

VOID
    RECT::show(INDEX* pIndex, CANVAS* pCanvas)
    {
            TRACE(RECTshow);
```

```
        P_S16           pts       = pCanvas->getPointArray(2);
        RGB             color;
        RGB             color2;
        P_STRING        pat;
        U16             weight;
        S32             interval;
        U16             enumerator = pEnumerator->getEnumValue(pIndex);

if (!enumerator)
                return;

do {
                pIndex->pushLevel();

pts[0] = GETVALUE(S32, ATTR_x1);
                pts[1] = GETVALUE(S32, ATTR_y1);
                pts[2] = GETVALUE(S32, ATTR_x2);
                pts[3] = GETVALUE(S32, ATTR_y2);

pat = GETVALUE(P_STRING, ATTR_fillPattern);
                if (!pat)
                        pat = "SOLID";
                if (pCanvas->setPattern(pat)) {
                        color  = GETVALUE(RGB, ATTR_fillColor);
                        color2 = GETVALUE(RGB, ATTR_fillColor2);
                        if (!color && !color2)
                                color = RGB(0,0,0);
                        pCanvas->setColor(color);
                        pCanvas->setColor2(color2);
                        weight = GETVALUE(U16, ATTR_lineWeight);
                        pCanvas->setLineWeight(weight);

pCanvas->rectFill(pts);
                } weight = GETVALUE(U16, ATTR_lineWeight);
                if (weight) {
                        pat = GETVALUE(P_STRING, ATTR_linePattern);
                        if (!pat)
                                pat = "SOLID";
                        if (pCanvas->setPattern(pat)) {
                                pCanvas->setLineWeight(weight);
                                color  = GETVALUE(RGB, ATTR_lineColor);
                                color2 = GETVALUE(RGB, ATTR_lineColor2);
                                if (!color && !color2)
                                        color = RGB(0,0,0);
                                pCanvas->setColor(color);
                                pCanvas->setColor2(color2);

pCanvas->rectDraw(pts);
                        }
                } interval = GETVALUE(S32, ATTR_delay);
                pCanvas->delay(interval);

pIndex->popLevel();
        } while (pIndex->incr() < enumerator);

pCanvas->reset();
}

VOID
RECT::dump(INDEX* pIndex)
```

```
        {
            TRACE(RECTdump);

BOOL        indent;
            S32         interval;
            U16         enumerator = pEnumerator->getEnumValue(pIndex);

if (!enumerator)
                return;

do {
                pIndex->pushLevel();
                beginDump(pIndex, pName, "RECT(");

dumpCoord(GETVALUE(S32, ATTR_x1), GETVALUE(S32, ATTR_y1));
                dumpCoord(GETVALUE(S32, ATTR_x2), GETVALUE(S32, ATTR_y2));

indent = DUMPVALUE(fillColor, TRUE);
                indent = DUMPVALUE(fillPattern, indent);
                indent = DUMPVALUE(fillColor2, indent);
                indent = DUMPVALUE(lineColor, TRUE);
                indent = DUMPVALUE(linePattern, indent);
                indent = DUMPVALUE(lineColor2, indent);
                indent = DUMPVALUE(lineWeight, indent);

interval = GETVALUE(S32, ATTR_delay);
                endDump(0, interval, ")");
                pIndex->popLevel();
            } while (pIndex->incr() < enumerator);
        }

VOID
        ELLIPSE::show(INDEX* pIndex, CANVAS* pCanvas)
        {
            TRACE(ELLIPSEshow);

P_S16       pts = pCanvas->getPointArray(4);
            RGB         color;
            RGB         color2;
            P_STRING    pat;
            U16         weight;
            S32         interval;
            U16         enumerator = pEnumerator->getEnumValue(pIndex);

if (!enumerator)
                return;

do {
                pIndex->pushLevel();

pts[0] = GETVALUE(S32, ATTR_x1);
                pts[1] = GETVALUE(S32, ATTR_y1);
                pts[2] = GETVALUE(S32, ATTR_x2);
                pts[3] = GETVALUE(S32, ATTR_y2);
                pts[4] = GETVALUE(S32, ATTR_rx1);
                pts[5] = GETVALUE(S32, ATTR_ry1);
                pts[6] = GETVALUE(S32, ATTR_rx2);
                pts[7] = GETVALUE(S32, ATTR_ry2);

pat = GETVALUE(P_STRING, ATTR_fillPattern);
                if (!pat)
                    pat = "SOLID";
                if (pCanvas->setPattern(pat)) {
                    color = GETVALUE(RGB, ATTR_fillColor);
                    color2 = GETVALUE(RGB, ATTR_fillColor2);
```

```
                if (!color && !color2)
                        color = RGB(0,0,0);
                pCanvas->setColor(color);
                pCanvas->setColor2(color2);
                weight = GETVALUE(U16, ATTR_lineWeight);
                pCanvas->setLineWeight(weight);

pCanvas->ellipseFill(pts);
        } weight = GETVALUE(U16, ATTR_lineWeight);
        if (weight) {
                pat = GETVALUE(P_STRING, ATTR_linePattern);
                if (!pat)
                        pat = "SOLID";
                if (pCanvas->setPattern(pat)) {
                        pCanvas->setLineWeight(weight);
                        color = GETVALUE(RGB, ATTR_lineColor);
                        color2 = GETVALUE(RGB, ATTR_lineColor2);
                        if (!color && !color2)
                                color = RGB(0,0,0);
                        pCanvas->setColor(color);
                        pCanvas->setColor2(color2);

pCanvas->ellipseDraw(pts);
                }
        } interval = GETVALUE(S32, ATTR_delay);
        pCanvas->delay(interval);

pIndex->popLevel();
    } while (pIndex->incr() < enumerator);
    pCanvas->reset();
}

VOID
ELLIPSE::dump(INDEX* pIndex)
{
        TRACE(ELLIPSEdump);

BOOL            indent;
        S32                     interval;
        U16                     enumerator = pEnumerator->getEnumValue(pIndex);

if (!enumerator)
                return;

do {
                pIndex->pushLevel();
                beginDump(pIndex, pName, "ELLIPSE(");

dumpCoord(GETVALUE(S32, ATTR_x1), GETVALUE(S32, ATTR_y1));
                dumpCoord(GETVALUE(S32, ATTR_x2), GETVALUE(S32, ATTR_y2));
                dumpCoord(GETVALUE(S32, ATTR_rx1), GETVALUE(S32, ATTR_ry1));
                dumpCoord(GETVALUE(S32, ATTR_rx2), GETVALUE(S32, ATTR_ry2));

indent = DUMPVALUE(fillColor, TRUE);
                indent = DUMPVALUE(fillPattern, indent);
                indent = DUMPVALUE(fillColor2, indent);
                indent = DUMPVALUE(lineColor, TRUE);
                indent = DUMPVALUE(linePattern, indent);
                indent = DUMPVALUE(lineColor2, indent);
                indent = DUMPVALUE(lineWeight, indent);
```

```
                interval = GETVALUE(S32, ATTR_delay);
                endDump(0, interval, ")");
                pIndex->popLevel();
        } while (pIndex->incr() < enumerator);
}

VOID
LABEL::show(INDEX* pIndex, CANVAS* pCanvas)
{
        TRACE(LABELshow);

P_S16       pts = pCanvas->getPointArray(1);
        RGB         color;
        RGB         color2;
        P_STRING    pat;
        FONT        font;
        U16         size;
        S16         angle;
        U16         align;
        S32         interval;
        P_STRING    pString;
        U16         enumerator = pEnumerator->getEnumValue(pIndex);

if (!enumerator)
                return;

do {
                pIndex->pushLevel();

pts[0] = GETVALUE(S32, ATTR_x1);
                pts[1] = GETVALUE(S32, ATTR_y1);

pString = GETVALUE(P_STRING, ATTR_content);
                if (!pString)
                        pString = GETVALUE(P_STRING, ATTR_value);

pat = GETVALUE(P_STRING, ATTR_fillPattern);
                if (!pat)
                        pat = "SOLID";
                if (!pCanvas->setPattern(pat)) {
                        color = GETVALUE(RGB, ATTR_fillColor);
                        color2 = GETVALUE(RGB, ATTR_fillColor2);
                        if (!color && !color2)
                           color = RGB(0,0,0);
                        pCanvas->setColor(color);
                        pCanvas->setColor2(color2);
                        font = GETVALUE(S32, ATTR_font);
                        pCanvas->setFont(font);
                        size = GETVALUE(U16, ATTR_fontSize);
                        pCanvas->setFontSize(size);
                        angle = GETVALUE(S32, ATTR_fontAngle);
                        pCanvas->setFontAngle(angle);
                        align = GETVALUE(U16, ATTR_align);

pCanvas->textFill(pts, align, pString);
                } interval = GETVALUE(S32, ATTR_delay);
                pCanvas->delay(interval);

pIndex->popLevel();
        } while (pIndex->incr() < enumerator);

pCanvas->reset();
```

```
        }
    VOID
    LABEL::dump(INDEX* pIndex)
    {
        TRACE(LABELdump);

BOOL indent;
        S32 interval;
10      P_STRING pString;
        U16 enumerator = pEnumerator->getEnumValue(pIndex);

if (!enumerator)
              return;
15
        do {
              pIndex->pushLevel();
              beginDump(pIndex, pName, "LABEL(");

              dumpCoord(GETVALUE(S32, ATTR_x1), GETVALUE(S32, ATTR_y1));

indent = DUMPVALUE(fillColor, TRUE);
              indent = DUMPVALUE(fillPattern, indent);
              indent = DUMPVALUE(fillColor2, indent);
              indent = DUMPVALUE(font, indent);
              indent = DUMPVALUE(fontSize, indent);
              indent = DUMPVALUE(fontAngle, indent);
              indent = DUMPVALUE(align, indent);
              indent = DUMPVALUE(content, TRUE);
              indent = DUMPVALUE(value, indent);

endDump(0, interval, ")");
              pIndex->popLevel();
        } while (pIndex->incr() < enumerator);
    }
    //
    //
    //                              Copyright 1991 - Slate Corporation
    //
    // Name:        objdefs.hxx
    //
    // Abstract: object class definition data
    //
    // Audit:
    // 01aug91 buzz Created from objdict.hxx.
    //

BEGINOBJ(POLY)
                   ATTRIBUTE(x, NUMLIST)
                   ATTRIBUTE(y, NUMLIST)
                   ATTRIBUTE(fillColor, NUMEXPR)
                   ATTRIBUTE(fillPattern, STREXPR)
                   ATTRIBUTE(fillColor2, NUMEXPR)
                   ATTRIBUTE(lineColor, NUMEXPR)
                   ATTRIBUTE(linePattern, STREXPR)
                   ATTRIBUTE(lineColor2, NUMEXPR)
                   ATTRIBUTE(lineWeight, NUMEXPR)
                   ATTRIBUTE(delay, NUMEXPR)
    ENDOBJ(POLY)
    BEGINOBJ(LINE)
                   ATTRIBUTE(x1, NUMEXPR)
                   ATTRIBUTE(y1, NUMEXPR)
                   ATTRIBUTE(x2, NUMEXPR)
                   ATTRIBUTE(y2, NUMEXPR)
```

```
                    ATTRIBUTE(lineColor,    NUMEXPR)
                    ATTRIBUTE(linePattern,  STREXPR)
                    ATTRIBUTE(lineColor2,   NUMEXPR)
                    ATTRIBUTE(lineWeight,   NUMEXPR)
                    ATTRIBUTE(delay,        NUMEXPR)
ENDOBJ(LINE)

BEGINOBJ(RECT)
                    ATTRIBUTE(x1,           NUMEXPR)
                    ATTRIBUTE(y1,           NUMEXPR)
                    ATTRIBUTE(x2,           NUMEXPR)
                    ATTRIBUTE(y2,           NUMEXPR)
                    ATTRIBUTE(fillColor,    NUMEXPR)
                    ATTRIBUTE(fillPattern,  STREXPR)
                    ATTRIBUTE(fillColor2,   NUMEXPR)
                    ATTRIBUTE(lineColor,    NUMEXPR)
                    ATTRIBUTE(linePattern,  STREXPR)
                    ATTRIBUTE(lineColor2,   NUMEXPR)
                    ATTRIBUTE(lineWeight,   NUMEXPR)
                    ATTRIBUTE(delay,        NUMEXPR)
ENDOBJ(RECT)

BEGINOBJ(ELLIPSE)
                    ATTRIBUTE(x1,           NUMEXPR)
                    ATTRIBUTE(y1,           NUMEXPR)
                    ATTRIBUTE(x2,           NUMEXPR)
                    ATTRIBUTE(y2,           NUMEXPR)
                    ATTRIBUTE(rx1,          NUMEXPR)
                    ATTRIBUTE(ry1,          NUMEXPR)
                    ATTRIBUTE(rx2,          NUMEXPR)
                    ATTRIBUTE(ry2,          NUMEXPR)
                    ATTRIBUTE(fillColor,    NUMEXPR)
                    ATTRIBUTE(fillPattern,  STREXPR)
                    ATTRIBUTE(fillColor2,   NUMEXPR)
                    ATTRIBUTE(lineColor,    NUMEXPR)
                    ATTRIBUTE(linePattern,  STREXPR)
                    ATTRIBUTE(lineColor2,   NUMEXPR)
                    ATTRIBUTE(lineWeight,   NUMEXPR)
                    ATTRIBUTE(delay,        NUMEXPR)
ENDOBJ(ELLIPSE)

BEGINOBJ(LABEL)
                    ATTRIBUTE(x1,           NUMEXPR)
                    ATTRIBUTE(y1,           NUMEXPR)
                    ATTRIBUTE(value,        NUMEXPR)
                    ATTRIBUTE(content,      STREXPR)
                    ATTRIBUTE(fillColor,    NUMEXPR)
                    ATTRIBUTE(fillPattern,  STREXPR)
                    ATTRIBUTE(fillColor2,   NUMEXPR)
                    ATTRIBUTE(font,         NUMEXPR)
                    ATTRIBUTE(fontSize,     NUMEXPR)
                    ATTRIBUTE(fontAngle,    NUMEXPR)
                    ATTRIBUTE(align,        NUMEXPR)
                    ATTRIBUTE(delay,        NUMEXPR)
ENDOBJ(LABEL)

//
//
//                              Copyright 1991 - Slate Corporation
//
// Name:        objdict.hxx
//
// Abstract: autogenerated code for chart graphics objects
//
// Audit:
// 17apr91 buzz    Original.
```

79200.915

Express Mail Label
No. RB717153393US

```
// 28apr91 buzz Changed to use VARIDs to point to VARIABLEs.
// 24jul91 buzz New version for Parser derived from Chart object.cxx
// 01aug91 buzz Added selector macros and renamed from objdict.cxx
//

// Generate class declaration for each object.
#if defined(OBJ_CLASSDEFS)
undef OBJ_CLASSDEFS define BEGINFILE define BEGINOBJ(_n_)                                               \
class _n_ : public OBJECT                                           \
{                                                                   \
public:                                                             \
        static _n_*             New(const OBJRECT&, OBJECT*);       \
        enum {                                                      \
#define ATTRIBUTE(_n_,_t_)      ATTR_##_n_,
#define ENDOBJ(_n_)             MAXATTR };                          \
protected:                                                          \
                                                                    \
                                _n_(const OBJRECT& or, OBJECT* pGrp)\
                                        : OBJECT(or, pGrp) {}       \
                                ~_n_();                             \
        U16                     qType();                            \
        VARIABLE**              qAttrs();                           \
        U16                     qAttrCount();                       \
        VOID                    show(INDEX*, CANVAS*);              \
        VOID                    dump(INDEX*);                       \
                                                                    \
        VARIABLE*               attrs[MAXATTR];                     \
};

#define ENDFILE

// Generate a New(), qType(), qAttrs() and qAttrCount() for each object.
#elif defined(OBJ_CLASSMETHODS)
undef OBJ_CLASSMETHODS define BEGINFILE define BEGINOBJ(_n_)                                               \
```

```
_n_*                                                        \
_n_::New(const OBJRECT& or, OBJECT* pGrp)                   \
{                                                           \
        return new _n_(or, pGrp);                           \
}                                                           \
                                                            \
                                                            \
_n_::~_n_()                                                 \
{                                                           \
                                                            \
}                                                           \
                                                            \
                                                            \
U16                                                         \
                                                            \
_n_::qType()                                                \
{                                                           \
                                                            \
        return OBJ_##_n_;                                   \
                                                            \
}                                                           \
                                                            \
                                                            \
VARIABLE**                                                  \
                                                            \
_n_::qAttrs()                                               \
{                                                           \
                                                            \
        return attrs;                                       \
}                                                           \
                                                            \
                                                            \
U16                                                         \
                                                            \
_n_::qAttrCount()                                           \
                                                            \
{                                                           \
                                                            \
        return MAXATTR;                                     \
}
#define ATTRIBUTE(_n_,_t_)
#define ENDOBJ(_n_)
define ENDFILE // Generate the object tag name enumeration.
elif defined(OBJ_OBJNAMES)
undef OBJ_OBJNAMES define BEGINFILE              enum tagObjNames { OBJ_GRCUP,
define BEGINOBJ(_n_)          OBJ_##_n_,
```

```
        #define   ATTRIBUTE(_n_,_t_)
        #define   ENDOBJ(_n_)
        #define   ENDFILE                    MAXOBJNAME };

        // Generate the object ctor array
        //     an array of object constructors, one for each object.
        #elif defined(OBJ_OBJDICT)
        #undef OBJ_OBJDICT
        #define   BEGINFILE                  P_CTOR objDict[OBJECT::MAXOBJNAME+1] = { \
                                                       GROUP::New,
        #define   BEGINOBJ(_n_)              _n_##::New,
        #define   ATTRIBUTE(_n_,_t_)
        #define   ENDOBJ(_n_)
        #define   ENDFILE                    0 };

#endif

        BEGINFILE
        #include "objdefs.hxx"
        ENDFILE undef    BEGINFILE
        #undef    BEGINOBJ
        #undef    ATTRIBUTE
        #undef    ENDOBJ
        #undef    ENDFILE
        //
        //                                   Copyright 1991 - Slate Corporation
        //
        // Name:           object.cxx
        //
        // Abstract: Methods for chart engine class OBJECT.
        //
        // Audit:
        // 06aug91 buzz Created from original and notes.
        // 29aug91 buzz Converted to use platform classes in preparation for Penpoint.
        // include "platform.hxx"
        #include "object.hxx"

        #ifndef atom_INCLUDED
        #include "atom.hxx"
        #endif

OBJECT::OBJECT(const OBJRECT& or, OBJECT* pParObj)
        {
                pName = *ATOM(or.hName);
                pNext = NULL;
                pParent = pParObj;
                pEnumerator = *VARID(or.enumVar);
                level = or.level;
        }

OBJECT*
        OBJECT::insNext(OBJRECT* pOr, RBASE* pRb)
        {
                pNext = (objDict[pOr->type])(*pOr, pParent);
                pNext->readAttrs(pRb);
                return pNext;
        }
```

```
VOID
OBJECT::readAttrs(RBASE* pRb)
{
        VARIABLE** ppVar = qAttrs();
        U16 count = qAttrCount();
        U16 varId;

while (count--) {
                pRb->read(&varId, sizeof(varId), 1);
                *(ppVar++) = *VARID(varId);
        }
}

OBJECT*
OBJECT::qFirst()
{
        return NULL;
}

//
//                              Copyright 1991 - Slate Corporation
//
// Name:         object.hxx
//
// Abstract: Include file for chart engine OBJECT class
//
// Audit:
// 06aug91 buzz Created from original and notes.
// 29aug91 buzz Converted to use platform classes in preparation for Penpoint.
// ifndef object_INCLUDED
define object_INCLUDED ifndef variable_INCLUDED
include "variable.hxx"
endif class OBJECT
{
public:
        // Generate the object name enum.
        #define OBJ_OBJNAMES
        #include "objdict.hxx"

protected:
                                        OBJECT() {}
                                        OBJECT(const OBJRECT&, OBJECT*);
        virtual                         ~OBJECT() = 0;
        OBJECT*                         insNext(OBJRECT*, RBASE*);
        VOID                            readAttrs(RBASE*);
        virtual U16                     qType() = 0;
        virtual   OBJECT*               qFirst();
        OBJECT*                         qNext()
        { return pNext; }
        OBJECT*                         qParent()               {
return pParent; }
        U16                             qLevel()                {
return level; }
        virtual       VARIABLE**        qAttrs() = 0;
        virtual U16                     qAttrCount() = 0;
        virtual VOID    show(INDEX*, CANVAS*) = 0;
        virtual VOID    dump(INDEX*) = 0;
```

```
        P_STRING            pName;
        OBJECT*                pNext;
        OBJECT*                pParent;
        VARIABLE*           pEnumerator;
        U16                    level;
};

typedef OBJECT*     (*P_CTOR)(const OBJRECT&, OBJECT*);
extern P_CTOR       objDict[OBJECT::MAXOBJNAME+1];

// Generate the definitions of the derived object classes.
#define OBJ_CLASSDEFS
#include "objdict.hxx"

#endif // object_INCLUDED

//
//                          Copyright 1991 - Slate Corporation
//
// Name:        opdefs.hxx
//
// Abstract: operation definitions for formula engine
//
// Audit:
// 01aug91 buzz Created from opdict.hxx
// define UNARYOP(_o)   BEGINOP(_o,1,NUMEXPR) ARG(NUMEXPR) ENDOP(_o)
define BINARYOP(_o)  BEGINOP(_o,2,NUMEXPR) ARG(NUMEXPR) ARG(NUMEXPR) ENDOP(_o)
#define LISTOP(_o)    BEGINOP(_o,0,NUMEXPR) ARG(NUMFORM) ENDOP(_o)

UNARYOP(NEG)
UNARYOP(ABS)
UNARYOP(FLOOR)
UNARYOP(CEIL)
UNARYOP(SIN)
UNARYOP(COS)
UNARYOP(TAN)
UNARYOP(ASIN)
UNARYOP(ACOS)
UNARYOP(ATAN)
UNARYOP(LN)
UNARYOP(LOG)
UNARYOP(SQRT)
UNARYOP(EXP)
UNARYOP(FRAC)
UNARYOP(INT)
UNARYOP(NOT)

BINARYOP(ADD)
BINARYOP(SUB)
BINARYOP(MULT)
BINARYOP(DIV)
BINARYOP(MOD)
BINARYOP(POW)
BINARYOP(ROUND)
BINARYOP(EQ)
BINARYOP(NE)
BINARYOP(GT)
BINARYOP(GE)
BINARYOP(LT)
BINARYOP(LE)
BINARYOP(AND)
BINARYOP(OR)
```

```
    LISTOP(MAX)
    LISTOP(MIN)
    LISTOP(SUM)
    LISTOP(AVG)

BEGINOP(FONT,1,NUMEXPR)  ARG(STREXPR)  ENDOP(FONT)

BEGINOP(TEXTWIDTH,3,NUMEXPR)
                       ARG(NUMEXPR) ARG(NUMEXPR) ARG(STREXPR) ENDOP(TEXTWIDTH)

BEGINOP(TEXTHEIGHT,2,NUMEXPR) ARG(NUMEXPR) ARG(NUMEXPR) ENDOP(TEXTHEIGHT)

BEGINOP(RGB,3,NUMEXPR) ARG(NUMEXPR) ARG(NUMEXPR) ARG(NUMEXPR) ENDOP(RGB)
    BEGINOP(GREY,1,NUMEXPR) ARG(NUMEXPR) ENDOP(GREY)

BEGINOP(PI,0,NUMEXPR) ENDOP(PI)

    //
    //                          Copyright 1991 - Slate Corporation
    //
    // Name:         opdefs.hxx
    //
25  // Abstract: operation definitions for formula engine
    //
    // Audit:
    // 01aug91 buzz Created from opdict.hxx
    //
    // Generate an array of pointers to the argument type list for each operation.
    #if defined(OPS_ARGLISTS)
    #undef OPS_ARGLISTS
    #define BEGINFILE
    #define BEGINOP(_op_,_c_,_t_)    static FORMTYPE _op_##_argTypes[] = {
    #define ARG(_arg_)                  _arg_,
    #define ENDOP(_op_)                 ERRTYPE };
    #define ENDFILE

// Generate the Operation Dictionary, an array of operation definitions.
    #elif defined(OPS_OPDICT)
    #undef OPS_OPDICT
    #define BEGINFILE                  static OPDEF opDict[] = {
    #define BEGINOP(_op_,_c_,_t_)       { " "#_op_##" ( ",_op_##_argTypes,_c_,_t_ },
    #define ARG(_arg_)
    #define ENDOP(_op_)
    #define ENDFILE                     0 };

// Generate the argument array, an array of argument counts for each op.
    #elif defined(OPS_ARGSPECS)
    #undef OPS_ARGSPECS define BEGINFILE                  static U16 opArgSpec[] = {
    #define BEGINOP(_op_,_c_,_t_)       _c_,
    #define ARG(_arg_)
    #define ENDOP(_op_)
    #define ENDFILE                     0 };

// Generate the Operation Enumeration, names for all of the operations.
    #elif defined(OPS_OPTAGS)
```

```
        #undef OPS_OPTAGS define BEGINFILE                   typedef enum tagOpNames {
        #define BEGINOP(_op_,_c_,_t_)       OP##_op_,
        #define ARG(_t_)
        #define ENDOP(_op_)
        #define ENDFILE                         OPMAXOPS,
            \
                                                OPSTOP          =
        EXECUTE-1,\
                                                OPENDFRAME      = OPSTOP-1,
            \
                                                OPPUSHINDEX     = OPSTOP-2, \
                                                OPCOUNT         =
        OPSTOP-3, \
                                                OPSWITCH        = OPSTOP-4,
            \
                                                OPPUSHPREVX     = OPSTOP-5, \
                                                OPPUSHNEXTX     = OPSTOP-6, \
                                                OPPUSHLASTX     = OPSTOP-7, \
                                            } OPNAME;

// Generate the Operation Name array, debug names for all of the operations.
        #elif defined(OPS_OPNAMES)
        #undef OPS_OPNAMES define BEGINFILE                   P_STRING debugNames[] = {
        #define BEGINOP(_op_,_c_,_t_)       STRING(OP##_op_),
        #define ARG(_t_)
        #define ENDOP(_op_)
        #define ENDFILE                         };

35      // Generate the Operation Handler definitions.
        #elif defined(OPS_OPFUNCTS)
        #undef OPS_OPFUNCTS define BEGINFILE
        #define BEGINOP(_op_,_c_,_t_)       VOID OP##_op_(DATANODE*);
        #define ARG(_t_)
        #define ENDOP(_op_)
        #define ENDFILE
        // Generate the Operation Jump table, used to dispatch operations.
        #elif defined(OPS_OPTABLE)
        #undef OPS_OPTABLE
        #define BEGINFILE                   OPFUNCT opTable[OPMAXOPS+1] = {
        #define BEGINOP(_op_,_c_,_t_)       DATANODE::OP##_op_,
        #define ARG(_t_)
        #define ENDOP(_op_)
        #define ENDFILE                         OPFUNCT(0) };
        #endif BEGINFILE
        #include "opdefs.hxx"
        ENDFILE undef BEGINFILE
        #undef BEGINOP
        #undef ARG
        #undef ENDOP
```

```
#undef ENDFILE
//
//
//                                      Copyright 1991 - Slate Corporation
//
// Name:           platform.hxx
//
// Abstract: Include file for platform interface routines
//
// Audit:
// 29aug91  buzz     Original.
// ifndef platform_INCLUDED
define platform_INCLUDED ifndef __STDDEF_H
include <stddef.h>
endif ifndef types_INCLUDED
include "types.hxx"
endif class INDEX;  // for beginDump VOID*       operator new(size_t);
VOID        operator delete(VOID*);
VOID        clearMem(VOID*, U16);
VOID        copyMem(VOID*, VOID*, U16);
S16         compareStr(P_STRING, P_STRING);
VOID        IEEEREALtoP_STRING(P_STRING, IEEEREAL);
VOID        S32toP_STRING(P_STRING, S32);
VOID        beginDump(INDEX*, P_STRING, P_STRING);
VOID        endDump(U16, S32, P_STRING);
BOOL        dumpValue(U16, P_STRING, P_STRING);
VOID        dumpCoord(S32, S32);
VOID        putBytes(P_UNKNOWN, U16, P_UNKNOWN);
VOID        getBytes(P_UNKNOWN, U16, P_UNKNOWN);

#ifdef DEBUG

VOID        callTrace(U16, U16, P_STRING, P_STRING, P_STRING);

#ifdef TRACECALLS
    #define TRACE(_name_)    TRACER T_t(#_name_)
    class TRACER
    {
    public:
                    TRACER(P_STRING n);
                    ~TRACER();
    private:
        static U16   level;
    };
    inline
    TRACER::TRACER(P_STRING n)
    {
        callTrace(0x0002, level, n, "", "");
        level++;
    }
    inline
    TRACER::~TRACER()
    {
        level--;
```

```
        }
#else   // !TRACECALLS
        #define TRACE(_name_)
endif  // TRACECALLS else   // !DEBUG define TRACE(_name_)

endif // DEBUG class R64
{
public:
                R64(S32);
                R64(U16);
                R64(IEEEREAL=0);
                operator S32();
    R64         operator+(R64&);
    R64         operator-(R64&);
    R64         operator*(R64&);
    R64         operator/(R64&);
    BOOL        operator==(R64&);
    BOOL        operator!=(R64&);
    BOOL        operator<(R64&);
    BOOL        operator<=(R64&);
    BOOL        operator>(R64&);
    BOOL        operator>=(R64&);
    R64         opAbs();
    R64         opFloor();
    R64         opCeil();
    R64         opRound(R64);
    R64         opPow(R64);
    R64         opSin();
    R64         opCos();
    R64         opTan();
    R64         opAcos();
    R64         opAsin();
    R64         opAtan();
    R64         opLn();
    R64         opLog();
    R64         opSqrt();
    R64         opExp();
    R64         opFrac();
    static R64 opPI();

private:
    IEEEREAL real;
};

typedef R64* P_R64;

class RBASE
{
public:                         RBASE(VOID* pB);
                                ~RBASE();

U16                         read(VOID*, U16, U16);

private:
    VOID*           pBase;
};

class RGB
```

```
{
public:
                                        RGB()                           {
    *P_S32(this) = 0; }
                                        RGB(U16 r, U16 g, U16 b) {
    red=r;grn=g,blu=b;opaque=~0;}
                                        RGB(S32 num)                    { *P_S32(this) =
    num; }
                                        operator S32()                  { return
    *P_S32(this); }
        U8                              qRed()                          {
    return red; }
        U8                              qGrn()                          {
    return grn; }
        U8                              qBlu()                          {
    return blu; } private:
        S32                             red        : 8;
        S32                             grn        : 8;
        S32                             blu        : 8;
        S32                             opaque     : 8;
};

class FONT
{
public:
                                        FONT(P_STRING);
                                        FONT(S32 f=0)                   { fontId =
    f; }
                                        operator S32()                  { return
    fontId; }
private:
        S32                             fontId;
};

enum HMODE                  // Horizontal align modes:
{
        HALEFT          = 0x00,
        HACENTER        = 0x20,
        HADECIMAL       = 0x40,
        HARIGHT         = 0x80,
        HAALL           = 0xf0,
};

enum VMODE                  // Vertical align modes:
{
        VATOP           = 0xC0,
        VAXPOS          = 0x01,
        VAMIDDLE        = 0x02,
        VABASELINE      = 0x04,
        VABOTTOM        = 0x08,
        VAALL           = 0x0F,
};

class CANVAS
{
public:
                                        CANVAS(VOID* pC);
                                        ~CANVAS();

VOID                            beginPaint();
        VOID                            endPaint();

VOID                            setLineWeight(U16);
```

```
            VOID            setColor(RGB);
            VOID            setColor2(RGB);
            BOOL            setPattern(P_STRING);
            VOID            setFont(FONT);
            VOID            setFontSize(U16);
            VOID            setFontAngle(S16);
            VOID            reset();

VOID            polyDraw(P_S16, U16);
            VOID            lineDraw(P_S16);
            VOID            rectDraw(P_S16);
            VOID            ellipseDraw(P_S16);
            VOID            polyFill(P_S16, U16);
            VOID            rectFill(P_S16);
            VOID            ellipseFill(P_S16);
            VOID            textFill(P_S16, U16, P_STRING);
            VOID            delay(S32);

P_S16           getPointArray(U16);
            static VOID     setIC(VOID*);
            static S32      textWidth(FONT, U16, P_STRING);
            static S32      textHeight(FONT, U16);
            static S32      getFontId(P_STRING);

      private:
            VOID*           pCanvas;

U16             lineWeight;
            RGB             color;
            RGB             color2;
            U16             pattern;
            FONT            font;
            U16             fontSize;
            S16             fontAngle;
            P_S16           ptArray;
            U16             ptCount;

static VOID* pIC;
      };

#endif // platform_INCLUDED

//
      //                              Copyright 1991 - Slate Corporation
      //
      // Name:        records.hxx
      //
      // Abstract: chart rulebase record structures.
      //
      // Audit:
      // 05aug91 buzz Original.
      //

      #ifndef records_INCLUDED
      #define records_INCLUDED ifndef types_INCLUDED
      #include "types.hxx"
      #endif define FILEVERSION 1

      struct FILEHEADER
```

```
        {
                U32             version;
                U32             atomCount;
                U32             atomStoreSize;
                U32             seriesStoreSize;
                U32             formulaStoreSize;
                U32             variableCount;
        };

struct VARREC
{
        U16             hName;
        U16             enumVar;
        U16             level;
        U32             formPos;
        U16             formLength;
        U16             indexDeps;
        U16             type;
};

struct OBJRECT
{
        U16             hName;
        U16             type;
        U16             level;
        U16             enumVar;
        U16             attrCount;
};

#endif // records_INCLUDED

//
//                                      Copyright 1991 - Slate Corporation
//
// Name:        series.cxx
//
// Abstract: Methods for class SERIES
//
// Audit:
// 07oct91 buzz    Extracted from datanode.cxx
// include "platform.hxx"
include "series.hxx"

#ifndef datanode_INCLUDED
#include "datanode.hxx"
endif ifndef atom_INCLUDED
include "atom.hxx"
endif

P_U16 SERIES_pDefaultStore = NULL;
U32 SERIES_defaultStoreSize = 0;
U16 STOREDLIST_storeCount = 0;
STOREDLIST* STOREDLIST_pStore = NULL;

static P_STRING
dupStr(P_STRING pSource)
{
        P_STRING pStr = pSource;
        U16 len = 1;
        while (*pStr++)
                len++;
```

```
        P_STRING pNew = new STRING[len+sizeof(len)];
        *((P_U16)pNew)++ = len;
        pStr = pNew;
        while ((*pStr++ = *pSource++) != 0)
                continue;
        return pNew;
} static VOID
freeStr(P_STRING pStr)
{
        delete --((P_U16)pStr);
}

STOREDITEM::STOREDITEM()
{
        type = 0;
        whole = 0;
}

STOREDITEM::~STOREDITEM()
{
        switch (type) {
        case STRINGPTR:         freeStr(pString);       break;
        case REAL64:         delete pReal;              break;
        case INTEGER32:
        default:                                                break;
        }                                                       break;
}

STOREDLIST::STOREDLIST(P_STRING pListName)
{
        pPrev = NULL;
        if ((pNext=STOREDLIST_pStore) != NULL)
                pNext->pPrev = this;
        STOREDLIST_pStore = this;
        pName = dupStr(pListName);
        itemCount = 0;
        pItems = NULL;
        STOREDLIST_storeCount++;
}

STOREDLIST::~STOREDLIST()
{
        if (!pPrev)
                STOREDLIST_pStore = pNext;
        else
                pPrev->pNext = pNext;
        if (pNext)
                pNext->pPrev = pPrev;
        freeStr(pName);
        if (pItems)
                delete [itemCount] pItems;
        STOREDLIST_storeCount--;
}

SERIES::SERIES(U16 seriesId)
{
        pDefaults = SERIES_pDefaultStore+seriesId;

for (pValues = STOREDLIST_pStore; pValues; pValues = pValues->pNext) {
                if (!compareStr(pValues->pName,*ATOM(*pDefaults)))
                        break;
        }
}
```

79200.915 -96- Express Mail Label
No. RB717153393US

```
SERIES::SERIES(P_STRING pSeriesName)
{
        P_U16 pCode = SERIES_pDefaultStore;

pDefaults = NULL;
        while (pCode-SERIES_pDefaultStore < SERIES_defaultStoreSize) {
                if (!compareStr(pSeriesName, *ATOM(*pCode))) {
                        pDefaults = pCode;
                        break;
                }
                pCode += pCode[1]+3;
        }
        for (pValues = STOREDLIST_pStore; pValues; pValues = pValues->pNext) {
                if (!compareStr(pSeriesName, pValues->pName))
                        return;
        }
        pValues = new STOREDLIST(pSeriesName);
}
VOID
SERIES::setCount(U16 newCount)
{
        if (!pValues)
                pValues = new STOREDLIST(*ATOM(*pDefaults));
        if (pValues->pItems) {
                delete [pValues->itemCount] pValues->pItems;
                pValues->pItems = NULL;
        }
        if ((pValues->itemCount=newCount) != 0)
                pValues->pItems = new STOREDITEM[newCount];
}

VOID
SERIES::setStringElement(U16 element, P_STRING pValue)
{
        STOREDITEM* pItem;

if (pValues == NULL)
                return;                 // assert
        if (element >= pValues->itemCount)
                return;                 // assert
        pItem = pValues->pItems + element;
        pItem->type = STRINGPTR;
        pItem->pString = dupStr(pValue);
}

VOID
SERIES::setRealElement(U16 element, IEEEREAL* pValue)
{
        STOREDITEM* pItem;

if (pValues == NULL)
                return;                 // assert
        if (element >= pValues->itemCount)
                return;                 // assert
        pItem = pValues->pItems + element;
        pItem->type = REAL64;
        *(pItem->pReal=new IEEEREAL) = *pValue;
}

VOID
SERIES::setIntegerElement(U16 element, S32 value)
{
        STOREDITEM* pItem;
```

```
        if (pValues == NULL)
                return;                         // assert
        if (element >= pValues->itemCount)
                return;                         // assert
        pItem = pValues->pItems + element;
        pItem->type = INTEGER32;
        pItem->whole = value;
}

U16
SERIES::qCount()
{
        if (!pValues)
                return pDefaults[2];
        return pValues->itemCount;
}

VOID
SERIES::getElement(DATANODE* pNode, U16 index)
{
        if (!pValues) {
                P_U16 pCode = pDefaults+2;
                if (index >= *pCode) {
                        pNode->setErr();
                        return;
                }
                pCode++;
                while (index--) switch (*pCode) {
                case STRINGPTR:         pCode += 2;     break;
                case REAL64:            pCode += 5;     break;
                case INTEGER32:         pCode += 3;     break;
                default:                pCode++;        break;    //
small integer
                }
                switch (*pCode) {
                case STRINGPTR:         *pNode = *ATOM(*(++pCode));
                break;
                case REAL64:            *pNode = (P_IEEEREAL)(++pCode);
        break;
                case INTEGER32:         *pNode = *(P_S32)(++pCode);
                break;
                default: // small integer
                        *pNode = (S32)((S16)((*pCode&(SMALLINT>>1))?
                                        *pCode|SMALLINT: *pCode));
                        break;
                }
                return;
        }
        if (index >= pValues->itemCount) {
                pNode->setErr();
                return;
        }
        STOREDITEM* pItem = pValues->pItems + index;
        switch (pItem->type) {
        case STRINGPTR:         *pNode = pItem->pString;
        break;
        case REAL64:    *pNode = (P_IEEEREAL)pItem->pReal;       break;
        case INTEGER32:         *pNode = pItem->whole;
        break;
        default:                pNode->setErr();
        break;
        }
        return;
}
```

```
VOID
SERIES::initDefaults(U32 storeSize, RBASE* pRb)
{
        if (storeSize) {
                SERIES_pDefaultStore = new U16[storeSize];
                pRb->read(SERIES_pDefaultStore, sizeof(U16), storeSize);
        }
        else
                SERIES_pDefaultStore = NULL;
        SERIES_defaultStoreSize = storeSize;
}

VOID
SERIES::clearDefaults()
{
        if (SERIES_pDefaultStore)
                delete SERIES_pDefaultStore;
        SERIES_pDefaultStore = NULL;
        SERIES_defaultStoreSize = 0;
}

VOID
SERIES::clearStore()
{
        while (STOREDLIST_pStore)
                delete STOREDLIST_pStore;
} static VOID
putU16(P_UNKNOWN hFile, U16 val)
{
        putBytes(hFile, sizeof(val), &val);
} static VOID
putS32(P_UNKNOWN hFile, S32 val)
{
        putBytes(hFile, sizeof(val), &val);
} static VOID
putSTRING(P_UNKNOWN hFile, P_STRING pStr)
{
        U16 count = *(((P_U16)pStr)-1);
        putU16(hFile, count);
        putBytes(hFile, count, pStr);
} static VOID
putIEEEREAL(P_UNKNOWN hFile, P_IEEEREAL pReal)
{
        putBytes(hFile, sizeof(*pReal), pReal);
}

VOID
SERIES::writeStore(P_UNKNOWN hFile)
{
        STOREDLIST* pList = STOREDLIST_pStore;

putU16(hFile, STOREDLIST_storeCount);

while (pList)
                pList = pList->write(hFile);
```

```
}

STOREDLIST*
STOREDLIST::write(P_UNKNOWN hFile)
{
        U16 count = itemCount;
        STOREDITEM* pItem = pItems;

putSTRING(hFile, pName);
        putU16(hFile, count);
        while (count--)
                (pItem++)->write(hFile);
        return pNext;
}

VOID
STOREDITEM::write(P_UNKNOWN hFile)
{
        putU16(hFile, type);
        switch (type) {
        case STRINGPTR:         putSTRING(hFile, pString);
        break;
        case REAL64:       putIEEEREAL(hFile, pReal);                break;
        case INTEGER32:         putS32(hFile, whole);
        break;
        default:
                break;
        }
} static U16
getU16(P_UNKNOWN hFile)
{
        U16 val;
        getBytes(hFile, sizeof(U16), &val);
        return val;
} static S32
getS32(P_UNKNOWN hFile)
{
        S32 val;
        getBytes(hFile, sizeof(S32), &val);
        return val;
} static P_STRING
getSTRING(P_UNKNOWN hFile)
{
        U16 len = getU16(hFile);
        P_STRING pStr = new STRING[len+sizeof(len)];
        *((P_U16)pStr)++ = len;
        getBytes(hFile, len, pStr);
        return pStr;
} static P_IEEEREAL
getIEEEREAL(P_UNKNOWN hFile)
{
        P_IEEEREAL pReal = new IEEEREAL;
        getBytes(hFile, sizeof(*pReal), pReal);
        return pReal;
}

VOID
```

```
    SERIES::readStore(P_UNKNOWN hFile)
    {
            U16 count = getU16(hFile);

            while (count--)
                    new STOREDLIST(hFile);
    }

STOREDLIST::STOREDLIST(P_UNKNOWN hFile)
    {
            pPrev = NULL;
            if ((pNext=STOREDLIST_pStore) != NULL)
                    pNext->pPrev = this;
            STOREDLIST_pStore = this;
            pName = getSTRING(hFile);
            U16 count = itemCount = getU16(hFile);
            STOREDITEM* pItem = pItems = (count)? new STOREDITEM[itemCount]: NULL;
            while (count--)
                    (pItem++)->read(hFile);
            STOREDLIST_storeCount++;
    }

VOID
    STOREDITEM::read(P_UNKNOWN hFile)
    {
            type = getU16(hFile);
            switch (type) {
            case STRINGPTR:         pString = getSTRING(hFile);
            break;
            case REAL64:        pReal = getIEEEREAL(hFile);            break;
            case INTEGER32:     whole = getS32(hFile);
            break;
            default:            whole = 0;
            break;
            }
    }

//
    //                              Copyright 1991 - Slate Corporation
    //
    // Name:        series.hxx
    //
    // Abstract: Include file for class SERIES
    //
    // Audit:
    // 07oct91 buzz    Extracted from datanode.hxx.
    // ifndef series_INCLUDED
    #define series_INCLUDED class DATANODE;

class SERIES
    {
    public:
                                    SERIES(U16);
                                    SERIES(P_STRING);
            VOID                    setCount(U16);
            VOID                    setStringElement(U16, P_STRING);
            VOID                    setRealElement(U16, IEEEREAL*);
            VOID                    setIntegerElement(U16, S32);
            U16                     qCount();
            VOID                    getElement(DATANODE*, U16);
            static VOID             initDefaults(U32, RBASE*);
```

```
            static VOID          clearDefaults();
            static VOID          clearStore();
            static VOID          writeStore(P_UNKNOWN);
            static VOID          readStore(P_UNKNOWN);
    private:
            struct STOREDITEM
            {
                                 STOREDITEM();
                                 ~STOREDITEM();
                    VOID         write(P_UNKNOWN);
                    VOID         read(P_UNKNOWN);

U16          type;
                    union {
                            IEEEREAL*   pReal;
                            P_STRING    pString;
                            S32         whole;
                    };
            };

struct STOREDLIST
            {
                                 STOREDLIST(P_STRING);
                                 STOREDLIST(P_UNKNOWN);
                                 ~STOREDLIST();
                    STOREDLIST*  write(P_UNKNOWN);

STOREDLIST*  pPrev;
                    STOREDLIST*  pNext;
                    P_STRING     pName;
                    U16          itemCount;
                    STOREDITEM*  pItems;
            };

P_U16                pDefaults;
            STOREDLIST*          pValues;
    };

#endif // series_INCLUDED

//
    //                                  Copyright 1991 - Slate Corporation
    //
    // Name:       types.hxx
    //
    // Abstract:   include file for basic types
    //
    // Audit:
    // 16apr91 buzz    Original.
    // ifndef types_INCLUDED
    #define types_INCLUDED

/*======================== defines =========================*/
    #define CDECL            cdecl
    #define PASCAL           pascal
    //#define NEAR           near
    //#define FAR            far
    #define NEAR
    #define FAR
    #define VOID             void
```

```
#ifndef NULL
#define NULL            (0)
endif ifndef FALSE
define FALSE       0
#define TRUE   !FALSE
#endif

/*========================== typedefs ==========================*/
typedef unsigned char       U8,   FAR* P_U8;   /*  8-bit unsigned value */
typedef unsigned short      U16, FAR* P_U16;   /* 16-bit unsigned value */
typedef unsigned long       U32, FAR* P_U32;   /* 32-bit unsigned value */ typedef char                S8,   FAR* P_S8;   /*  8-bit signed value */
typedef short               S16, FAR* P_S16;   /* 16-bit signed value */
typedef long                S32, FAR* P_S32;   /* 32-bit signed value */ typedef VOID FAR *          P_UNKNOWN;
typedef P_UNKNOWN FAR *     PP_UNKNOWN;
typedef S8                              STRING;
typedef STRING FAR *        P_STRING;
typedef P_STRING   FAR *    PP_STRING;
typedef U8                              BOOL;

typedef double                          IEEEREAL;
typedef IEEEREAL FAR *      P_IEEEREAL;

/*========================== handy macros ==========================*/ define postfix     int
define prefix
#define forever     for(;;)
define STRING(_a_) #_a_ endif // types_INCLUDED

//
//                          Copyright 1991 - Slate Corporation
//
// Name:        variable.cxx
//
// Abstract: Methods for chart engine class VARIABLE
//
// Audit:
// 06aug91 buzz Created from original version and notes.
// 29aug91 buzz Converted to use platform classes in preparation for Penpoint.
// include "platform.hxx"
include "variable.hxx"

#ifndef atom_INCLUDED
include "atom.hxx"
endif define INDEXBOUNDSERR    0
define INDEXLEVELERR     1
define LISTTYPEERR       2 define VARTRACE if !defined(DEBUG) || !defined(VARTRACE)
```

```
     #define PUSH_VAR()
     #define POP_VAR()
     #define MSG(_args_)

     #else // DEBUG define MAXVARNAMELEN 100
     #define PUSH_VAR()        varTraceLevel++;
     #define POP_VAR()         varTraceLevel--;
     #define MSG(_args_)       varTrace _args_

U16 varTraceLevel = 0;

static VOID
     varTrace(U16 flag, P_STRING p1="", P_STRING p2="", P_STRING p3="")
     {
             callTrace(flag, varTraceLevel, p1, p2, p3);
     }

     P_STRING
     VARIABLE::varName(const INDEX* pVarIndex, U16 element)
     {
             static STRING buf[MAXVARNAMELEN];
             P_STRING pStr = buf;
             P_STRING pSrc = pName? pName: "";
             U16 lvl = 0;

while (*pSrc)
                     *pStr++ = *pSrc++;
             while (lvl <= pVarIndex->qLevel()) {
                     *pStr++ = '[';
                     S32toP_STRING(pStr, S32(pVarIndex->qValAtLevel(lvl++)));
                     while (*pStr)
                             pStr++;
                     *pStr++ = ']';
             }
             if (element != UNSET) {
                     *pStr++ = '[';
                     S32toP_STRING(pStr, S32(element));
                     while (*pStr)
                             pStr++;
                     *pStr++ = ']';
             }
             *pStr = 0;
             return buf;
     }

P_STRING
     VARIABLE::varValue(DATANODE* pNode)
     {
             static STRING buf[NUMBERBUFFERSIZE];
             return pNode->getString(buf);
     }
55
     #endif 60
     // Add a level to a variable's dataTree.  (service of getNode())
     inline VOID
     VARIABLE::addLevel(DATANODE* pNode, U16 newLevel, const INDEX* pNewIndex)
     {
             TRACE(VARIABLE.addLevel);
```

```
            VARIABLE* pVar = pEnumVar;
            U16 size;

while (pVar->level > newLevel)
                    pVar = pVar->pEnumVar;

size = pVar->getMaxEnumValue(indexDeps, pNewIndex);

pNode->makeList(size);
        } inline U16
        VARIABLE::getMaxEnumValue(U16 deps, const INDEX* pNewIndex)
        {
                TRACE(VARIABLEgetMaxEnumLevel);

U16 maxSize = 0;
                INDEX* pOldIndex = pIndex;
                INDEX index = *pNewIndex;
                pIndex = &index;

if (!(indexDeps)) {
                        index.setLevel(level);
                        maxSize = getEnumValue(&index);
                } else {
                        U16 thisDep = 1;
                        U16 val = 0;
                        while (val < level && !(thisDep&~deps&indexDeps)) {
                                val++;
                                thisDep <<= 1;
                        }
                        index.setLevel(val);
                        index.setRootLevel();

DATANODE* pNode;
                        advance(0, &pNode);
                        do {
                                val = (U16)*pNode;
                                if (maxSize < val)
                                        maxSize = val;
                        } while (advance(1, &pNode));

                } pIndex = pOldIndex;

return maxSize;
        } inline DATANODE*
        VARIABLE::getValueNode(const INDEX* pNewIndex)
        {
                TRACE(VARIABLEgetValueNode);

DATANODE* pNode = getNode(pNewIndex);

                if (!pNode->hasValue()) {
                        MSG((0x0004, "evaluating ", varName(pNewIndex), "..."));
                        PUSH_VAR();
                        pFormula->evaluate(pNode, pNewIndex);
                        POP_VAR();
                }
```

```
        if (pNode->isSeries())
                pNode = pNode->getElement(0);
        else if (pNode->isLink())
                pNode = getLinkValue(pNode, pNewIndex);

if (pNode) {
                MSG((0x0004, varName(pNewIndex), " = ", varValue(pNode)));
        } return pNode;
} inline DATANODE*
VARIABLE::getElementValueNode(U16 element, const INDEX* pNewIndex)
{
        TRACE(VARIABLEgetElementValueNode);

DATANODE* pNode = getNode(pNewIndex);

if (!pNode->hasValue()) {
                MSG((0x0004, "evaluating ", varName(pNewIndex, element), "..."));
                PUSH_VAR();
                pFormula->evaluate(pNode, pNewIndex);
                POP_VAR();
        } if (pNode->isSeries())
                pNode = pNode->getElement(element);
        else if (pNode->isLink())
                pNode = getLinkElement(pNode, pNewIndex, element);

if (pNode) {
                MSG((0x0004, varName(pNewIndex, element), " = ",
varValue(pNode)));
        } return pNode;
} inline BOOL
VARIABLE::oneStep()
{
        TRACE(VARIABLEoneStep);

U16 stepLevel = pIndex->qLevel();
        VARIABLE* pVar = pEnumVar;

while (stepLevel && !pIndex->isAtRoot()) {
                U16 curCount = pIndex->popLevel() + 1;
                U16 enumerator = pVar->getEnumValue(pIndex);
                if (curCount != enumerator) {
                        pIndex->setVal(curCount);
                        pIndex->setLevel(stepLevel);
                        return TRUE;
                }
                pVar = pVar->pEnumVar;
        }
        return FALSE;
} inline U16
VARIABLE::linkStep(DATANODE* pNode, U16 count, DATANODE** ppNode)
{
        TRACE(VARIABLElinkStep);
```

```
                U16 avail = 0;
                INDEX* pSaveIndex = pIndex;

        do {
                    DATALINK* pLink = pNode->qLink();
                    VARIABLE* pVar = *VARID(pLink->qVarId());
                    INDEX index(*pIndex);
                    index.setLink(pLink->qLevel(), pLink->qCount(), pLink-
    >qIndices());
                    pIndex = &index;
                    avail += pVar->advance(count-avail, ppNode);
                    pIndex = pSaveIndex;
            } while (oneStep());
            return avail;
    } inline U16
    VARIABLE::seriesStep(DATANODE* pNode, U16 count, DATANODE** ppNode)
    {
            TRACE(VARIABLEseriesStep);

U16 remain = pNode->qCount() - 1;
            U16 avail = remain;

while (remain < count && oneStep()) {
                    pNode = getNode(pIndex);
                    if (!pNode->hasValue())
                            pFormula->evaluate(pNode, pIndex);
                    count -= remain+1;
                    remain = pNode->qCount() - 1;
                    avail += remain+1;
            }
            if (ppNode) {
                    if (remain >= count)
                            *ppNode = pNode->getElement(count);
                    else
                            *ppNode = nodeErr(INDEXBOUNDSERR);
            }
            return avail;
    } inline DATANODE*
    VARIABLE::nodeErr(U16 code)
    {
            return NULL;
    }

    // Get the value of a variable at a given index.
    const DATANODE&
    VARIABLE::getValue(const INDEX* pNewIndex)
    {
            TRACE(VARIABLEgetValue);
            DATANODE* pNode = NULL;

if ((type&ANYEXPR)
                && (pNewIndex->qLevel() == level)
                && pFormula)
                    pNode = getValueNode(pNewIndex);

if (!pNode) {
                    MSG((0x0004, varName(pNewIndex), " = NULLNODE"));
                    return DATANODE::nullNode();
```

```
            } return *pNode;
    }

// Get the value of a variable link at a given index.
    // If the target of the link is a list it is the responsibility of the caller
    // to provide an index that has an extra index level. Type-checking in the
    // parser ensures that this will be so for links in formulae.
    DATANODE*
    VARIABLE::getLinkValue(DATANODE* pNode, const INDEX* pLinkIndex)
    {
            TRACE(VARIABLEgetLinkValue);

DATALINK* pLink = pNode->qLink();
            VARIABLE* pVar = *VARID(pLink->qVarId());
            INDEX index(*pLinkIndex);
            index.setLink(pLink->qLevel(), pLink->qCount(), pLink->qIndices());

U16 element = (pVar->type&ANYEXPR)? 0: index.popLevel();

pNode = pVar->getElementValueNode(element, &index);

if (!pNode) {
                    MSG((0x0004, pVar->varName(&index, element), " = NULLNODE"));
                    return &DATANODE::nullNode();
            } return pNode;
    }

// Get the value of a variable given an index and an element number.
    const DATANODE&
    VARIABLE::getElement(const INDEX* pNewIndex, U16 element)
    {
            TRACE(VARIABLEgetElement);

DATANODE* pNode = getElementValueNode(element, pNewIndex);

if ((!(pNewIndex->qLevel() == level && (type&ANYEXPR))
             && !(pNewIndex->qLevel() > level && (type&ANYLIST))
             && pFormula)
                    pNode = getElementValueNode(element, pNewIndex);

if (!pNode) {
                    MSG((0x0004, varName(pNewIndex, element), " = NULLNODE"));
                    return DATANODE::nullNode();
            } return *pNode;
    }

// Get the value of a variable link at a given index.
    DATANODE*
    VARIABLE::getLinkElement(DATANODE* pNode, const INDEX* pLinkIndex, U16 element)
    {
            TRACE(VARIABLEgetLinkElement);

DATALINK* pLink = pNode->qLink();
            VARIABLE* pVar = *VARID(pLink->qVarId());
            INDEX* pOldIndex = pIndex;
            INDEX index(*pLinkIndex);
            index.setLink(pLink->qLevel(), pLink->qCount(), pLink->qIndices());
            pIndex = &index;
```

```
                pVar->advance(element, &pNode);

pIndex = pOldIndex;
                return pNode;
        }

// Return the number of values of a variable below the root of a given index.
        U16
        VARIABLE::qCount(INDEX* pNewIndex)
        {
                TRACE(VARIABLEqCount);

U16 count = -1;
                INDEX* pOldIndex = pIndex;
                pIndex = pNewIndex;

pIndex->setToRoot();
                count = advance(count, NULL) - 1;

pIndex = pOldIndex;
                return count;
        }

VOID
        VARIABLE::initStore(U32 varCount, RBASE* pRb)
        {
                VARREC vr;
                VARIABLE* pVar;

if (varCount) {
                        pVar = pStore = new VARIABLE[varCount];
                        storeSize = varCount;
                        do {
                                pRb->read(&vr, sizeof(vr), 1);
                                (pVar++)->init(vr);
                        } while (--varCount);
                }
                else
                        pVar = NULL;
        }

VOID
        VARIABLE::clearStore()
        {
                if (pStore)
                        delete [storeSize] pStore;
        }

VOID
        VARIABLE::clearValues()
        {
                VARIABLE* pVar = pStore;
                U32 count = storeSize;

while (count--)
                        (pVar++)->dataTree.unSet();
        }

VOID
        VARIABLE::init(const VARREC& vr)
        {
                pName = *ATOM(vr.hName);
                pEnumVar = *VARID(vr.enumVar);
                level = vr.level;
```

```
              pFormula = vr.formLength? FORMULA::New(vr.formPos): NULL;
              indexDeps = vr.indexDeps;
              type = FORMTYPE(vr.type);
      }

// Return a pointer to the node in a variable's dataTree that corresponds
      // to the current index.  This process may, in the course of traversing
      // the variable's physical dataTree, create the parts of the tree.
      DATANODE*
      VARIABLE::getNode(const INDEX* pNewIndex)
      {
              TRACE(VARIABLEgetNode);

DATANODE* pNode = &dataTree;
              U16 vLevel = 0;
              U16 thisDep = 1;
              U16 remDeps = (1<<pNewIndex->qLevel())-1;

while (remDeps&indexDeps) {
                      if (thisDep&indexDeps) {
                              if (!pNode->hasValue())
                                      addLevel(pNode, vLevel, pNewIndex);
                              pNode = pNode->index(pNewIndex->qValAtLevel(vLevel));
                      }
                      remDeps &= ~thisDep;
                      thisDep <<= 1;
                      vLevel++;
              } return pNode;
      }

// Move the current index forward by 'count' variable values.
      // Return the number of values the index is actually moved over.
      U16
      VARIABLE::advance(U16 count, DATANODE** ppNode)
      {
              TRACE(VARIABLEadvance);

U16 avail = 0;

pIndex->setLevel(level);

// If the variable is not a list, the index can only be moved when
              // its root is above the variable's level (ie rootLevel < level).
              if (type&ANYEXPR) {
                      if (pIndex->qRootLevel() < level) {
                              if (count)
                                      avail = quickStep(count, 1);
                              if (ppNode) {
                                      if (avail >= count)
                                              *ppNode = getValueNode(pIndex);
                                      else
                                              *ppNode = nodeErr(INDEXBOUNDSERR);
                              }
                      }
                      else if (pIndex->qRootLevel() == level) {
                              if (ppNode) {
                                      if (count == 0)
                                              *ppNode = getValueNode(pIndex);
                                      else
                                              *ppNode = nodeErr(INDEXBOUNDSERR);
                              }
                      }
```

```
                else if (ppNode)
                        *ppNode = nodeErr(INDEXLEVELERR);
        }

// If the variable is a list, the index cannot be moved when its
        // root is lower than the variable's level (ie rootLevel > level).
        else if (pIndex->qRootLevel() <= level) {
                DATANODE* pNode = getNode(pIndex);
                if (!pNode->hasValue())
                        pFormula->evaluate(pNode, pIndex);

if (pNode->isSeries())
                        avail = seriesStep(pNode, count, ppNode);
                else if (pNode->isLink())
                        avail = linkStep(pNode, count, ppNode);
                else if (ppNode)
                        *ppNode = nodeErr(LISTTYPEERR);
        } else if (pIndex->qRootLevel() == level+1) {
                if (ppNode) {
                        if (count == 0)
                                *ppNode =
                                        getElementValueNode(pIndex-
>qValAtLevel(level),pIndex);
                        else
                                *ppNode = nodeErr(INDEXBOUNDSERR);
                }
        }
        else if (ppNode)
                *ppNode = nodeErr(INDEXLEVELERR);

if (avail < count)
                return avail;

return count;
}

U16
VARIABLE::quickStep(U16 count, U16 stepSize)
{
        TRACE(VARIABLEquickStep);

U16 curCount = pIndex->popLevel() + 1;
        U16 enumerator = pEnumVar->getEnumValue(pIndex);
        U16 remain = (enumerator - curCount) * stepSize;
        U16 avail = 0;

if (remain >= count) {
                pIndex->setVal(curCount + (count-1)/stepSize);
                pIndex->pushLevel();
                return remain;
        }
        count -= remain;
        if (!pIndex->isAtRoot()) {
                if (!(pEnumVar->indexDeps & (1<<(pIndex->qLevel()-1))))
                        avail = pEnumVar->quickStep(count, enumerator*stepSize);
                else if (pEnumVar->oneStep()) {
                        do {
                                enumerator = pEnumVar->getEnumValue(pIndex);
                                avail += enumerator*stepSize;
                        } while (avail < count && pEnumVar->oneStep());
                }
        }
```

```
        if (avail >= count) {
                pIndex->setVal((count-1)%(enumerator*stepSize));
                pIndex->pushLevel();
                return count+remain;
        } pIndex->setVal(enumerator - 1);
        pIndex->pushLevel();
        return avail+remain;
}

//
//
//                              Copyright 1991 - Slate Corporation
//
// Name:          variable.hxx
//
// Abstract: Include file for chart engine class VARIABLE.
//
// Audit:
// 06aug91 buzz    Created from old version and notes.
// 29aug91 buzz Converted to use platform classes in preparation for Penpoint.
// ifndef variable_INCLUDED
define variable_INCLUDED ifndef formula_INCLUDED
include "formula.hxx"
endif class VARIABLE
{
public:
                                        VARIABLE()                      {}
                                        ~VARIABLE()                     {}
        U16                             getEnumValue(const INDEX* pI)
                                                (return (!pFormula)? 1:
(U16)getValue(pI);} const DATANODE&         getValue(const INDEX*);
        static DATANODE*        getLinkValue(DATANODE*, const INDEX*);
        const DATANODE&         getElement(const INDEX*, U16);
        static DATANODE*        getLinkElement(DATANODE*, const INDEX*, U16);
        U16                             qCount(INDEX*);

static VOID             initStore(U32, RBASE*);
        static VARIABLE*    id2pVar(U16 i)                       { return pStore+(i-1); }
        static VOID             clearStore();
        static VOID             clearValues();

private:
        VOID                    init(const VARREC&);
        VOID                    evaluate(DATANODE*, const INDEX*);
        DATANODE*               getValueNode(const INDEX*);
        DATANODE*               getElementValueNode(U16, const INDEX*);
        DATANODE*               getNode(const INDEX*);
        VOID                    addLevel(DATANODE*, U16, const INDEX*);
        U16                     getMaxEnumValue(U16, const INDEX*);
        U16                     advance(U16, DATANODE**);
        U16                     quickStep(U16, U16);
        BOOL                    oneStep();
        U16                     linkStep(DATANODE*, U16, DATANODE**);
        U16                     seriesStep(DATANODE*, U16, DATANODE**);
```

```
            DATANODE*              nodeErr(U16);
            P_STRING               varName(const INDEX*, U16=UNSET);
            static P_STRING        varValue(DATANODE*);

P_STRING               pName;
            VARIABLE*              pEnumVar;
            U16                         level;
            FORMULA*               pFormula;
            U16                         indexDeps;
            FORMTYPE               type;
            DATANODE               dataTree;

static INDEX*          pIndex;
            static VARIABLE*    pStore;
            static U32             storeSize;
    };

class VARID
    {
    public:
                                        VARID(U16 i) { pVar = i?
    VARIABLE::id2pVar(i): NULL; }
            VARIABLE*              operator->() { return pVar; }
            VARIABLE*              operator*()  { return pVar; } private:
            VARIABLE*              pVar;
    };

#endif //  variable_INCLUDED
```

I claim:

1. In a spreadsheet application program, a method for graphically displaying spreadsheet cell data, said method comprising the steps of:

creating a graphic format within said spreadsheet application program using at least one instance of at least one graphical object for graphically representing said spreadsheet cell data; and displaying said graphic format by operation of said spreadsheet application program; wherein said step of creating said graphic format comprises the steps of:

accepting user input, wherein said user input comprises a definition of said at least one graphical object end a specification of a respective number for quantifying instances desired of said at least one graphical object;

assigning an index for identifying each instance of said at least one graphical object;

receiving user entry, wherein said user entry comprises at least one user designated expression for designating a relationship between at least one attribute of each instance of said at least one graphical object, by means of said index, and said spreadsheet cell data; and evaluating said expressions to determine said attributes of said instances of said at least one graphical object.

2. The method of claim 1, wherein for each of said at least one user designated expression being evaluated, said evaluating step comprises the steps of:

determining whether a first type of data structure has been created for said at least one user designated expression being evaluated;

creating one of said first types of data structure for said at least one user designated expression being evaluated when said determining step determines that one of said first types of data structure has not been created for said at least one user designated expression;

inspecting said first type of data structure of said at least one user designated expression being evaluated to determine if a solution to said at least one user designated expression has been stored in any of at least one of a second type of data structure;

calculating said solution to said at least one user designated expression being evaluated when said inspecting step reveals that none of said second types of data structure contain said solution;

storing said solution in at least one of said second types of data structure when said calculating step calculates said solution to said at least one user designated expression being evaluated; and retrieving said solution to said at least one user designated expression being evaluated when said inspecting step reveals that one of said second types of data structure contains said solution.

3. In a spreadsheet application program, a method for graphically displaying spreadsheet cell data, said method comprising the steps of:

creating a graphic format within said spreadsheet application program using at least one instance of at least one graphical object for graphically representing said spreadsheet cell data; and displaying said graphic format by operation of said spreadsheet application program; wherein said step of creating said graphic format comprises the steps of:

accepting user input, wherein said user input comprises a definition of at least one instance of at least one source object;

assigning an index for identifying each instance of said at least one source object;

receiving user entry, wherein said user entry comprises at least one user designated expression for designating a relationship between at least one attribute of each instance of said at least one graphical object, at least one attribute of at least one instance of said at least one source object, and said spreadsheet cell data; and evaluating said expressions to determine said attributes of said instances of said at least one graphical object.

4. The method of claim 3 wherein said source object is a single valued object.

5. The method of claim 3 wherein said source object is a graphical object.

6. The method of claim 3 wherein said source object is a list valued object.

7. The method of claim 3, wherein for each of said at least one user designated expression being evaluated, said evaluating step comprises the steps of:

determining whether a first type of data structure has been created for said at least one user designated expression being evaluated;

creating one of said first types of data structure for said at least one user designated expression being evaluated when said determining step determines that one of said first types of data structure has not been created for said at least one user designated expression;

inspecting said first type of data structure of said at least one user designated expression being evaluated to determine if a solution to said at least one user designated expression has been stored in any of at least one of a second type of data structure;

calculating said solution to said at least one user designated expression being evaluated when said inspecting step reveals that none of said second types of data structure contain said solution;

storing said solution in at least one of said second types of data structure when said calculating step calculates said solution to said at least one user designated expression being evaluated; and retrieving said solution to said at least one user designated expression being evaluated when said inspecting step reveals that one of said second types of data structure contains said solution.

8. In a spreadsheet application program, a method for graphically displaying spreadsheet cell data, said method comprising the steps of:

creating a graphic format within said spreadsheet application program using at least one instance of at least one graphical object for graphically representing said spreadsheet cell data, by:

accepting user input, wherein said user input comprises;

a definition of said at least one instance of said at least one graphical object, and a definition of at least one instance of at least one source object related to at least one instance of said at least one graphical object, designating a first index for identifying each instance of said at least one graphical object, designating an additional index for identifying each instance of said at least one source object, receiving user entry, wherein said user entry comprises at least one user designated constraint hierarchy, wherein each of said at least one user designated constraint hierarchy comprises a rule base relating at least one attribute of each instance of said at least one graphical object, by means of said first index, to said spreadsheet cell date and at least one attribute of at least one instance of said at least one source object, by means of said additional index, and determining said attributes of said instances of said at least one graphical object according to said rule base in said constraint hierarchy; and displaying said instances of said at least one graphical object according to said attributes.

9. The method of claim 8 wherein said step of determining said attributes of said instances of said graphical object comprises the steps of:

identifying, using said first index and said additional index, each attribute of each instance of said source object required to evaluate said attributes of said instances of said graphical object; and determining, according to said rule base, only attributes of instances of said source object identified as being required to determine said attributes of said instances of said graphical object.

10. The method of claim 8 wherein said attributes of each of said instances of said graphical object are determined in a sequential fashion.

11. The method of claim 8, wherein for each said rule base being used to determine each of said at least one attribute, said determining step comprises the steps of:

determining whether a first type of data structure has been created for said rule base;

creating one of said first types of data structure for said rule base when said determining step determines that one of said first types of data structure has not been created for said rule base;

inspecting said first type of data structure of said rule base to determine if a solution to said rule base has been stored in any of at least one of a second type of data structure;

calculating said solution to said rule base when said inspecting step reveals that none of said second types of data structure contain said solution;

storing said solution in at least one of said second types of data structure when said calculating step calculates said solution to said rule base; and retrieving said solution to said rule base when said inspecting step reveals that one of said second types of data structure contains said solution.

12. Apparatus for graphically displaying spreadsheet cell data in a spreadsheet application program, said apparatus comprising:

a graphics formatter operating under the control of said spreadsheet application program for creating a graphic format for graphically representing said spreadsheet cell data using at least one instance of at least one graphical object, said graphics formatter comprising:

a user input mechanism for receiving user input, wherein said user input comprises e definition of said at least one instance of said at least one graphical object end a specification of the a number of instances desired of said at least one graphical object, an index generator for generating an index number for each instance of said at least one graphical object, an index identifier for identifying said index number of each instance of said at least one graphical object, a user input receiver for accepting user instructions, wherein said user instructions comprise at least one expression designating a relationship between at least one attribute of each instance of said at least one graphical object, by said index number, and said spreadsheet cell data, and an expression evaluator for evaluating said expressions to determine said attributes of said instances of said at least one graphical object; and a display operating under the control of said spreadsheet application program for displaying said instances of said at least one graphical object according to said attributes.

13. The apparatus of claim 12, wherein said expression evaluator comprises:

a storage device for storing at least one first type of data structure and an at least one second type of data structure;

a determiner for determining whether one of said first types of data structure has been created for said at least one expression being evaluated;

a creator for creating one of said first types of data structure for said at least one expression being evaluated when said determiner determines that one of said first types of data structure has not been created for said at least one expression;

an inspector for inspecting said first type of data structure of said at least one expression being evaluated to determine if a solution to said at least one expression has been stored in any of said second types of data structure;

a calculator for calculating said solution to said at least one expression being evaluated when said inspector reveals that none of said second type of data structures contain said solution;

memory for storing said solution in at least one of said second types of data structure when said calculator step calculates said solution to said at least one expression being evaluated; and a retriever for retrieving said solution to said at least one expression being evaluated when said inspector reveals that one of said second types of data structure contains said solution.

14. Apparatus for graphically displaying spreadsheet cell data in a spreadsheet application program, said apparatus comprising:

a graphics formatter operating under the control of said spreadsheet application program for creating a graphic format for graphically representing said spreadsheet cell data using at least one instance of at least one graphical object, said graphics formatter comprising:

a user input mechanism for receiving user input, wherein said user input comprises a definition of at least one instance of at least one source object, an index generator for generating an index number for each instance of said at least one source object, an index identifier for identifying said index number of each instance of said at least one source object, a user input receiver for accepting user instructions, wherein said user instructions comprise at least one expression designating a relationship between at least one attribute of each instance of said at least one graphical object, said spreadsheet cell date, and at least one attribute of at least one instance of said at least one source object, and an expression evaluator for evaluating said expressions to determine said attributes of said instances of said at least one graphical object; and a display operating under the control of said spreadsheet application program for displaying said instances of said at least one graphical object according to said attributes.

15. The apparatus of claim 14, wherein said source object is a single valued object.

16. The apparatus of claim 14, wherein said source object is a graphical object.

17. The apparatus of claim 14, wherein said source object is a list valued object.

18. The apparatus of claim 14, wherein said expression evaluator comprises:

a storage device for storing at least one first type of data structure and an at least one second type of data structure;

a determiner for determining whether one of said first types of data structure has been created for said at least one expression being evaluated;

a creator for creating one of said first types of data structure for said at least one expression being evaluated when said determiner determines that one of said first types of data structure has not been created for said at least one expression;

an inspector for inspecting said first type of data structure of said at least one expression being evaluated to determine if a solution to said at least one expression has been stored in any of said second types of data structure;

a calculator for calculating said solution to said at least one expression being evaluated when said inspector reveals that none of said second type of data structures contain said solution;

memory for storing said solution in at least one of said second types of data structure when said calculator step calculates said solution to said at least one expression being evaluated; and a retriever for retrieving said solution to said at least one expression being evaluated when said inspector reveals that one of said second types of data structure contains said solution.

19. Apparatus for graphically displaying spreadsheet cell data in a spreadsheet application program, said apparatus comprising:

a graphics formatter operating under the control of said spreadsheet application program for creating a graphic format for graphically representing said spreadsheet cell data using at least one instance of at least one graphical object, said graphics formatter comprising:

a user input mechanism for receiving user input, said user input comprising:

a definition of said at least one instance of said at least one graphical object, end a definition of at least one instance of at least one source object related to at least one instance of said at least one graphical object, an index generator for generating a first index for each instance of said at least one graphical object and a second index for each instance of said at least one source object, a user input receiver for accepting at least one user designated constraint hierarchy, wherein each of said at least one user designated constraint hierarchy comprises a rule base designating a relationship between at least one attribute of each instance of said at least one graphical object, by means of said first index, said spreadsheet cell data, and at least one attribute of at least one instance of said at least one source object, by means of said second index, end a processor for determining said attributes of said instances of said at least one graphical object according to said rule base in said constraint hierarchy; and a display for displaying said instances of said at least one graphical object according to said attributes.

20. The apparatus of claim 19, wherein said processor for determining said attributes of said instances of said graphical object comprises:

an identifier for identifying, using said first index and said second index, each attribute of each instance of said source object required to evaluate said attributes of said instances of said graphical object; and an evaluator for determining, according to said rule base, only attributes of instances of said source object identified as being required to determined said attributes of said instances of said graphical object.

21. The apparatus of claim 19, wherein, for determining each of said at least one attribute according to said rule base of each of said at least one constraint hierarchy, said processor comprises:

a storage device for storing at least one first type of data structure and an at least one second type of data structure;

a determiner for determining whether one of said first types of data structure has been created for said rule base;

a creator for creating one of said first types of data structure for said rule base when said determiner determines that one of said first types of data structure has not been created for said rule base;

an inspector for inspecting said rule base said first type of data structure to determine if a solution to said rule base has been stored in any of said second types of data structure;

a calculator for calculating said solution to said rule base when said inspector reveals that none of said second type of data structures contain said solution;

memory for storing said solution in at least one of said second types of data structure when said calculator step calculates said solution to said rule base; and a retriever for retrieving said solution to said rule base when said inspector reveals that one of said second types of data structure contains said solution.

* * * * *

UNITED STATES PATENT AND TRADEMARK OFFICE
CERTIFICATE OF CORRECTION

PATENT NO. : 5,634,133

DATED : May 27, 1997

INVENTOR(S) : Winslow B. Kelley

It is certified that error appears in the above-identified patent and that said Letters Patent is hereby corrected as shown below:

```
Column 2,   line 3,   change "is is" to --is--;
Column 5,   line 61,  change "are" to --is--;
Column 5,   line 66,  insert --which-- after "index";
Column 10,  line 9,   insert --.-- after "2";
Column 11,  line 42,  insert --of-- after "width";
Column 12,  line 32,  change "640/(8+(9*0.25)" to
                      --640/(8+(9*0.25))--;
Column 15,  line 23,  change ")/ymax)" to --/ymax)--;
Column 15,  line 26,  change ""(maxheight-10)/ymax)"" to
                      --"(maxheight-10)/ymax"--;
Column 15,  line 34,  change "maxheight-10))" to --maxheight-10)--;
Column 15,  line 37,  change "ymax)"" to --ymax"--;
Column 19,  line 51,  change "ga." to --@a.--;
Column 20,  line 49,  change "value" to --values--;
Column 167, line 12,  change "end" to --and--;
Column 168, line 55,  change ";" to --:--;
```

UNITED STATES PATENT AND TRADEMARK OFFICE
CERTIFICATE OF CORRECTION

PATENT NO. : 5,634,133          Page 2 of 2

DATED : May 27, 1997

INVENTOR(S) : Winslow B. Kelley

It is certified that error appears in the above-identified patent and that said Letters Patent is hereby corrected as shown below:

```
Column 169, line 59, change "e" to --a--;
Column 169, line 61, change "end" to --and--; and
                     delete "the".
```

Signed and Sealed this

Tenth Day of April, 2001

Attest:

NICHOLAS P. GODICI

*Attesting Officer*      *Acting Director of the United States Patent and Trademark Office*